(12) United States Patent
Georgiev et al.

(10) Patent No.: US 8,345,144 B1
(45) Date of Patent: Jan. 1, 2013

(54) METHODS AND APPARATUS FOR RICH IMAGE CAPTURE WITH FOCUSED PLENOPTIC CAMERAS

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 218 days.

(21) Appl. No.: 12/917,984

(22) Filed: Nov. 2, 2010

Related U.S. Application Data

(63) Continuation-in-part of application No. 12/503,803, filed on Jul. 15, 2009, now Pat. No. 8,228,417.

(60) Provisional application No. 61/257,383, filed on Nov. 2, 2009.

(51) Int. Cl.
   *H04N 5/225* (2006.01)
   *G03B 13/00* (2006.01)
   *G03B 3/00* (2006.01)
   *G03B 7/099* (2006.01)
   *G02B 21/00* (2006.01)

(52) U.S. Cl. .......... 348/340; 348/335; 348/345; 396/89; 396/268; 359/368

(58) Field of Classification Search .................. 348/335, 348/345–351, 340; 396/89, 268, 104; 359/368, 359/619; 250/208.1
See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,743,379 A | 7/1973 | McMahon | |
| 3,971,065 A | 7/1976 | Bayer | |
| 3,985,419 A | 10/1976 | Matsumoto et al. | |
| 4,175,844 A | 11/1979 | Glaser-Inbari | |
| 4,180,313 A | 12/1979 | Inuiya | |

(Continued)

FOREIGN PATENT DOCUMENTS

EP    1548481    6/2005

(Continued)

OTHER PUBLICATIONS

Adelson, T., et al. "Single Lens Stereo with a Plenoptic Camera," IEEE Transactions on Pattern Analysis and Machine, Intelligence 14, 2, Feb. 1992, pp. 99-106.

(Continued)

*Primary Examiner* — Aung S Moe
*Assistant Examiner* — Mekonnen Dagnew
(74) *Attorney, Agent, or Firm* — Robert C. Kowert; Meyertons, Hood, Kivlin, Kowert & Goetzel, P.C.

(57) ABSTRACT

Methods and apparatus for rich image capture using focused plenoptic camera technology. A radiance camera employs focused plenoptic camera technology and includes sets of modulating elements that may be used to modulate the sampling of different aspects of the range of plenoptic data. The radiance camera, via the modulating elements, may capture a particular property of light, such as luminance, color, polarization, etc., differently in different microimages or in different portions of microimages. With the focused plenoptic camera technology, the microimages are captured at the same time in a single image. Thus, multiple microimages of the same image of a scene may be captured at different exposures, different colors, different polarities, and so on, in a single image at the same time. Captured images may be used, for example, in High Dynamic Range (HDR) imaging, spectral imaging, polarization imaging, 3D imaging, and other imaging applications.

20 Claims, 37 Drawing Sheets

U.S. PATENT DOCUMENTS

| | | | |
|---|---|---|---|
| 4,193,093 | A | 3/1980 | St. Clair |
| 4,230,942 | A | 10/1980 | Stauffer |
| 4,580,219 | A | 4/1986 | Pelc et al. |
| 4,849,782 | A | 7/1989 | Koyama et al. |
| 5,076,687 | A | 12/1991 | Adelson |
| 5,361,127 | A | 11/1994 | Daily |
| 5,400,093 | A | 3/1995 | Timmers |
| 5,659,420 | A | 8/1997 | Wakai et al. |
| 5,724,122 | A | 3/1998 | Oskotsky |
| 5,729,011 | A | 3/1998 | Sekiguchi |
| 5,946,077 | A | 8/1999 | Nemirovskiy |
| 6,097,394 | A | 8/2000 | Levoy et al. |
| 6,097,541 | A | 8/2000 | Davies et al. |
| 6,137,535 | A | 10/2000 | Meyers |
| 6,137,937 | A | 10/2000 | Okano et al. |
| 6,268,846 | B1 | 7/2001 | Georgiev |
| 6,301,416 | B1 | 10/2001 | Okano et al. |
| 6,339,506 | B1 | 1/2002 | Wakelin et al. |
| 6,351,269 | B1 | 2/2002 | Georgiev |
| 6,476,805 | B1 | 11/2002 | Shum et al. |
| 6,738,533 | B1 | 5/2004 | Shum et al. |
| 6,838,650 | B1 | 1/2005 | Toh |
| 7,019,671 | B2 | 3/2006 | Kawai |
| 7,054,067 | B2 | 5/2006 | Okano et al. |
| 7,085,062 | B2 | 8/2006 | Hauschild |
| 7,620,309 | B2 * | 11/2009 | Georgiev ............... 396/113 |
| 7,723,662 | B2 * | 5/2010 | Levoy et al. ........... 250/208.1 |
| 7,732,744 | B2 | 6/2010 | Utagawa |
| 7,792,423 | B2 | 9/2010 | Raskar et al. |
| 7,880,794 | B2 | 2/2011 | Yamagata et al. |
| 7,962,033 | B2 | 6/2011 | Georgiev et al. |
| 7,965,936 | B2 * | 6/2011 | Raskar et al. ............ 396/268 |
| 8,019,215 | B2 | 9/2011 | Georgiev et al. |
| 2001/0012149 | A1 | 8/2001 | Lin et al. |
| 2001/0050813 | A1 | 12/2001 | Allio |
| 2002/0140835 | A1 | 10/2002 | Silverstein |
| 2003/0108821 | A1 | 6/2003 | Mei et al. |
| 2003/0231255 | A1 | 12/2003 | Szajewski et al. |
| 2004/0114807 | A1 | 6/2004 | Lelescu et al. |
| 2004/0223214 | A1 | 11/2004 | Atkinson |
| 2005/0088714 | A1 | 4/2005 | Kremen |
| 2006/0104542 | A1 | 5/2006 | Blake et al. |
| 2007/0091197 | A1 | 4/2007 | Okayama et al. |
| 2007/0252074 | A1 | 11/2007 | Ng et al. |
| 2008/0056549 | A1 | 3/2008 | Hamill et al. |
| 2008/0107231 | A1 | 5/2008 | Miyazaki et al. |
| 2008/0152215 | A1 | 6/2008 | Horie et al. |
| 2008/0165270 | A1 * | 7/2008 | Watanabe et al. ......... 348/340 |
| 2008/0166063 | A1 | 7/2008 | Zeng |
| 2008/0187305 | A1 | 8/2008 | Raskar et al. |
| 2008/0193026 | A1 | 8/2008 | Horie et al. |
| 2008/0218610 | A1 | 9/2008 | Chapman et al. |
| 2008/0247623 | A1 | 10/2008 | Delso et al. |
| 2009/0041381 | A1 | 2/2009 | Georgiev |
| 2009/0041448 | A1 | 2/2009 | Georgiev |
| 2009/0086304 | A1 | 4/2009 | Yurlov et al. |
| 2009/0140131 | A1 * | 6/2009 | Utagawa ............... 250/226 |
| 2009/0295829 | A1 | 12/2009 | Georgiev et al. |
| 2010/0026852 | A1 * | 2/2010 | Ng et al. ............... 348/239 |
| 2010/0205388 | A1 | 8/2010 | MacInnis |
| 2010/0265386 | A1 | 10/2010 | Raskar et al. |

FOREIGN PATENT DOCUMENTS

| | | |
|---|---|---|
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | 2007/115281 | 10/2007 |

OTHER PUBLICATIONS

Ng, R., et al, "Light Field Photography with a Hand-Held Plenoptic Camera," Stanford Univ. Computer Science Tech, Report CSTR 2005-02, Apr. 2005, 11 pages.

Ng, Ren, et al., "Light Field Photography with a Hand-held Plenoptic Camera," Stanford University, Stanford Tech Report CTSR 2005-02.

Ng R.: "Fourier Slice Photography," Proceedings of ACM SIGGRAPH 2005 (Jan. 2005), 10 pages.

Levoy, Mark et al., "Light Field Microscopy," Stanford University, Submitted to Siggraph 2006, 5 pages.

Levoy, Mark, "Optical Recipes for Light Microscopes," Stanford Computer Grpahics Laboratory Technical Memo 2006-001, Jun. 20, 2006, 10 pages.

Levoy M., Hanrahan P.: "Light Field Rendering," ACM Trans. Graph. (1996), 31-42.

M. Levoy, "Light Fields and computational Imaging," Computer [Online], vol. 39, No. 8, Aug. 2006, pp. 46-55, XP002501300.

Georgeiv, et al. "Spatio-Angular Resolution Tradeoff in Integral Photography," Proc. EGSR, 2006, 10 pages.

Georgiev T., Wainer M.: "Morphing Between Multiple Images," Tech. Rep. Apr. 17, 1997, 17 pages.

Georgiev T., Lumsdaine A.: Depth of field in plenoptic cameras. In Eurographics 2009—Annex (Apr. 2009), pp. 5-8.

Brown M., Lowe D. G.: "Unsupervised 3d Object Recognition and Reconstruction in Unordered Datasets," in Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), 43-54.

Isaksen A., McMillan L., Gortler S. J.: "Dynamically Reparameterized Light Fields," ACM Trans. Graph. (2000), 297-306.

Lee S., Wolberg G., Shin S.: "Polymorph: Morphing Among Multiple Images," IEEE Computer Graphics and Applications (Jan./Feb. 1998), 14 pages.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Naemura T., Yoshida T., Harashima H.: "3d Computer Graphics Based on Integral Photography," Optics Express, vol. 8, 2 (Feb. 6, 2001), 8 pages.

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002), 5 pages.

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), 8 pages.

Wilburn B., Joshi N., Vaish V., Talvala E., Antunez E., Barth A., Adams A., Levoy M., Horowitz M.: "High Performance Imaging Using Large Camera Arrays," in ACM Trans. Graph. (2005), 12 pages.

Xiao J., Shah M.: "Tri-view Morphing," Computer Vision and Image Understanding 96, 3 (2004), 345-366.

Zitnick C. L., Jojic N., Kang S.: "Consistent Segmentation for Optical Flow Estimation" In Proceedings of IEEE International Conference on Computer Vision (ICCV) (2005), 8 pages.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, 13 pages.

J. Neumann, et al., "Eyes from Eyes Analysis of Camera Design Using Plenoptic Video Geometry," Dec. 2001, 20 pages, XP002509893.

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Yang, J C, et al., "A Real-Time Distributed Light Field Camera," Rendering Techniques 2002, Eurographics Workshop Proceedings, PIS, Italy, Jun. 26-28, 2002, 9 pages.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Mutli-View Geometry Estimation for Light Field Compression," VMV 2002, 8 pages.

Borman, S., and Stevenson, R., "Super-resolution from image sequences—a review", Proceedings of the 1998 Midwest Symposium on Circuits and Systems, Publication Date: Aug. 9-12, 1998, on pp. 374-378.

Elad, M., and Feuer, A., "Restoration of a single superresolution image from several blurred, noisy, and undersampled measured images," IEEE Transactions on Image Processing Dec. 1997, pp. 1646-1658.

Farsiu, S., Robinson, D., Elad, M., and Milanfar, P., "Advances and challenges in super-resolution," International Journal of Imaging Systems and Technology, 2004, 12 pages.

Park, S., Park, M., and Kang, M., "Super-resolution image reconstruction: a technical overview," Signal Processing Magazine, 2003, 16 pages.

David E. Roberts, History of Lenticular and Related Autostereoscopic Methods, 2003, 17 pages.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Bishop T. E., Zanetti S., Favaro P.: Light field superresolution. In International Conference on Computational Photography (Apr. 16-17, 2009), 4 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, (Jan. 1, 2004), 83-97.

Richard F. Lyon, Paul M. Hubel. Eyeing the camera: Into the next century (2002). In Proc. IS&T/SID 10th Color Imaging Conf., 2002.

Paul M. Hubel, John Liu and Rudolph J. Guttosch. Spatial Frequency Response of Color Image Sensors: Bayer Color Filters and Foveon X3. Proceedings of the SPIE, vol. 5301, pp. 402-407 (2004).

R. J. Guttosch, "Investigation of color aliasing of high spatial frequences and edges for Bayer-pattern sensors and Foveon X3 direct image sensor," tech. rep., Foveon, 2002.

Paul M. Hubel. Foveon Technology and the Changing Landscape of Digital Camera Technology. Thirteenth Color Imaging Conference: Color Science and Engineering Systems, Technologies, and Applications, Scottsdale, Arizona; Nov. 2005; p. 314-317.

E. Adelson and J. Bergen. The plenoptic function and the elements of early vision. In Computational models of visual processing. MIT Press, 1991.

M. Aggarwal and N. Ahuja. Split aperture imaging for high dynamic range. International Journal of Computer Vision, Jan. 2004.

P. E. Debevec and J. Malik. Recovering high dynamic range radiance maps from photographs. ACM Transactions on Graphics, SIGGRAPH 1997 Conference Proceedings, San Diego, CA, pp. 369-378, 1997.

F. Durand and J. Dorsey. Fast bilateral filtering for the display of high-dynamic-range images. ACM Transactions on Graphics, SIGGRAPH 2002 Conference Proceedings, San Antonio, TX, pp. 257-266, 2002.

R. Horstmeyer, R. Athale, and G. Euliss. Modified light field architecture for reconfigurable multimode imaging. In Adaptive Coded Aperture Imaging, Non-Imaging, and Unconventional Imaging Sensor Systems. SPIE, 2009.

R. Horstmeyer, G. Euliss, R. Athale, and M. Levoy. Flexible multimodal camera using a light field architecture. In Proceedings ICCCP 2009.

R. Horstmeyer, G.W. Euliss, R. A. Athale, R. L. Morrison, R. A. Stack, and J. Ford. Pupil plane multiplexing for multi-domain imaging sensors. In Society of Photo-Optical Instrumentation Engineers (SPIE) Conference Series, vol. 7096, Aug. 2008.

M. Levoy, R. Ng, A. Adams, M. Footer, and M. Horowitz. Light field microscopy. SIGGRAPH '06: SIGGRAPH 2006 Papers, Jul. 2006.

S. G. Narasimhan and S. K. Nayar. Enhancing resolution along multiple imaging dimensions using assorted pixels. IEEE Trans. Pattern Anal. Mach. Intell., 27(4):518-530, 2005.

S. K. Nayar and T. Mitsunaga. High dynamic range imaging: Spatially varying pixel exposures. Proceedings IEEE CVPR, 2000.

R. Ng, M. Levoy, M. Bredif, G. Duval, M. Horowitz, and P. Hanrahan. Light field photography with a handheld plenoptic camera. Technical Report CSTR 2005-02, Stanford Univ, Apr. 2005.

J. H. Park, M. Mase, S. Kawahito, M. Sasaki, Y. Wakamori, and Y. Ohita. An ultra wide dynamic range cmos image sensor with a linear response. Proceedings SPIE-IS&T Electronic Imaging, SPIE vol. 6068, 2006.

Y. Y. Schechner and S. K. Nayar. Generalized mosaicing. In ICCV, pp. 17-25, 2001.

Y. Y. Schechner and S. K. Nayar. Generalized mosaicing: Wide field of view multispectral imaging. IEEE Trans. Pattern Anal. Mach. Intell., 24(10):1334-1348, 2002.

Y. Y. Schechner and S. K. Nayar. Generalized mosaicing: High dynamic range in a wide field of view. International Journal of Computer Vision, 53(3):245-267, 2003.

Y. Y. Schechner and S. K. Nayar. Generalized mosaicing: Polarization panorama. IEEE Trans. Pattern Anal. Mach. Intell., 27(4):631-636, 2005.

J. Tumblin and G. Turk. LCIS: A boundary hierarchy for detail-preserving contrast reduction. ACM Transactions on Graphics, SIGGRAPH 1999 Conference Proceedings, Los Angeles, CA, pp. 83-90, 1999.

JP504669 (1975), all pages, english equivalent is U.S. Patent 3985419, dated Oct. 12, 1976 by Matsumoto, et al.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Georgiev, et al. "Light-Field Capture by Multiplexing in the Frequency Domain," ADOBE Technical Report, Apr. 2007, all pages.

Lumsdaine A., Georgiev T.: The focused plenoptic camera. In International Conference on Computational Photography (Apr. 2009), 8 pages.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

U.S. Appl. No. 12/574,183, filed Oct. 6, 2009.
U.S. Appl. No. 11/627,141, filed Jan. 25, 2007.
U.S. Appl. No. 12/144,411, filed Jun. 23, 2008.
U.S. Appl. No. 12/186,396, filed Aug. 5, 2008.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,869, filed Jan. 20, 2010.
U.S. Appl. No. 12/690,871, filed Jan. 20, 2010.
U.S. Appl. No. 12/503,803, filed Jul. 15, 2009.
U.S. Appl. No. 12/628,437, filed Dec. 1, 2009.
U.S. Appl. No. 12/790,677, filed May 28, 2010.

* cited by examiner focused plenoptic camera filters at microlenses filters at main lens

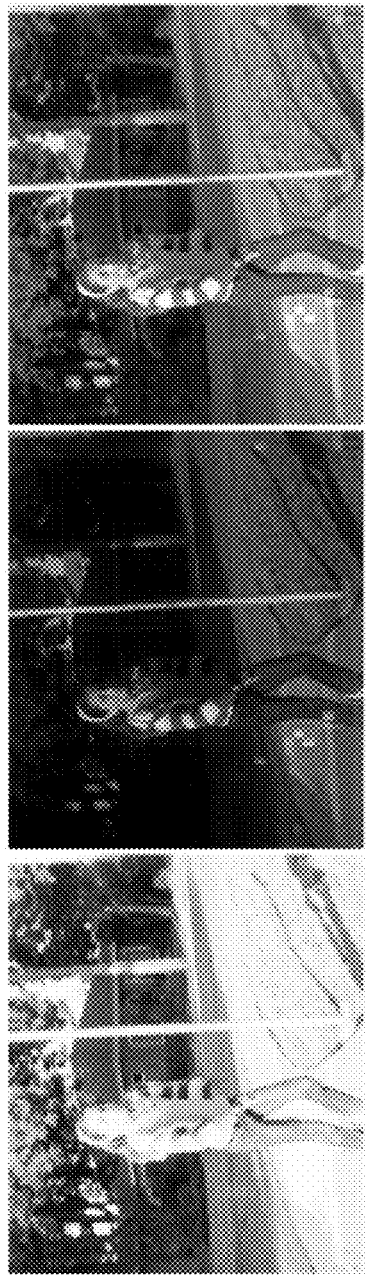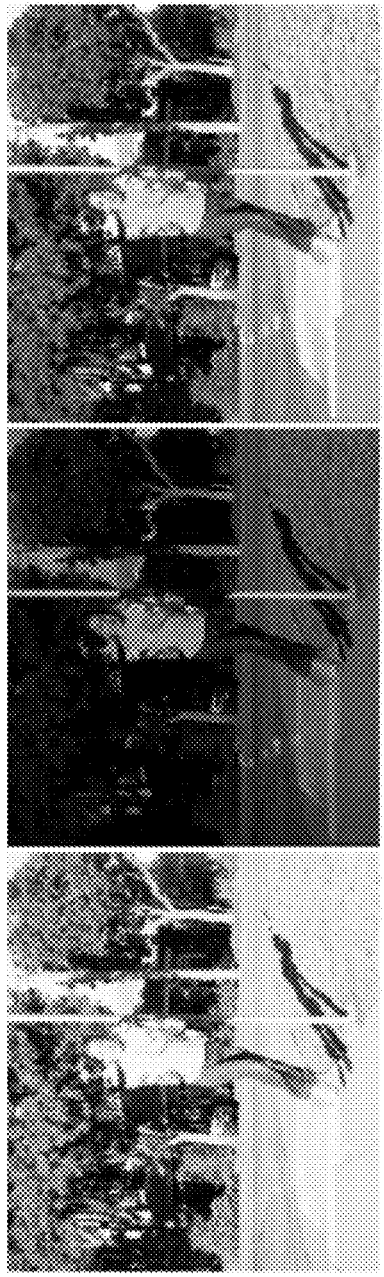

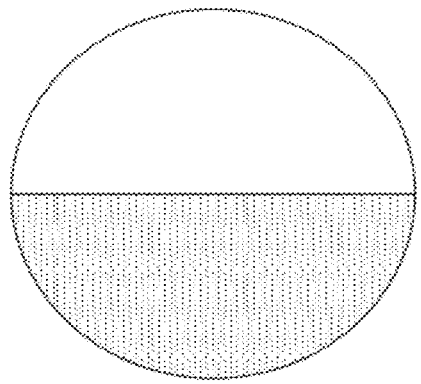 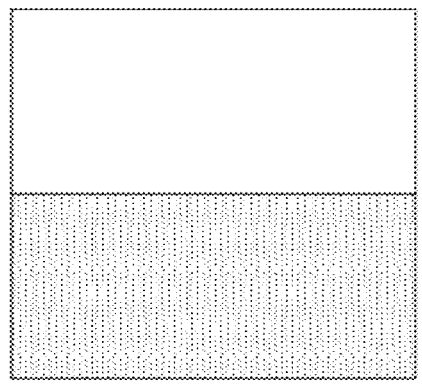 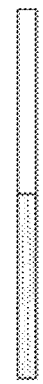
*FIG. 22A*  *FIG. 22B*  *FIG. 22C*
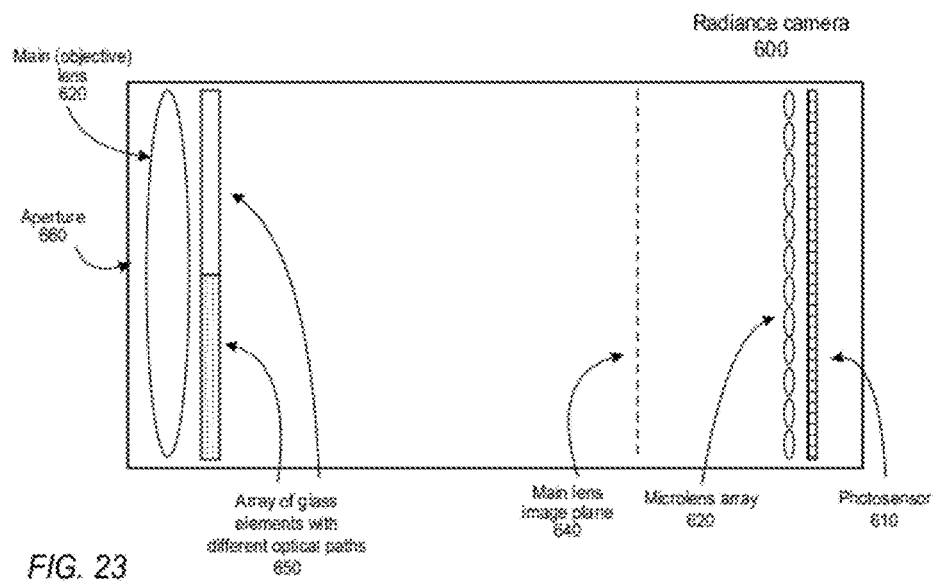
*FIG. 23*

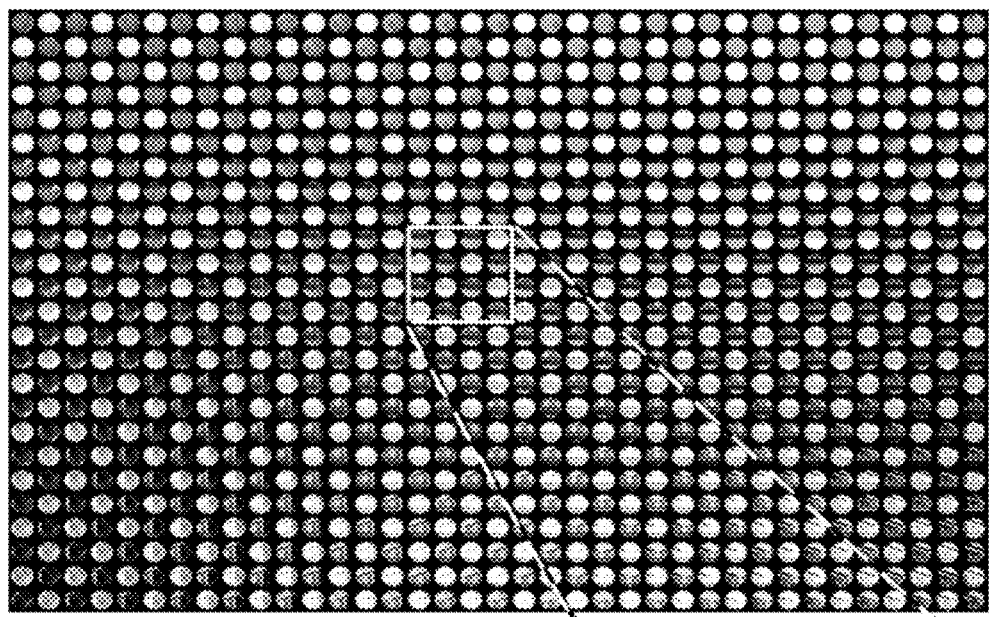
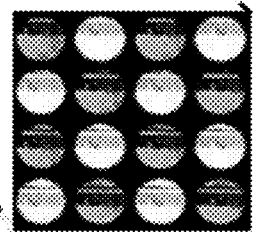
FIG. 33
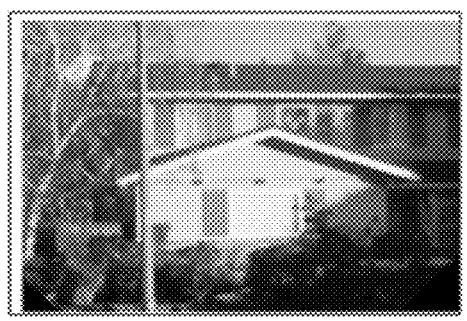 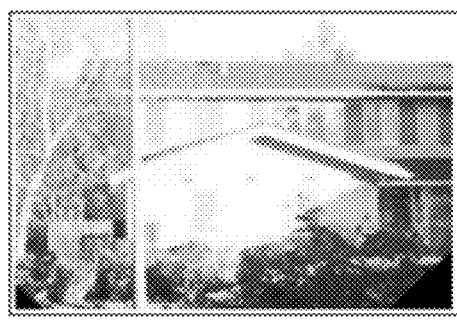
FIG. 34A          FIG. 34B

METHODS AND APPARATUS FOR RICH IMAGE CAPTURE WITH FOCUSED PLENOPTIC CAMERAS

PRIORITY INFORMATION

This application is a Continuation-in-Part of U.S. patent application Ser. No. 12/503,803, entitled "Focused Plenoptic Camera Employing Different Apertures or Filtering at Different Microlenses" filed Jul. 15, 2009 now U.S. Pat. No. 8,228,417, the content of which is incorporated by reference herein in its entirety, and this application claims benefit of priority of U.S. Provisional Application Ser. No. 61/257,383 entitled "Rich Image Capture with Plenoptic Cameras" filed Nov. 2, 2009, the content of which is incorporated by reference herein in its entirety.

BACKGROUND

Description of the Related Art

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

The plenoptic function was introduced as a means of representing all of the information necessary to describe the radiance in a scene. The plenoptic function describes the distribution of light rays in 3D space, as well as other properties of those rays, such as wavelength, polarization, and so on. The lightfield established a theoretical framework for analyzing the plenoptic function, specifically the spatial distribution of the light rays. Conventional plenoptic cameras for capturing the plenoptic function have similarly emphasized capture of the light ray distribution (the 4D lightfield). Plenoptic cameras capture the 4D lightfield by multiplexing it onto a conventional 2D sensor. The 4D lightfield essentially represents positional information of the rays in two dimensions and directional information about the rays in two more dimensions. A conventional plenoptic camera uses a microlens array in front of the camera sensor in which the microlenses are focused at the main camera lens, and produces one positional sample per microlens. This conventional technique results in a resolution of the final image that is equal to the number of microlenses, e.g. 300×300.

Capturing richer information about a scene has been studied in the context of both traditional and plenoptic photography. Capturing more information means capturing more pixels, with some means of allocating pixels for the richer capture. Pixels are typically allocated in two different ways: spatially, which captures the richer information in a single exposure (e.g., using a conventional plenoptic camera), or temporally, which captures the richer information across multiple exposures.

A familiar instance of spatial allocation is the Bayer filter, used to capture color digital photographs by interleaving red, green, and blue pixels across the CCD. A conventional "assorted pixels" approach extends this idea to other rich image data (such as high dynamic range, polarization, multiple spectra, etc.). A conventional "split aperture" approach also allocates pixels spatially, but the allocation is done coarsely, by splitting the incoming image, filtering separately, and then capturing the filtered scenes separately.

A conventional temporal allocation technique of "generalized mosaicing" captures a sequence of images and applies different optical settings to each image in the sequence. Generalized mosaicing has been applied to multi-spectral, HDR, and polarization capture.

A conventional multimodal camera uses pinholes rather than microlenses, with the main lens focused on the pinholes. Since each modal image contains only one pixel from each pinhole, the camera would be classified as a conventional plenoptic camera.

High Dynamic Range (HDR) Imaging

High dynamic range imaging (HDRI, or just HDR) allows a greater dynamic range of luminance between light and dark areas of a scene than conventional imaging techniques. An HDR image more accurately represents the wide range of intensity levels found in real scenes. Pixel values of digital HDR images thus require more bits per channel than conventional images. An HDR imaging technique may, for example, use 16-bit or 32-bit floating point numbers for each channel to capture a much wider dynamic range of luminance than is captured using normal imaging techniques. Note that HDR images are not directly displayable to a display device or printable; the information stored in HDR images corresponds to the physical values of luminance. In contrast, the information stored in conventional digital images represents colors that should appear on a display device or a paper print.

SUMMARY

Various embodiments of methods and apparatus for rich image capture using focused plenoptic camera technology are described. Embodiments may leverage the richer definition of the plenoptic function to provide techniques that can be used to capture other information about the scene radiance in addition to the lightfield. Embodiments of a radiance camera, based on focused plenoptic camera technology, are described that are capable of capturing extended dynamic range, extended color, extended polarity, or various other modalities of the plenoptic function at high resolution comparable to that of conventional cameras. Embodiments of the radiance camera employ the spatial allocation approach for capturing rich image data. That is, the camera captures a single exposure, using focused plenoptic camera technology, that contains sets of pixels that have been exposed to different optical settings according to a set of modulating elements. Embodiments of the radiance camera are based on the focused plenoptic camera, which enables higher resolution than conventional plenoptic cameras, and allows flexible trade-offs of captured image parameters.

Embodiments may leverage the characteristics of the focused plenoptic camera by implementing a radiance camera employing focused plenoptic camera technology that applies different optical elements, such as different filters, apertures, lenses, or combinations thereof, to modulate the sampling of different aspects of the range of plenoptic data. Embodiments of the radiance camera, via the different optical elements, may capture a particular property of light, such as luminance, color, polarization, and so on, differently in different microimages or in different portions of microimages (e.g., different levels of exposure for luminance, different wavelengths of color, different angles of polarization, etc.).

With the focused plenoptic camera technology, all of the microimages are captured at the same time in a single image (which may be referred to as a flat) at the sensor. Thus, multiple microimages of the same image of a scene may be captured at different exposures, different colors, different polarities, and so on, in a single image at the same time with a radiance camera implemented according to embodiments. Images captured using embodiments of the radiance camera may be used, for example, in High Dynamic Range (HDR) imaging, spectral imaging, polarization imaging, 3D imaging, and other imaging applications.

In embodiments of the radiance camera, different techniques for expanding the range of plenoptic data that can be sampled within a single exposure using focused plenoptic camera technology and different optical elements that modulate properties of light may be applied. However, for simplicity, these techniques may be generally illustrated herein using the example of extended dynamic range imaging, also referred to as high dynamic range (HDR) imaging. A first technique simultaneously captures multiple exposures with a microlens array that has an interleaved set of different optical elements such as neutral-density filters, while a second technique places multiple different optical element such as neutral-density filters at or near the main lens aperture. In another technique that is similar to the first in that the modulation is done at or near the microlens array, different microlenses may be interleaved in the microlens array, or the microlenses may be differently shifted either parallel to the main optical axis of the camera or perpendicular to the main optical axis of the camera, to modulate a property of light at the microlens array. In another technique that is similar to the second in that the modulation is done at or near the main lens, the main lens itself may be modified so as to differently affect a given property of light at different portions of the main lens.

While a radiance camera that modulates luminance and thus may be used in HDR imaging is used as an example, embodiments of a radiance camera may be similarly implemented using focused plenoptic camera technology and different optical elements that modulate other properties of light to perform extended color capture (i.e., capture of more than three primary colors), extended polarization capture, focal length, 3D information, or more generally the extended capture of any property of light that may be sampled in the plenoptic function. By more fully sampling the plenoptic function, various embodiments of the radiance camera are able to capture truly rich image data with different attributes of the radiance function.

In embodiments of the radiance camera, light from a scene located in front of the camera is refracted by the main lens. The refracted light forms an image of the scene in the camera at an image plane between the main lens and the microlens array. A modulating element array includes multiple, heterogeneous optical elements; different ones of these optical elements affect light differently than others of these optical elements. As just one example, the element array may include two different neutral density filters that are alternated in the array to provide modulation of the luminance property of light. Each microlens in the microlens array refracts light from the image plane onto a photosensor. At the photosensor, each microlens thus forms a small image of a portion of scene at the image plane, which may be captured by the photosensor. The different elements in the modulating element array, however, affect the light so that different ones of these microimages, or portions thereof, are captured differently, for example at different levels of luminance filtering according to alternating neutral density filters.

The image (referred to as a flat) captured by the photosensor includes a plurality of modulated microimages; depending on the technique implemented in the radiance camera, each microimage may be separately modulated by a modulating element, and thus a set of microimages are differently modulated according to the modulating elements, or each microimage may include modulated portions corresponding to the modulating elements. The flat may be appropriately rendered according to one or more rendering techniques to, for example, generate separate images corresponding to the different modulations provided by the modulating elements, or produce a combined image that incorporates two or more of the modulations (e.g., an HDR image). In addition, a known structure of a particular modality being modulated may be used to compute or reconstruct additional information about the modality from the set of captured, modulated microimages.

BRIEF DESCRIPTION OF THE DRAWINGS

FIGS. 14A through 14C show two bracketed images rendered from a single exposure (flat) captured using a radiance camera that includes interleaved filters at the microlenses, and a final tone-mapped HDR image rendered from the bracketed images.

FIGS. 15A through 15C show two bracketed images rendered from a single exposure (flat) captured using a radiance camera that includes heterogeneous filters at the main lens, and a final tone-mapped HDR image rendered from the bracketed images.

FIGS. 22A through 22C are examples of modulating element arrays comprising different glass modulating elements that may be used in radiance camera embodiments implementing focused plenoptic camera technology to modulate a property of light.

FIG. 23 shows an example radiance camera embodiment implementing focused plenoptic camera technology and including a modulating glass element array located proximate to the main camera lens.

FIG. 33 shows a magnified portion of an example flat captured with a focused plenoptic camera using an alternating pattern of different apertures at the microlenses, according to some embodiments.

FIGS. 34A and 34B show two example images generated from the flat of which a portion is shown in FIG. 33.

Figure 1A:
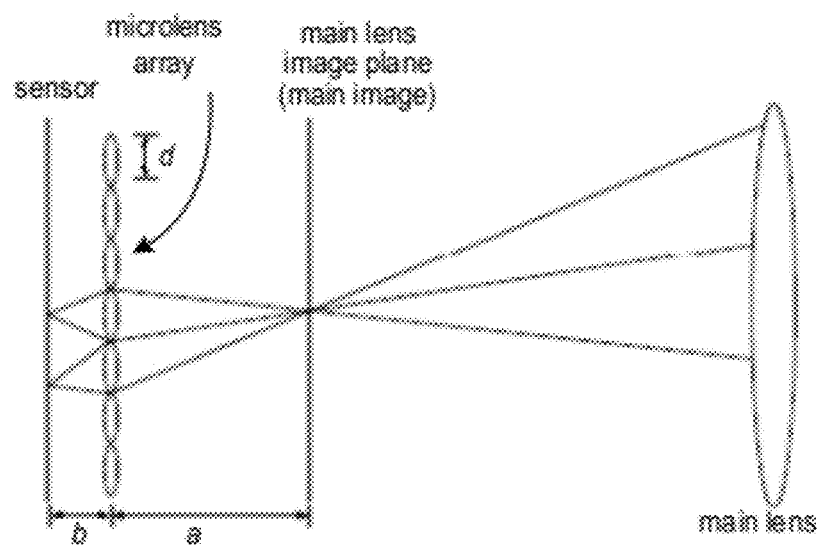
FIGS. 1A and 1B illustrate the different modes or configurations of a focused plenoptic camera according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for rich image capture using focused plenoptic camera technology are described. The plenoptic function was originally defined as a record of both the 3D structure of the lightfield and of its dependence on parameters such as wavelength, polarization, etc. However, prior work on these ideas has emphasized the 3D aspect of lightfield capture and manipulation, with less attention paid to the other parameters. Embodiments may leverage the richer definition of the plenoptic function to provide techniques that can be used to capture other information about the scene radiance in addition to the lightfield.

Plenoptic cameras may capture the 4D lightfield by multiplexing it onto a conventional 2D sensor. The 4D lightfield essentially represents positional information of the rays in two dimensions and directional information about the rays in two more dimensions. Capturing a richer plenoptic function means capturing dependence on additional dimensions. However it also means full usage of the multiplexing capabilities of the camera to perform extended and better sampling in order to obtain more information with the same limited sensor capabilities.

How sensor pixels are allocated for capturing that additional data about the plenoptic function has direct bearing on the achievable resolution of rendered images. Focused plenoptic camera technology uses a different sampling approach than conventional plenoptic cameras. The focused plenoptic camera samples more sparsely in the directional coordinates, resulting in final rendered images comparable to that of regular, non-plenoptic, cameras. Embodiments of a radiance camera for capturing rich image data as described herein are based on the focused plenoptic camera technology. In addition to higher spatial resolution, the focused plenoptic camera design also enables flexible trade-offs to be made in how the plenoptic function is sampled. Both of these features are important for efficiently capturing additional dimensions of the plenoptic function.

To perform multiplexed capturing of additional data using focused plenoptic camera technology, embodiments allocate pixels for the information that is to be captured and modify the focused plenoptic camera to perform multiplexed sampling in the additional dimension(s) or types of data. Different techniques for performing this multiplexing are described. A first technique multiplexes the captured plenoptic function at the microlens array focused on the main lens image plane, for example by interleaving optical elements having different properties to distinguish the particular property of the plenoptic function that is to be multiplexed. A second technique performs the modulation using optical elements with different properties at the main camera lens, and captures the multiplexed data with a microlens array focused on the main lens image plane. Other techniques may be used in other embodiments, for example modulating portions of the main lens or interleaving different microlenses or shifting microlenses in the microlens array.

Embodiments may leverage the high resolution and flexible sampling trade-offs of focused plenoptic camera technology to perform high-resolution capture of the rich "non 3D" structure of the plenoptic function. Embodiments of a radiance camera, based on focused plenoptic camera technology, are described that are capable of capturing extended dynamic range, extended color, extended polarity, or various other modalities of the plenoptic function at high resolution comparable to that of conventional cameras. Embodiments of the radiance camera as described herein employ the spatial allocation approach for capturing rich image data. That is, the camera captures a single exposure that contains sets of pixels that have been exposed to different optical settings. Embodiments of the radiance camera are based on the focused plenoptic camera, which enables higher resolution than conventional plenoptic cameras, and allows flexible trade-offs of captured image parameters.

Focused Plenoptic Camera Technology

Figure 1B:
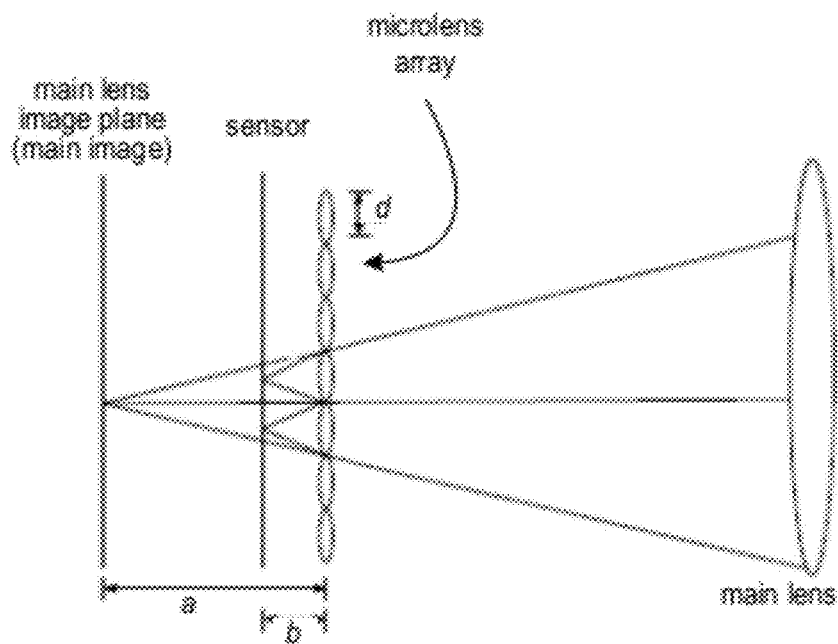

In a focused plenoptic camera, the main camera lens creates an image "in the air" at the focal plane. This may be referred to as the main image. This image is observed by an array of microlenses that are focused on the main image (and not on the main lens). Based on the multiple microlenses (which may be viewed as multiple microcameras), each point in the main image is re-imaged two or more times on to the sensor, and thus each point in the main image is captured in two or more of the microimages at the sensor. This is true for both the Keplerian telescopic mode and the Galilean telescopic (or binocular) mode of a focused plenoptic camera. FIGS. 1A and 1B illustrate the different modes or configurations of a focused plenoptic camera according to some embodiments. FIG. 1A illustrates the Keplerian telescopic mode, and FIG. 1B illustrates the Galilean telescopic, or binocular, mode. Referring to FIG. 1A, in the Keplerian telescopic mode, the main image is real and is in front of the sensor. Referring to FIG. 1B, in Galilean telescopic mode, the main image is virtual, and is behind the sensor. In both modes, the main image is re-imaged to the sensor multiple times. The unobstructed diameters of the microlenses are the same, denoted as d. The distances a and b and the focal length of the microlenses satisfy the lens equation. Note that, in Galilean mode, a is negative.

In a focused plenoptic camera, if the scene is sufficiently far from the camera, the scene may be considered to be at infinity. Depending on the camera, the distance from the camera at which a scene or object is at infinity typically lies within a range of about one meter to about five meters, although this range may include shorter or longer distances for some camera configurations. The main camera lens of the focused plenoptic camera creates an image of the scene at the focal plane of the main lens (also referred to herein as the main image plane or main lens image plane). Different ones of the microlenses may project identical or nearly identical microimages of the image at the focal plane onto the sensor. Thus, each point of the image at the focal plane is re-imaged onto the sensor multiple times by multiple microlenses in the microlens array of a focused plenoptic camera.

Radiance Camera Embodiments Using Focused Plenoptic Camera Technology and Modulating Elements Embodiments may leverage these characteristics of the focused plenoptic camera by implementing a radiance camera employing focused plenoptic camera technology that applies different optical elements, such as different filters, apertures, lenses, or combinations thereof, to modulate the sampling of different aspects of the range of plenoptic data. Embodiments of the radiance camera, via the different optical elements, may capture a particular property of light, such as luminance, color, polarization, and so on, differently in different microimages or in different portions of microimages (e.g., different levels of exposure for luminance, different wavelengths of color, different angles of polarization, etc.). With the focused plenoptic camera technology, all of the microimages are captured at the same time in a single image (which may be referred to as a flat) at the sensor. Thus, multiple microimages of the same image of a scene may be captured at different exposures, different colors, different polarities, etc., in a single image at the same time with a radiance camera implemented according to embodiments. Images captured using embodiments of the radiance camera may be used, for example, in High Dynamic Range (HDR) imaging, spectral imaging, polarization imaging, 3D imaging, and other imaging applications.

In embodiments of the radiance camera, different techniques for expanding the range of plenoptic data that can be sampled within a single exposure using focused plenoptic camera technology and different optical elements that modulate properties of light may be applied. However, for simplicity, these techniques may be generally illustrated herein using the example of extended dynamic range imaging, also referred to as high dynamic range (HDR) imaging. A first technique simultaneously captures multiple exposures with a microlens array that has an interleaved set of different optical elements such as neutral-density filters, while a second technique places multiple different optical element such as neutral-density filters at or near the main lens aperture. In another technique that is similar to the first in that the modulation is done at or near the microlens array, different microlenses may be interleaved in the microlens array, or the microlenses may be differently shifted either parallel to the main axis of the camera or perpendicular to the main axis of the camera, to modulate a property of light at the microlens array. In another technique that is similar to the second in that the modulation is done at or near the main lens, the main lens itself may be modified so as to differently affect a given property of light at different portions of the main lens.

Embodiments of a radiance camera may be similarly implemented using focused plenoptic camera technology and different optical elements that modulate other properties of light to perform extended color capture (i.e., capture of more than three primary colors), extended polarization capture, focal length, 3D information, or more generally the extended capture of any property of light that may be sampled in the plenoptic function. By more fully sampling the plenoptic function, various embodiments of the radiance camera are able to capture truly rich image data with different attributes of the radiance function.

Figure 2:
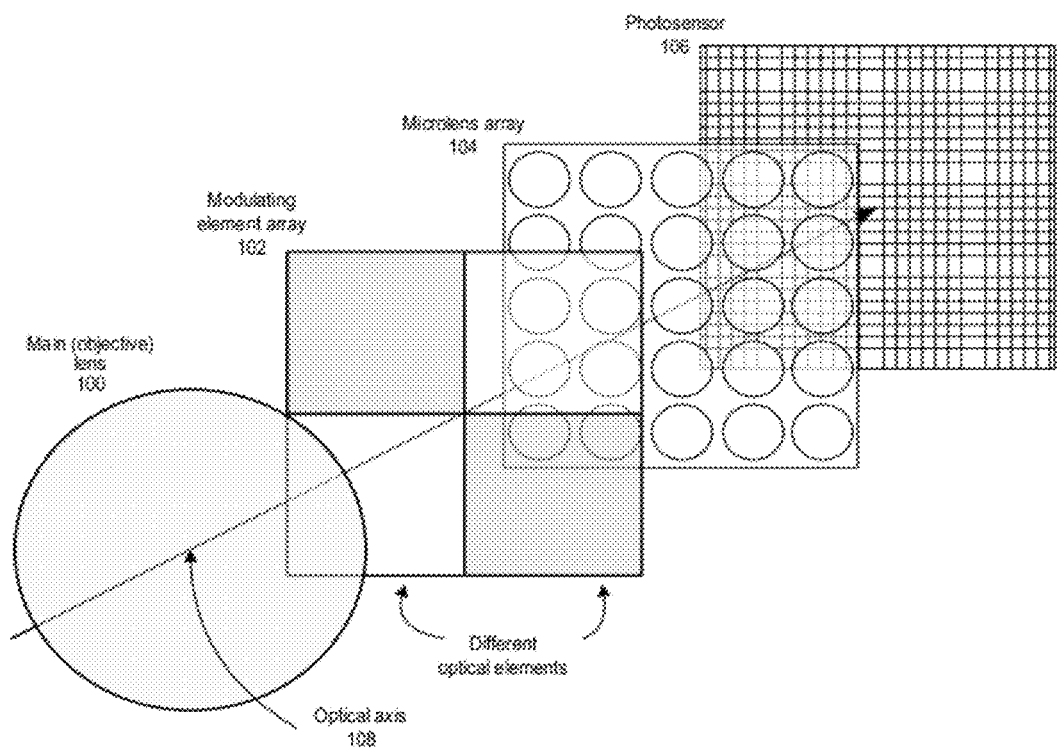
FIG. 2 graphically illustrates a general technique for capturing rich image data with focused plenoptic camera technology and different optical elements that modulate properties of light, according to at least some embodiments.

FIG. 2 graphically illustrates a general technique for capturing rich image data with focused plenoptic camera technology and different optical elements that modulate properties of light, according to at least some embodiments. The distances, dimensions, numbers, and arrangements of elements in FIG. 2 are given for illustrative purposes, and are not intended to be limiting. Light from a scene located in front of the camera is refracted by the main lens 100. In the focused plenoptic camera, the refracted light forms an image of the scene in the camera at an image plane (not shown) between the main lens 100 and the microlens array 104. (Note that FIG. 2 shows that the camera has a single, main optical axis 108.) A modulating element array 102 includes multiple, hetereogeneous optical elements; different ones of these optical elements affect light differently than others of these optical elements. As just one example, element array 102 may include two different neutral density filters that are alternated in the array 102 to provide modulation of the filtering of light. Each microlens in microlens array 104 refracts light from the image plane onto photosensor 106. At photosensor 106, each microlens thus forms a small image of a portion of scene at the image plane, which may be captured by the photosensor 106. The different elements in modulating element array 102, however, affect the light so that different ones of these microimages, or portions thereof, are captured differently, for example at different levels of filtering according to alternating neutral density filters.

FIG. 2 shows modulating element array 102 as between main lens 100 and microlens array 104. However, in various embodiments, modulating element array 102 may be located in front of main lens 100, proximate to main lens 100 between main lens 100 and the image plane formed by the main lens 100, or proximate to microlens array 104 (either in front of or behind microlens array 104). In at least some embodiments where modulating element array 102 is located proximate to the microlens array 104, each microlens in the microlens array 104 may be associated with one element in modulating element array 102. That is, if there are N microlenses, there will at least N elements in modulating element array 102, with each microlens corresponding to one of the N elements in the modulating element array 102. In embodiments where modulating element array 102 is located proximate to the main lens 100, there will generally be fewer elements in modulating element array 102 than there are microlenses in microlens array 104; for example, there may be M (two, four, eight, or some other number) of elements in microlens array 104, where M may be (but is not necessarily) less than N, where N is the number of microlenses in microlens array 104.

In some embodiments, instead of a separate modulating element array 102, the main lens 100 itself may be subdivided into two or more sections so that different sections of the main lens 100 affect some property of light differently. For example, main lens 100 may be split into two halves, four quadrants, etc., each with different focal lengths, different refractive indexes, and so on. As another example, main lens 100 may be split into two halves, four quadrants, etc., that are offset along axis 108 to produce offset regions at the image plane.

In some embodiments, instead of a separate modulating element array 102, the microlenses in microlens array 104 may be modified to modulate a property of light. For example, microlenses with different optical characteristics may be interleaved in the microlens array 104. As another example, microlenses in the microlens array 104 may be differently shifted either parallel to axis 108 or perpendicular to the axis 108, to modulate a property of light at the microlens array.

Various different types of elements may be used in modulating element array 102, depending at least in part on the property of light that is to be modulated. For example, the elements may be filter elements (e.g., color filters, neutral density filters, polarization filters, etc.), glass elements with different optical properties (e.g., glass with different refractive indexes), aperture or masking elements (e.g., different interleaved apertures at the microlenses), or any other type of element that may be used to affect a property or properties of light. Also, modulating element array 102 may interleave two, three, four, or more elements that modulate a given property of light differently, for example two, three, four or more different neutral density filters. Note that, in some applications, one of the interleaved elements may be a "null" element, that is an element that does not affect the property; for example, one of the elements in a neutral density filter array may allow light to pass through the element without affecting the light. Note that this may be accomplished by leaving the position of the element empty, or by using a piece of glass that does not affect the light much or at all.

In addition, each element in modulating element array 102 may affect light differently, or alternatively two or more elements in modulating element array 102 may affect light in the same way, while being arranged with other elements that affect light differently. For example, a neutral density filter array located proximate to the main lens 102 may include four different filters that each filter differently, or four filters, where two filter the same, and the other two filter at a different level.

While FIG. 2 shows the modulating element array 102 and the elements thereof as essentially square, the array 102 and/or the elements in the array 102 may be of other geometric shapes, for example rectangular, circular, hexagonal, triangular, and so on.

Figure 3A:
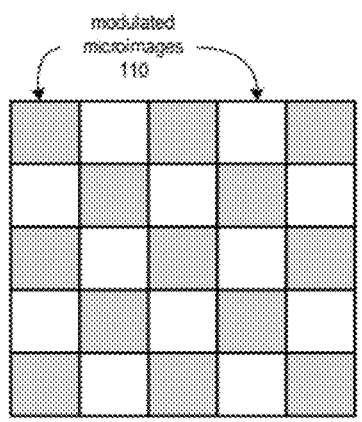
FIGS. 3A and 3B graphically illustrate different ways that a property of light may be modulated in a flat captured via embodiments as described in relation to FIG. 2.
Figure 3B:
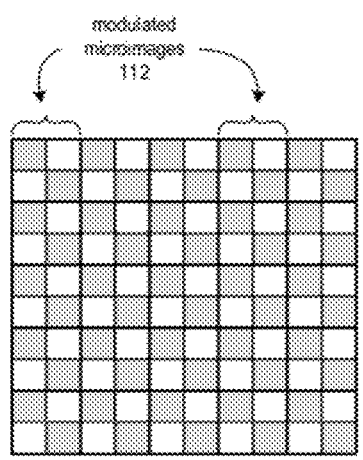

FIGS. 3A and 3B graphically illustrate different ways that a property of light may be modulated in a flat captured via embodiments as described in relation to FIG. 2. For simplicity, only two different alternating modulating elements are assumed. In addition, a square main camera aperture is assumed so that the microimages are essentially square. FIG. 3A shows how a flat is captured using an embodiment that employs different modulating elements or other modulating techniques at or proximate to the microlens array 102. This technique generates alternating microimages in the flat, each captured according to a respective modulating element. FIG. 3B shows how a flat is captured using an embodiment that employs different modulating elements or other modulating techniques at or proximate to the main lens 100. This technique generates microimages that each includes differently modulated portions. For example, if the modulating element array 102 includes four modulating elements, each microimage will include four modulated portions.

Figure 4:
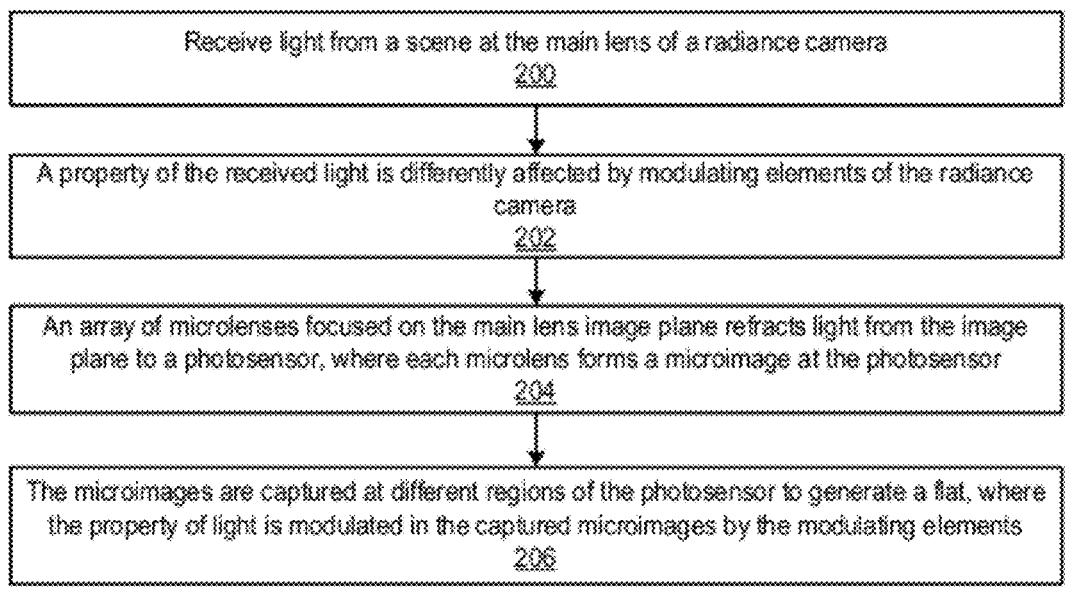
FIG. 4 is a flowchart of a general method for capturing rich image data with focused plenoptic camera technology and different optical elements that modulate properties of light, according to at least some embodiments.

FIG. 4 is a flowchart of a general method for capturing rich image data with focused plenoptic camera technology and different optical elements that modulate properties of light, according to at least some embodiments. As indicated at 200, light from a scene is received at the main lens of the radiance camera. The received light is refracted by the main lens to an image plane. As indicated at 202, a property of the received light is differently affected by modulating elements of the radiance camera. The modulating elements may be implemented according to several different techniques, as described elsewhere in this document. As indicated at 204, an array of microlenses focused on the image plane formed by the main lens refracts light from the image plane to a photosensor. Each microlens forms a microimage at the photosensor. As indicated at 206, the microimages are captured at different regions of the photosensor to generate a flat. The property of light is modulated in the captured microimages by the modulating elements, for example as illustrated in FIG. 2A or 2B.

Embodiments of the radiance camera may be generally described and illustrated using the example of high dynamic range (HDR) imaging. For HDR imaging, one multiplexing technique employs a microlens array with different light-gathering capabilities provided by interleaved optical elements (e.g., different microlens apertures on the microlenses or different neutral density filters in a neutral density microfilter array). Another multiplexing technique for HDR imaging employs an array of optical elements, for example neutral density filters, at or proximate to the main lens or camera aperture.

Embodiments of a radiance camera as described herein may follow an approach of allocating pixels spatially, i.e., embodiments capture a single exposure (referred to as a flat) that contains sets of pixels that have been exposed to different optical settings. This approach is developed in the context of the focused plenoptic camera, which provides higher resolution as well as other benefits when compared to conventional techniques.

High Dynamic Range (HDR) Imaging Example
Conventional HDR Imaging with Multiple Exposures In the conventional multiple exposure technique for HDR imaging, the same scene is photographed multiple times, at different exposure times/aperture values, with the goal of capturing dark as well as bright areas at the right levels, in different frames. Since digital sensors are essentially linear, the result is a set of images, each captured at a different slope in the conversion of radiant energy into pixel value.

Next, these pixel values are merged into one single floating point image with extended dynamic range. In the simplest case, the final image is composed of piecewise linear transfer curves at different slopes. The method of merging can be cast into a constrained optimization problem depending on the final goal for appearance of the image. In the limit of a large number of input images, the merged image is logarithmic. The above may be combined with tone mapping or other HDR compression techniques designed to produce a low dynamic range output image while preserving contrast and image details for the purpose of display.

The conventional multiple exposure technique for HDR imaging generally works well for static scenes. However, the technique does not work well, or may fail completely, for moving scenes, as the scene may change between each exposure.

Image Capture Using Focused Plenoptic Camera Technology and Interleaved Optical Elements In the case of a moving scene, pixels must be allocated spatially because multiple exposures cannot be taken at different times. A plenoptic camera captures multiple views of the same scene. By appropriately filtering those views, a plenoptic camera can be made to capture multiple different exposures of a scene at the same time. With the focused plenoptic camera, different views are captured by different microlenses. Different views can therefore be separately filtered in a focused plenoptic camera, for example by filtering at the microlenses or by filtering at the main lens.

Figure 5:
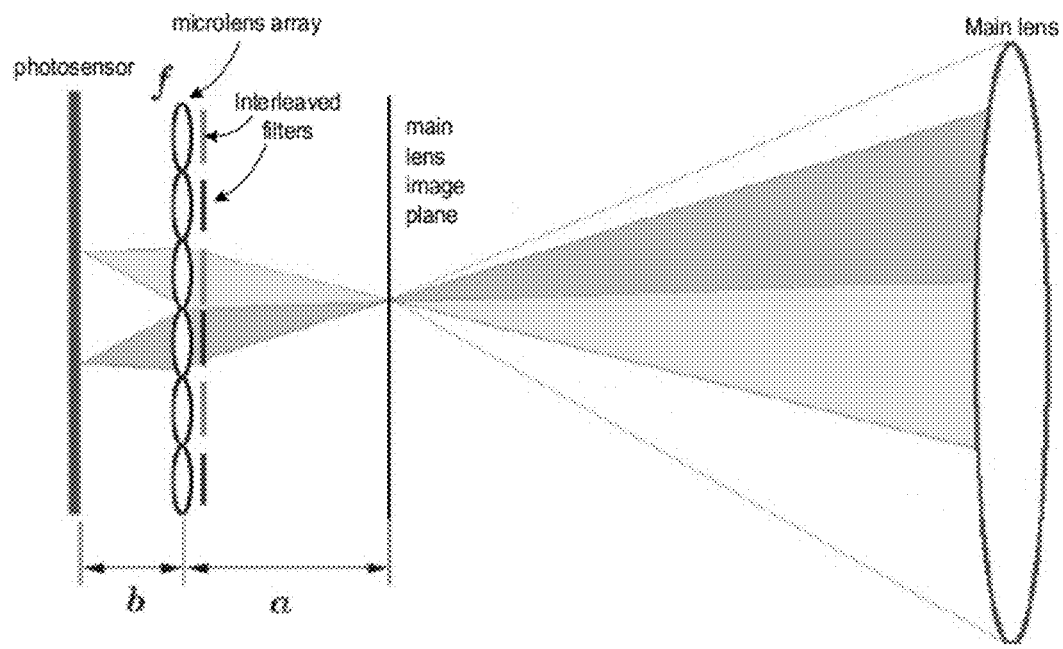
FIG. 5 illustrates a radiance camera, according to some embodiments, implementing focused plenoptic camera technology with interleaved filters at the microlens apertures.

Image Capture Using Focused Plenoptic Camera Technology with Interleaved Optical Elements at the Microlens Array FIG. 5 illustrates a radiance camera, according to some embodiments, implementing focused plenoptic camera technology with interleaved filters at the microlens apertures; the camera is illustrated as a relay system. To obtain an HDR image of a moving scene using multiple exposures requires that all images be taken at the same time—a capability that focused plenoptic camera technology provides optically. The main lens of the focused plenoptic camera forms an image at its image plane. An array of microlenses placed behind that plane maps the image from the image plane to the photosensor. Each microlens creates its own small image (referred to as a microimage) of part of the scene as seen through the main lens aperture. The main lens aperture defines the shape and size of the microimages; for example, a rectangular main lens aperture results in rectangular microimages, and a circular main lens aperture results in circular microimages. In some embodiments, a circular aperture may be used. However, a circular aperture results in substantially circular microimages, which may waste some space on the photosensor. Thus, in some embodiments, a rectangular or square aperture may instead be used, which may allow more of the photosensor to be utilized. In other words, each microlens works as a microcamera. A neutral density (ND) filter placed in front of a microlens determines the image exposure for the respective microimage. Different ND filters placed in front of different microlenses may thus be used to determine different exposures in different microimages.

Figure 11A:
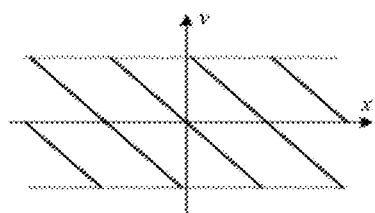
FIGS. 11A through 11C illustrate the phase space diagrams of lightfield capture using focused plenoptic camera technology, according to various embodiments.
Figure 11B:
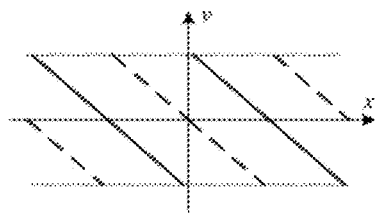
Figure 11C:
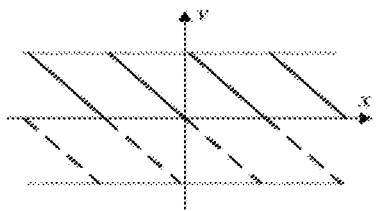

FIGS. 11A through 11C illustrate the phase space diagrams of lightfield capture using focused plenoptic camera technology, according to various embodiments. The space and angle coordinates at the main lens image plane are denoted as x and v, respectively. The phase space diagram of a basic focused plenoptic camera is shown in FIG. 11A, the phase space diagram of a focused plenoptic camera with interleaved filters at the microlenses is shown in FIG. 11B, and the phase space diagram of a focused plenoptic camera with filters at the main lens is shown in FIG. 11C. Similarly filtered samples are shown as slanted lines in the same line texture (either solid or dashed). The image formed behind each microlens samples the plenoptic function at the main lens image plane. Sampling is done in a tilted fashion defined by the optical transfer matrices of the system. Embodiments may adjust these parameters such that images in the microlenses overlap, i.e. the same x coordinate corresponds to two or more images. Also, by placing neutral density (ND) filters at or on the microlenses or at the main lens, embodiments interleave different types of sampling as shown with the dashed and solid slanted lines in FIGS. 11B and 11C. A simple modulation scheme with just two different filters is shown; however, embodiments may employ more than two different filters.

In focused plenoptic camera technology, the main lens image is formed at distance a in front of the microlenses. A distance b to the sensor is appropriately adjusted and fixed, so that the lens equation is satisfied:

$$\frac{1}{a} + \frac{1}{b} = \frac{1}{f}, \tag{1}$$

with the main lens image placed at distance a. Fine tuning these distances can make the captured image N times smaller than the main lens image, where:

$$N = \frac{a}{b}. \quad (2)$$

A more detailed analysis of this will be given later. Here, it is noted N>2 is selected so that every point in the scene is seen at least two times, through different filters.

Figure 6:
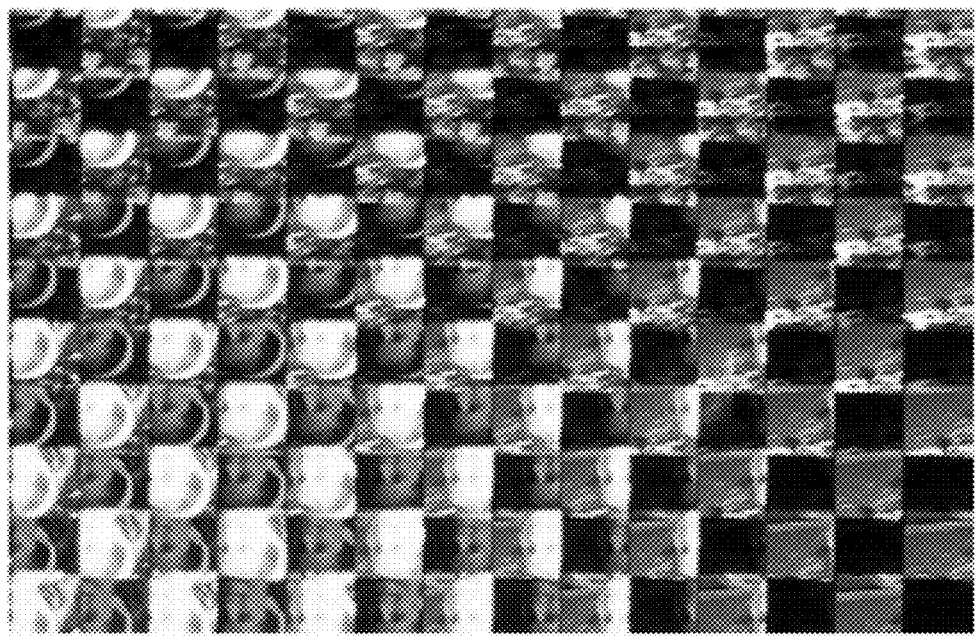
FIG. 6 illustrates an example of multiple captures of an image by microlenses with different apertures or filters, according to some embodiments.

FIG. 6 illustrates an example of multiple captures of an image by microlenses with different apertures or filters, according to some embodiments. Notice the alternating brightness effect in different microimages due to alternating aperture size or filtering applied at the microlenses. In FIG. 6, a crop from an array of microimages (a flat) created by the microlenses with filters at the microlenses is shown. Since different microlens filters are interleaved, respectively bright and dark microimages are observed, each with the shape of the main lens aperture. This is the pattern in the phase space diagram shown in FIG. 11B. Also, note that a rectangular or square main lens aperture is utilized so that the microimages are rectangular and tile together with little loss of space between them, thus utilizing more of the photosensor than would a circular aperture.

In at least some embodiments, the microimages may be reduced in size relative to the focal plane image. The reduction is by a factor of N, which in some embodiments may be between 2 and 5, although other values may be used for N. Experiments can be performed in which it can be observed that these microimages are very sharp, with resolution limited only by the size of the pixels used in the sensor. Due to their small sizes, microlenses may be diffraction limited even at apertures as low as F/4. Because of this, typical focused microimages are optically extremely sharp, with resolution 1:22λF, where λ is the wavelength and F is the focal ratio.

Considering that an image reduction factor of 2 or greater is used, the camera as a whole is close to diffraction limited in the case of a wide range of main camera lenses. Typically the main camera lens may have a relatively poor modulation transfer function, blurring the image by a related factor. However, due to reduction in size of the image as a whole by a factor of N in the microcameras, this blur radius is mapped into several times smaller blur radius. At great reduction in size, the only limitation is the diffraction blur in the microlens imaging.

In embodiments, exposure may be modified based on changing microlens apertures. For scenes of great variation in dynamic range, very high F-numbers would be needed for some of the microlenses in order not to overexpose pixels. The problem with such small apertures is that a limitation is reached due to diffraction. Above F/16, apertures create diffraction blur larger than the typical pixel size (e.g., 6.8 μm).

Therefore, some embodiments may use neutral density (ND) filters in front of individual microlenses. The atomic layers of chromium in the filter that are blocking the light have structures smaller than the wavelength λ, so the light wave effectively does not see them. Some embodiments may interleave filters with transmission of 100% (1) and 6.25% (1/16) in a checkerboard pattern. Other patterns and/or transmission levels may be used.

Figure 9:
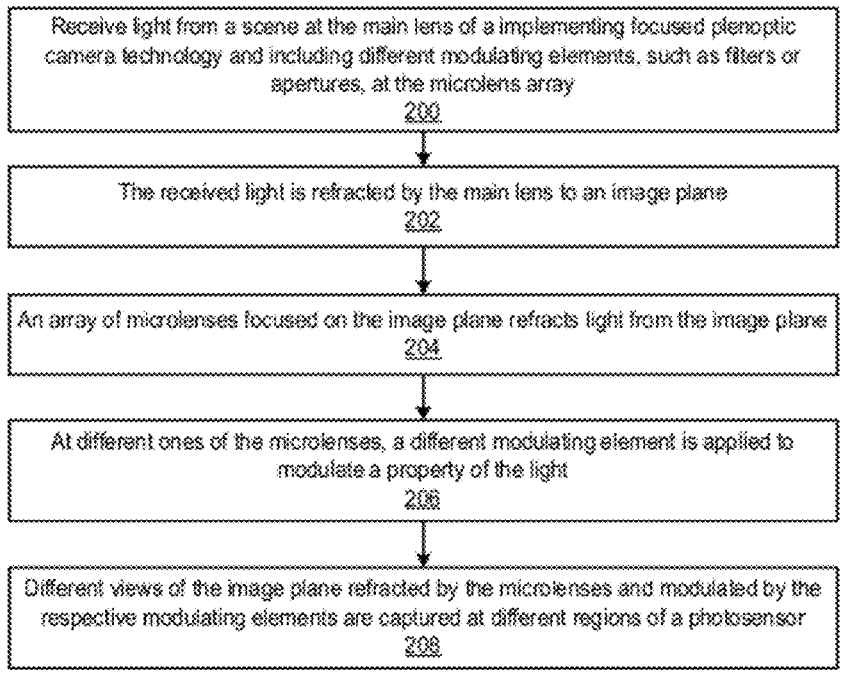
FIG. 9 is a flow chart illustrating how light is directed within a radiance camera implementing focused plenoptic camera technology and including different modulating elements, such as filters or apertures, at the microlens array, such as the radiance camera illustrated in FIG. 5, according to some embodiments.

FIG. 9 is a flow chart illustrating how light is directed within a radiance camera implementing focused plenoptic camera technology and including different modulating elements, such as filters or apertures, at the microlens array, such as the radiance camera illustrated in FIG. 5, according to some embodiments. As indicated at 200, light from a scene is received at the main lens of the radiance camera. As indicated at 202, the received light is refracted by the main lens to an image plane. As indicated at 204, an array of microlenses, the microlenses of which are focused on the image plane, refracts light from the image plane. As indicated at 206, at different ones of the microlenses, a different modulating element is applied to modulate a property of the light. As indicated at 208, different views of the image plane refracted by the microlenses and modulated by the respective modulating elements are captured at different regions of a photosensor to generate a flat. The flat includes one microimage for each microlens in the microlens array; the property of light is modulated in each microimage according to the respective modulating element.

Figure 7:
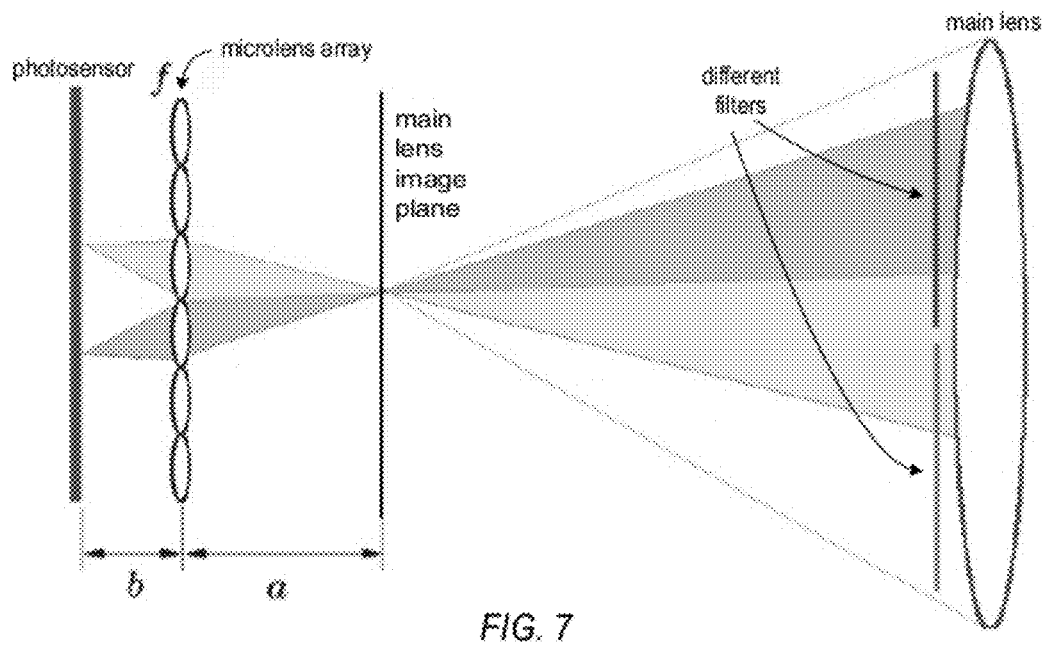
FIG. 7 illustrates a radiance camera, according to some embodiments, implementing focused plenoptic camera technology with heterogeneous filters (or other optical elements) at the main camera lens.

Image Capture Using Focused Plenoptic Camera Technology with Hetereogeneous Optical Elements at the Main Lens FIG. 7 illustrates a radiance camera, according to some embodiments, implementing focused plenoptic camera technology with hetereogeneous filters (or other optical elements) at the main camera lens; the camera is illustrated as a relay system. In this technique for modulating a property of light, one copy of the repeated pattern filters (or other optical elements) may be placed proximate to the main lens, for example at the main lens aperture, instead of placing one filter (or other optical element) at each microlens as in the previously described technique. This technique may be easier to implement than the technique that uses interleaved optical elements at the microlenses because the size of the optical elements in the modulating element array are much larger, on the order of millimeters, and can be more easily manipulated. Considered at one group of microlenses, the light modulation pattern would be similar to that in the microlens filter design.

In the phase space diagram shown in FIG. 11C, it can be seen how this technique is different than the technique shown in FIG. 11B. In FIG. 11C, each sampled microimage is shown as a tilted line in optical phase space. Similarly filtered samples are shown as slanted lines in the same line texture (either solid or dashed). Simple modulation using only two filters is shown. In FIG. 11C, each captured microimage contains the entire pattern created by the filters at the main lens imprinted on it. Thus, while in the technique that uses interleaved optical elements at the microlenses the pattern of k elements is spread over k microlenses, in this technique the whole pattern is visible in each microimage.

Figure 8:
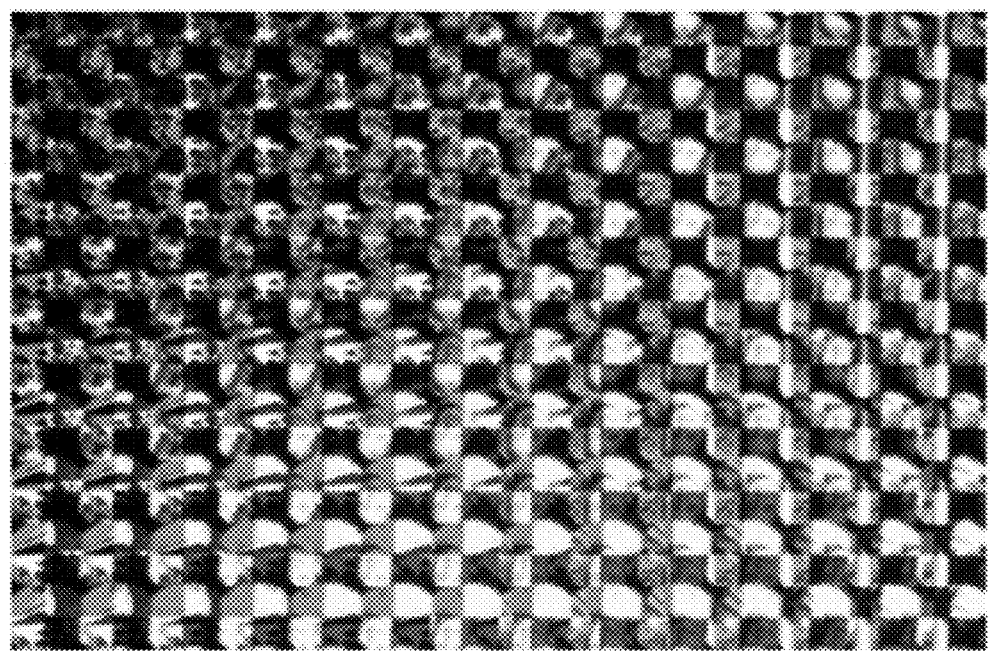
FIG. 8 illustrates an example of multiple captures of an image by a radiance camera with four different filters at the main lens, according to some embodiments.

FIG. 8 illustrates an example of multiple captures of an image by a radiance camera with four different filters at the main lens, according to some embodiments. The alternating brightness effect is seen in each microimage; each microimage is sharply split into four parts. In FIG. 8, a crop from an array of microimages (a flat) created by the microlenses when using four filters at the main lens aperture. The four bright and dark areas within each microimage can be observed. Compare this with the phase space diagram shown in FIG. 11C. The change of pattern appears twice as fast compared to a similar image captured with interleaved filters at the microlenses, as shown in FIG. 6. Also, note that a rectangular or square main lens aperture is utilized so that the microimages are rectangular and tile together with little loss of space between them, thus utilizing more of the photosensor than would a circular aperture.

Figure 10:
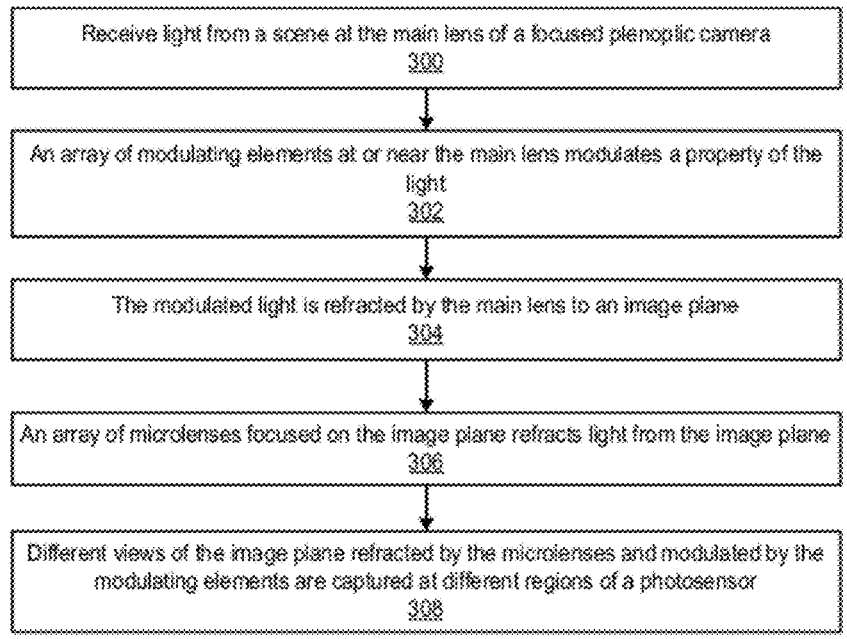
FIG. 10 is a flow chart illustrating how light is directed within a radiance camera implementing focused plenoptic camera technology and including different modulating elements, such as filters, at the main lens, such as the radiance camera illustrated in FIG. 7, according to some embodiments.

FIG. 10 is a flow chart illustrating how light is directed within a radiance camera implementing focused plenoptic camera technology and including different modulating elements, such as filters, at the main lens, such as the radiance camera illustrated in FIG. 7, according to some embodiments.

As indicated at 300, light from a scene is received at the main lens of the radiance camera. As indicated at 302, an array of modulating elements at or near the main lens modulates a property of the light. As indicated at 304, the modulated light is refracted by the main lens to an image plane. As indicated at 306, an array of microlenses, the microlenses of which are focused on the image plane, refracts light from the image plane. As indicated at 308, different views of the image plane refracted by the microlenses and modulated by the modulating elements at or near the main lens are captured at different regions of a photosensor to generate a flat; the flat includes one microimage for each microlens in the microlens array. Each microimage incorporates a separate region corresponding to one of the modulating elements in the modulating element array.

Resolution Analysis

In focused plenoptic camera technology used in embodiments of a radiance camera as described herein, the microlenses are not focused on the main camera lens as in a conventional plenoptic camera, but are instead focused on the main camera lens image plane. Therefore, structures at the main lens aperture may be blurred in each microimage, but the image of the scene at the image plane will be sharp. Using conventional plenoptic camera technology, where the microlenses are focused at the main camera lens (or at infinity) and not at the main image plane, structures at the main lens aperture would be sharp, but the image of the scene at the image plane will be blurred. Thus, there are the following tradeoffs, which will be quantified below:

- Focus the microlenses on the main image. Filter boundaries will be blurry, but the image of the scene will be sharp. The ability to distinguish the filtering for particular pixels may be limited.
- Focus the microlenses on the main lens. Filter boundaries will be sharp, but the image of the scene blurry. Overall image resolution will be limited.

Figure 12:
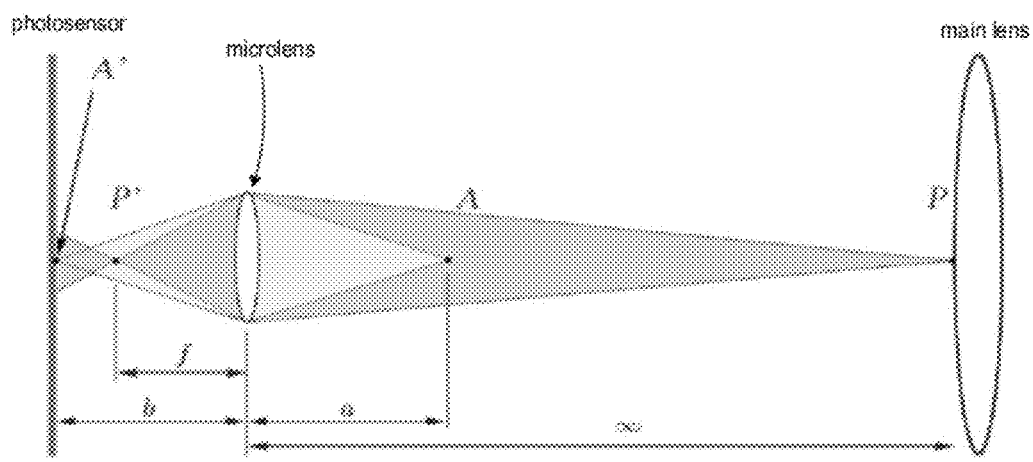
FIG. 12 shows a plenoptic camera system and illustrates that a point P on the main lens aperture (at optical infinity) is imaged to point P' behind the microlens and creates a circle of confusion on the sensor, while a point A from the main lens image is imaged to A' exactly on the sensor.

To quantify these trade-offs, the main lens aperture blur as it appears in a microlens image may be estimated. Consider the camera system in FIG. 12. As in the conventional plenoptic camera, microlenses are small and the main lens can be assumed to be at optical infinity. The main lens aperture P is imaged from optical infinity to P', a distance f behind each microlens, while the image of the scene is formed at distance b behind the microlens, where the sensor is located. FIG. 12 illustrates that a point P on the main lens aperture (at optical infinity) is imaged to point P' behind the microlens and creates a circle of confusion on the sensor. At the same time, a point A from the main lens image is imaged to A' exactly on the sensor. Of interest is the blur caused by this misfocus of the main lens aperture.

Using the lens equation in Newton's form:

$$(a-f)(b-f)=f^2, \quad (3)$$

the distance between the image of the scene and the image of the main aperture is:

$$b - f = \frac{f^2}{a-f}. \quad (4)$$

Assuming microlenses have microapertures of diameter d, the diameter of the circle of confusion for the image of the main aperture would be:

$$\Delta = \frac{f^2}{a-f} \frac{d}{f}. \quad (5)$$

From the lens equation (1):

$$\Delta = \frac{bd}{a}. \quad (6)$$

Another useful expression for equation (6) is in terms of the magnification factor N=a/b:

$$\Delta = \frac{d}{N}. \quad (7)$$

The upper limit of this blur is:

$$\Delta < \frac{d}{2},$$

which corresponds to the minimal applicable N=2. A typical blur that is obtained with embodiments is at around N=5, which would be about 3 pixels considering example parameters that may be used.

Note that this blur is only at the boundaries between filtered regions in each microimage and so only a small percentage of pixels become unavailable for use in reconstructing the final image. Also note that, in terms of such blur, embodiments are at least 2 times better than a camera using an array of pinholes, which has blur of no less than the pinhole diameter Δ=d.

A similar calculation shows that if the microlenses are focused on the main lens aperture, the blur of the image of the scene will be of approximately the same amount:

$$\Delta = \frac{d}{N+1}. \quad (8)$$

However, now the blur is across the entire microimage.

This analysis shows that focusing on the image has significant advantages over focusing on the main lens. When focusing on the image, a few pixels are lost at the filter edges, but the image itself is sharp. The loss in pixel count in some embodiments is about 10%. However, this loss can be compensated by computing the influence of defocus blur of the filters on individual pixel values at the filter image boundaries, and restoring their "unmixed" values. On the other hand, if the microlenses are focused on the main lens aperture, the filter edge boundaries are sharp, but the image itself is blurred. For example, a 3 pixel blur would be equivalent to 3×3=9 times lower resolution in terms of pixel count. The difference in resolution is fundamental to these two methods, with significantly better resolution provided by focusing on the image.

Thus, using focused plenoptic camera technology for rich image capture makes efficient use of sensor pixels. For example, without any optimization for pixel usage, an example embodiment of a radiance camera using focused plenoptic camera technology produces 1.3 megapixel images (1,300×1,000 pixels) that are provided as example images (see FIGS. 14A-14C, 15A-15C, 17A-17F, and 18A-18B).

The images may be slightly blurry, but this is due to the particular optics used in this implementation and is not a fundamental constraint of the imaging model. With careful camera design a factor of k reduction in the total sensor resolution when capturing k modes may be achieved. As an example, using a 39 megapixel sensor, four separate modes could be captured at 9 megapixels each.

Note that a focused plenoptic rendering technique could be applied to the conventional plenoptic camera if the main lens image is appropriately spaced from the microlenses. However because the microlenses are defocused in the conventional plenoptic camera design, this image would necessarily be blurred. Additional resolution could be achieved by deblurring (e.g., with deconvolution techniques). However, there remains a fundamental difference between the conventional plenoptic camera and the focused plenoptic camera. In the focused plenoptic camera, the sensor plane is conjugate to the object plane, while in the conventional plenoptic camera it is not. In the case of specular highlights (or other non-Lambertian scenes), there is a difference between main lens filtering and microlens filtering. From FIG. 11B, it can be seen that for large N the configuration with filters at the microlenses will sample densely in the angular dimension, meaning it will work well for non-Lambertian/specular scenes as well as for other plenoptic rendering tasks such as refocusing. The configuration with filters at the main lens (FIG. 11C) always has certain views tied to certain filters and so cannot take advantage of large numbers of views in the same way.

Rendering

Figure 13A:
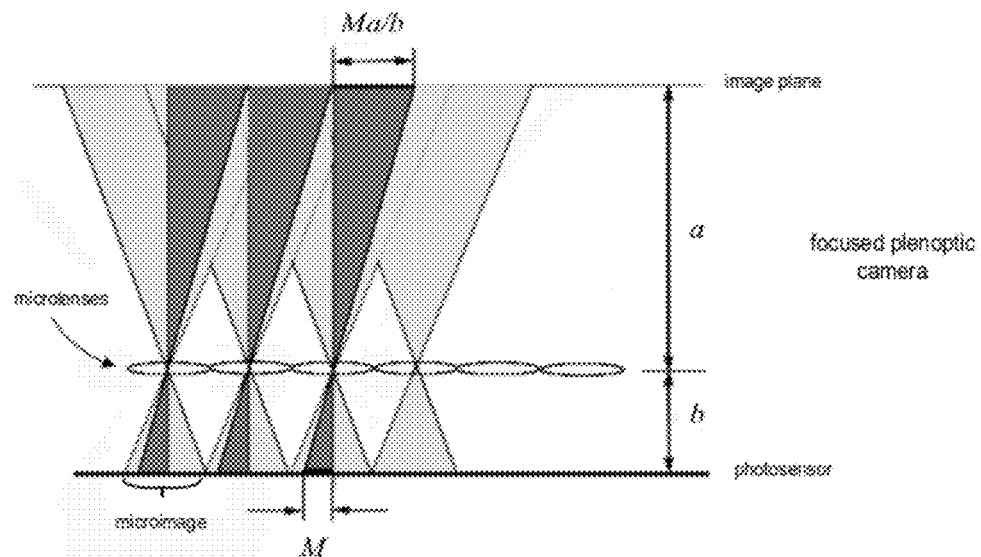
FIGS. 13A through 13C illustrate the geometry of image capture for various rendering approaches, according to various embodiments.
Figure 13B:
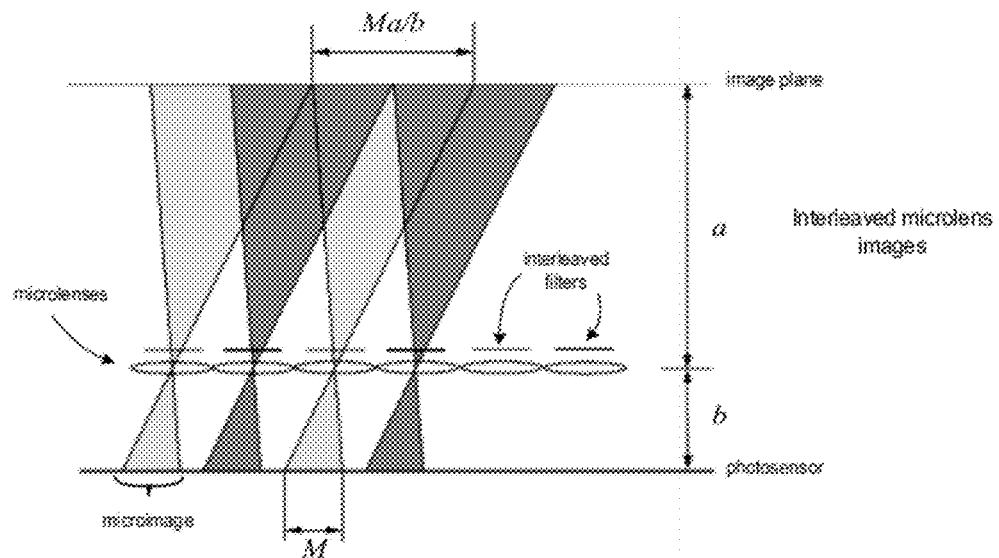
Figure 13C:
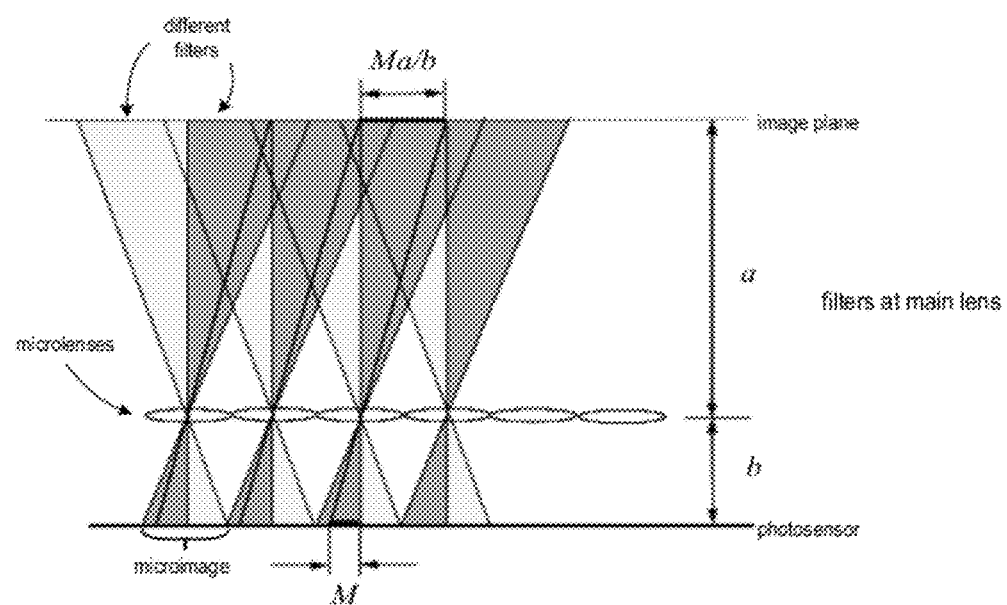

FIGS. 13A through 13C illustrate the geometry of image capture for various rendering approaches, according to various embodiments. Geometry of image capture for basic focused plenoptic camera image rendering is shown in FIG. 13A. Geometry of a radiance camera implementing focused plenoptic camera technology and interleaved filters at the microlenses is shown in FIG. 13B. Geometry of a radiance camera implementing focused plenoptic camera technology and heterogeneous filters at the main camera lens is shown in FIG. 13C.

Figure 51:
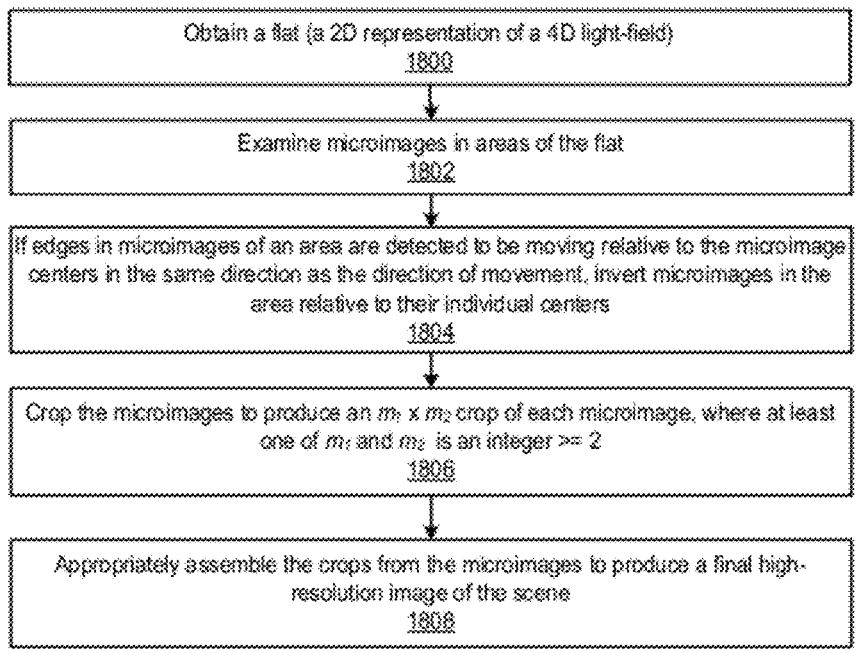
FIG. 51 is a flowchart of a full-resolution light-field rendering method for assembling microimages from flats captured by focused plenoptic camera technology according to some embodiments.
Figure 52:
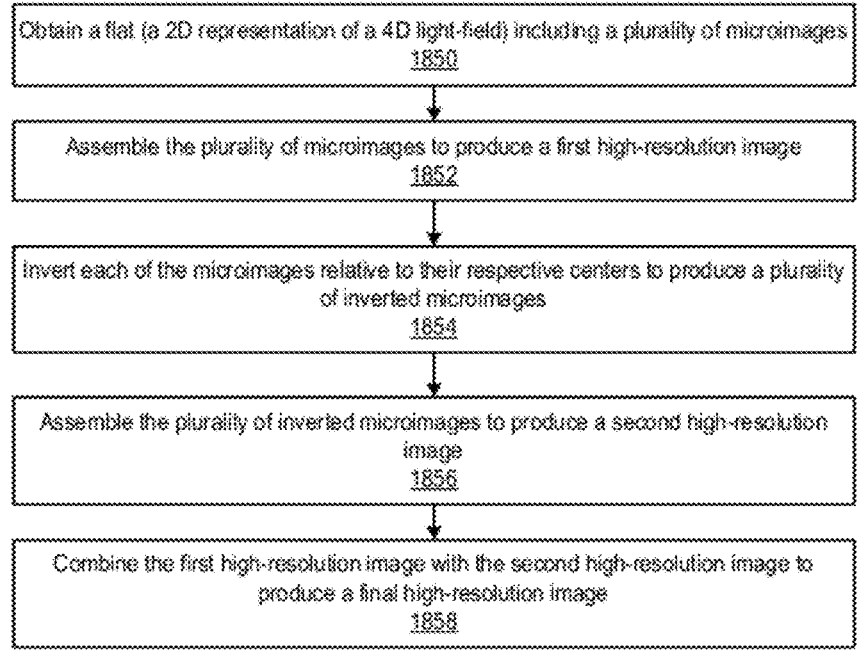
FIG. 52 is a flowchart of a full-resolution light-field rendering method for assembling microimages from flats captured by focused plenoptic camera technology in which multiple images are rendered from a flat and combined to produce a final high-resolution output image, according to some embodiments.

To make rich image data captured by the radiance camera available for subsequent processing, embodiments may render separate images for each independently captured mode, where the separate images are each rendered using a focused plenoptic rendering technique. FIGS. 51 and 52 show examples of rendering techniques for rendering images from flats captured using focused plenoptic camera technology. Additional rendering techniques that may be used are illustrated in FIGS. 47 through 50. In an example basic focused plenoptic rendering algorithm, the captured radiance is represented as a 4D array. The basic focused plenoptic rendering algorithm is fairly straightforward—the algorithm simply chooses samples to generate a view. The algorithm selects contiguous samples of size M from each microimage, spaced at equal distances, and patches them together to generate a view. This process is shown in phase space in FIGS. 11A-11C and geometrically in FIGS. 13A-13C. However, the basic rendering approach may result in artifacts between extracted samples when the samples do not exactly match at their boundaries (due, e.g., to parallax, incorrect scaling, or optical variations between microcameras). Rendering approaches that may reduce or eliminate these artifacts are possible and contemplated.

In embodiments of the radiance camera, different techniques for expanding the range of plenoptic data that can be sampled within a single exposure using focused plenoptic camera technology and different optical elements that modulate properties of light may be applied. Images (flats) captured using various embodiments of the radiance camera may be used, for example, in high dynamic range (HDR) imaging, spectral imaging, polarization imaging, 3D imaging, and other imaging applications. Note that rendering images from flats captured with a radiance camera configured for different ones of these properties of light may involve at least some processing specific to the respective property.

Rendering Images Captured Using Interleaved Filters at the Microlenses

In some embodiments, to render separate images when using a radiance camera that includes interleaved filters at the microlenses, the focused plenoptic rendering algorithm may be modified to accommodate the allocation of pixels to different images. In the case of interleaved filters, there are essentially interleaved plenoptic images. Therefore, at least some embodiments may render the final image by applying the basic focused plenoptic rendering to sets of associated microlens images. This process is shown in phase space in FIG. 13 and geometrically in FIG. 18.

FIGS. 14A through 14C show two bracketed images rendered from a single exposure (flat) captured using a radiance camera that includes interleaved filters at the microlenses, and a final tone-mapped HDR image rendered from the bracketed images. In FIGS. 14A and 14B, the two bracketed images have been patched together according to a focused plenoptic camera rendering method. The radiance camera used to capture the raw exposure (the flat) in this example interleaves unfiltered apertures and filtered apertures at the microlenses. FIG. 14A shows the image generated from the microimages captured using unfiltered apertures, and FIG. 14B shows the image generated from the microimages captured using filtered apertures. The neutral density filter used in this example reduces light by a factor of 16, thus producing the darker image in FIG. 14B in which more detail in brightly lit areas can be seen than can be seen in the unfiltered image of FIG. 14A. FIG. 14C shows the bracketed images of FIGS. 14A and 14B merged to generate a final HDR image, for example using an image processing application such as Adobe® Photoshop®, or alternatively using a rendering technique as illustrated in FIGS. 47 through 50.

Rendering Images Captured Using Filters at the Main Lens

To render separate images from flats captured using embodiments of a radiance camera that employ filters at or near the main lens, a focused plenoptic rendering algorithm may be modified to accommodate the allocation of pixels to different images. As with the previous case, there may be interleaved plenoptic images, but the interleaving is within microlens images (microimages), for example as shown in FIGS. 3B and 8. Therefore, the final image may be rendered by applying basic focused plenoptic rendering (see, e.g., FIGS. 51 and 52) to specific portions of each microlens image. This process is shown in phase space in FIG. 13 and geometrically in FIG. 18.

FIGS. 15A through 15C show two bracketed images rendered from a single exposure (flat) captured using a radiance camera that includes heterogeneous filters at the main lens, and a final tone-mapped HDR image rendered from the bracketed images. In FIGS. 15A and 15B, the two bracketed images have been patched together according to a focused plenoptic camera rendering method. The radiance camera used to capture the raw exposure (the flat) in this example filters part of the main lens while leaving the other part unfiltered. FIG. 15A shows the image generated from portions of the microimages that are unfiltered, and FIG. 15B shows the image generated from other portions of the microimages that are filtered. The neutral density filter used in this example reduces light by a factor of 16, thus producing the darker image in FIG. 15B in which more detail in brightly lit areas can be seen than can be seen in the unfiltered image of FIG. 15A. FIG. 15C shows the bracketed images of FIGS. 15A and 15B merged to generate a final HDR image, for example using an image processing application such as Adobe® Photoshop®, or alternatively using a rendering technique as illustrated in FIGS. 47 through 50.

Sampling and Reconstructing Modalities or Properties of Light Using the Radiance Camera The various properties or modalities of light that may be captured with embodiments of the radiance camera as described herein each have a structure. For example, in polarization, different polarizing filters may be rotated to certain angles to produce a certain amount of light, which depends on the angle of polarization. The fact that each modality has a particular structure allows a behavior of the modality to be modeled based on just a few captures (captured in a single flat using a radiance camera with modulating elements). For example, using embodiments of the radiance camera with modulating elements that polarize at a given set of angles (e.g., four elements at 45 degree increments of rotation), a set of basic polarization angles can be captured in a flat. After capture, the known properties of polarization can be applied to the captured information from the set of captures (e.g., four different captures) rendered from the flat to compute the basic structure of polarity for the image. As an example, from a single flat captured using four different polarizing filters, the direction of, and amount of, polarization may be determined. Thus, by knowing the structure of a modality or property of light, the radiance camera may be appropriately configured to capture a set of image data in a single flat that modulates the modality, and general information about the modality can be reconstructed from the captured image data via appropriate rendering and processing techniques.

Analysis

Embodiments of a radiance camera that implements focused plenoptic camera technology with modulating elements may enable capturing dynamic in addition to static scenes, as a single exposure (a flat) may be captured instead of multiple exposures. This benefit can only be partially matched with methods performing multiple sampling of each pixel, or methods with variable pixel size, and related methods. The method employed by embodiments is optical, and can be used in combination with other methods.

A comparison of embodiments of the radiance camera described herein with variable size pixel approaches may show some similarities. Both methods are related to loss in resolution proportional to the number of different exposures. While the variable pixel approach has resemblance to the Bayer array approach to color and requires a blurring (anti-aliasing) filter, the method implemented in embodiments of the radiance camera described herein has perfect sharpness, but it produces reduced size image by a factor of N. As a result, resolution loss is equivalent to that of a Bayer array, assorted pixels, or other spatial multiplexing methods. However embodiments of the radiance camera as described herein may provide better quality, similar to the way a Foveon® sensor is better than a Bayer array sensor based on sampling each color at exactly the same location. Effectively, in embodiments of the radiance camera as described herein, assorted pixels are on top of each other, i.e. they differ only in angular and not in spatial coordinates.

Embodiments of a radiance camera as described herein may avoid blooming artifacts that may be present using conventional techniques. Blooming may occur when a pixel is very brightly illuminating, resulting in some charge bleeding over to other pixels. In embodiments of the radiance camera described herein, in cases where a pixel is very brightly illuminated and neighboring pixel values in the photosensor are damaged by blooming, the representation of that same pixel may be picked from another microlens image (microimage) that, for example, was captured using a darker ND filter. For comparison, in some conventional techniques, a pixel with a darker filter will be a direct neighbor of the bright one, thus resulting in blooming artifacts that are not correctable as in embodiments of the radiance camera.

The focused plenoptic camera technology used in radiance cameras as described herein is more flexible than conventional plenoptic camera approaches. Using focused plenoptic camera technology, any type of camera can be converted to, for example, an HDR camera by adding a microlens array on top of the photosensor sensor and appropriate modulating filters. For example, modulating filter array may be placed at or on the main camera lens, as described herein, or alternatively at the microlens array. Thus, photographers do not have to commit to loss in resolution in their cameras in order to capture HDR; instead, they can interchange one functionality with the other on the fly, based on simply changing the modulating filter array, very much like changing the main camera lens.

Example Camera

An example radiance camera according to some embodiments may be based upon a medium format camera with an 80-mm lens and a 39-megapixel digital back. The lens is mounted on the camera with a 13-mm extension tube, which provides the needed spacing a. The microlenses in the microlens array have focal length of 1.5 mm so that they can be placed directly on the cover glass of the sensor. Additional spacing of up to 0.5 mm may be provided to enable fine-tuning of the microlens focus. The pitch of the microlenses is 500 µm with precision 1 µm. The sensor pixels are 6.8 µm. The value of b is approximately equal to 1.6 mm and may be estimated with precision 0.1 mm from known sensor parameters and independently from the microlens images at different F/numbers.

Microlens aperture diameters are 100 µm and 200 µm, interleaved in a checkerboard pattern. Apertures are circular, formed by a black chromium mask deposited on the microlenses. The relatively large pitch of the microlenses is chosen in order to match the F-number of the main camera lens, which can be as low as F/3. This large pitch may be needed because the microlenses in the example camera are at large distance (1.6 mm) from the sensor, defined by the cover glass.

In some embodiments, an array of circular apertures is used, with interleaved diameters, where the ratio in areas is 4. Every other microlens is completely covered with black chromium. Neutral density filters are implemented as 0.5 mm squares made with deposited black chromium of 6% transmission. A pinhead is shown to compare sizes.

Microlens arrays with interleaved neutral density (ND) filters on a separate wafer may also be used. The ND microfilters may, for example, be made with a checkerboard pattern, 100% and 1/16, to achieve dynamic range expansion of 4 stops.

Figure 16A:
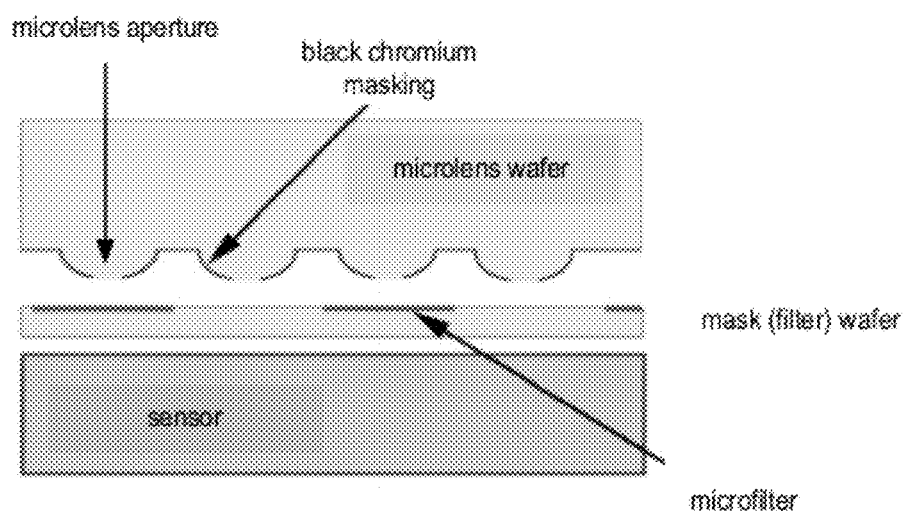
FIG. 16A shows the geometry of a portion of an example microlens array with apertures and individual, interleaved neutral density (ND) micro filters on an example separate mask wafer positioned at a photosensor, according to some embodiments.
Figure 16B:
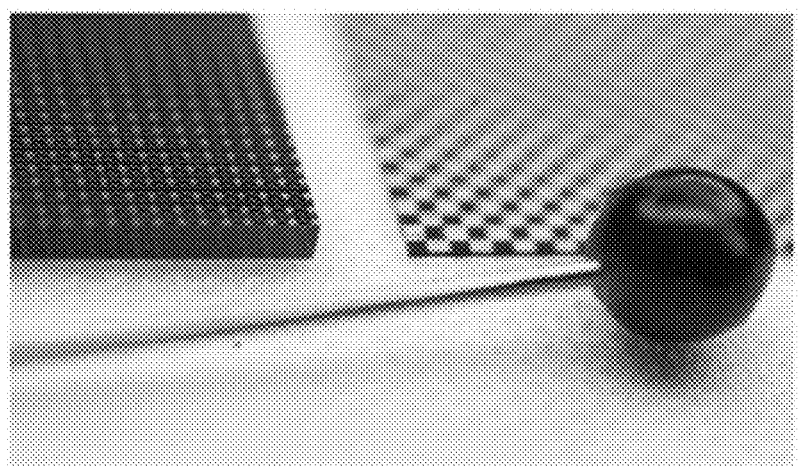
FIG. 16B is a photograph of an example microlens array with apertures and individual, interleaved neutral density (ND) microfilters on an example separate mask wafer.

FIG. 16A shows the geometry of a portion of an example microlens array with apertures and individual neutral density (ND) micro filters on an example separate mask wafer positioned at a photosensor, according to some embodiments. FIG. 16B is a photograph of an example microlens array with apertures (left) and individual neutral density (ND) microfilters on an example separate mask wafer (right). The photograph includes the head of a pin to provide a sense of scale.

In the microlens filter design illustrated in FIGS. 16A and 16B, the use of two separate wafers may increase inter-reflectance and (micro) lens glare. The filter (mask) wafer may reflect light back towards the microlens wafer, which in turn may reflect some of it back. Several inter-reflections may cause lens glare, examples of which can be seen in FIGS. 14B and 15B. In at least some embodiments, to reduce or eliminate this glare, either one or both of the wafers may be coated with an anti-reflectant coating.

Extended Color and Polarization Capture

The use of modulating elements such as filters to capture additional dimensions or types of data in plenoptic cameras is a general idea, and is not restricted to HDR image capture, which is used herein by way of example. Placing modulating elements such as filters at the main lens aperture may have an advantage in that the type of filtering being done can be easily (and economically) changed, simply by replacing a modulating element array with a different modulating element array.

Figure 17D:
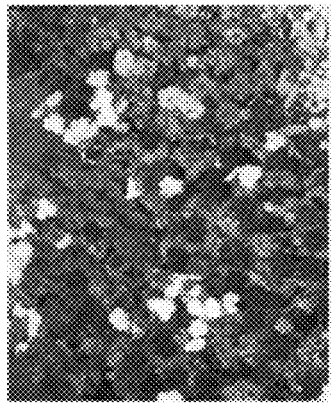
FIGS. 17A through 17F illustrate extended color capture using color filters at the main lens aperture of a radiance camera according to some embodiments.
Figure 17F:
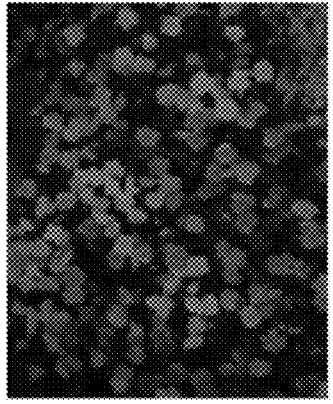
Figure 17C:
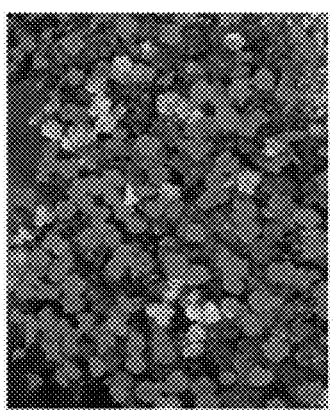
Figure 17E:
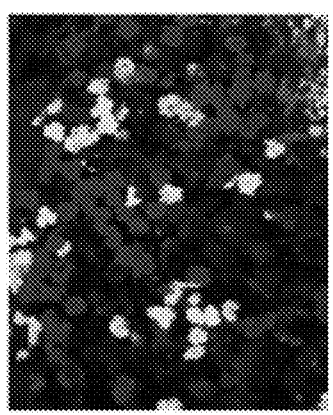
Figure 17A:
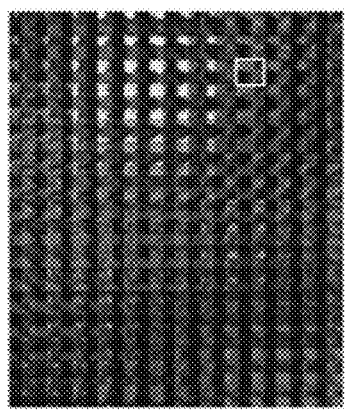
Figure 17B:
Figure 17G:
FIG. 17G is a photograph of the same scene shown in FIGS. 17A through 17F taken with an unmodified camera, for comparison.

FIGS. 17A through 17G and FIGS. 18A and 18B illustrate extended color capture and polarization capture, using color filters and polarization filters, respectively, at the main lens aperture of a radiance camera according to some embodiments. FIGS. 17A through 17F illustrate extended color capture using color filters at the main lens aperture of a radiance camera according to some embodiments. The images have been converted to grayscale for display. With four color filters (e.g., red, green, blue and magenta) in the main lens aperture and a Bayer array as the photosensor technology, 12-channel color imaging is achieved. FIG. 17A shows an example crop from a flat captured with the radiance camera; filter modulation is visible in the microimages, an example of which is shown by the white rectangle. FIG. 17B is a zoom-in to the microimage indicated by the white rectangle in FIG. 17A. It can be seen in FIG. 17B that the microimage includes four differently filtered quadrants. The four color images obtained by assembling appropriate quadrants of microimages captured through the four different filters are shown in FIGS. 17C through 17F (red, green, blue and magenta, respectively). FIG. 17G is a photograph of the same scene taken with an unmodified camera, for comparison.

Figure 18A:
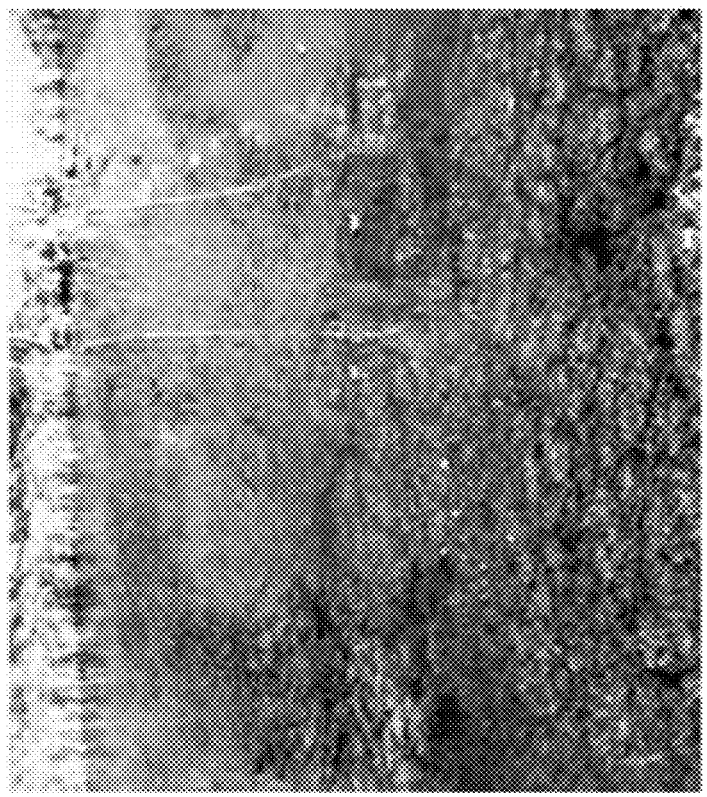
FIGS. 18A and 18B show two images with different polarizations captured at the same time, using two different polarization filters at the main lens aperture of a radiance camera according to some embodiments.
Figure 18B:

FIGS. 18A and 18B show two images with different polarizations captured at the same time, using two different polarization filters at the main lens aperture of a radiance camera according to some embodiments. The images were obtained by assembling appropriate halves of microimages in a single flat captured through the two different polarization filters at the main lens.

Radiance Camera Example Embodiments

Various embodiments of a radiance camera employing focused plenoptic camera technology and modulating elements have been described that provide rich image capture, for example by employing interleaved filters at or near the microlens array or different filters or other optical elements at or near the main lens. As an example, HDR imaging with a radiance camera that employs focused plenoptic camera technology and interleaved apertures at the microlens array has been described. In the described example, dynamic range is extended only by a factor of 4; however, larger factors can be chosen and implemented, potentially with more than two types of apertures. However, a much greater factor of extending the dynamic range is difficult to achieve with apertures alone because too small of apertures create diffraction blur. A solution has been presented in which interleaved neutral density filters with differing filtering factors are used at the microlenses without interleaving apertures (i.e., all the apertures are the same size), as this does not create additional diffraction. Using this solution, dynamic range can be extended farther by applying appropriately selected neutral density filters; since the apertures are not reduced, diffraction is not increased.

In addition, embodiments of a radiance camera employing focused plenoptic camera technology and modulating elements that provides extended color capture and polarization capture have been described. Embodiments of a radiance camera that employs focused plenoptic camera technology and appropriate modulating elements may be similarly implemented to capture various other modalities of the plenoptic function. Embodiments of the radiance camera, via appropriate modulating elements, may capture a wide variety of properties of light differently in different microimages or in different portions of microimages. Luminance, color, and polarization have been given as examples. Other examples may include, but are not limited to, focal length, 3D information, super-resolution information, and generally any modality of the plenoptic function.

In addition, different techniques for providing modulation of a property of light have been introduced. For example, a technique in which modulating optical elements are provided at or near the main lens, a technique in which modulating optical elements are provided at or near the microlens array, a technique in which the main lens itself is manufactured or modified to provide modulation, and a technique in which the microlenses in the microlens array are modified to provide modulation have been introduced.

FIGS. 19A through 27 provide various examples of radiance cameras employing focused plenoptic camera technology and various examples and configurations of modulating elements that may be used in such radiance cameras. However, these examples are not intended to be limiting; the radiance camera employing focused plenoptic camera technology and modulating elements is a general architecture that can be variously implemented to capture a wide range of modalities of the plenoptic function; this is what is meant by rich image capture.

Figure 19A:
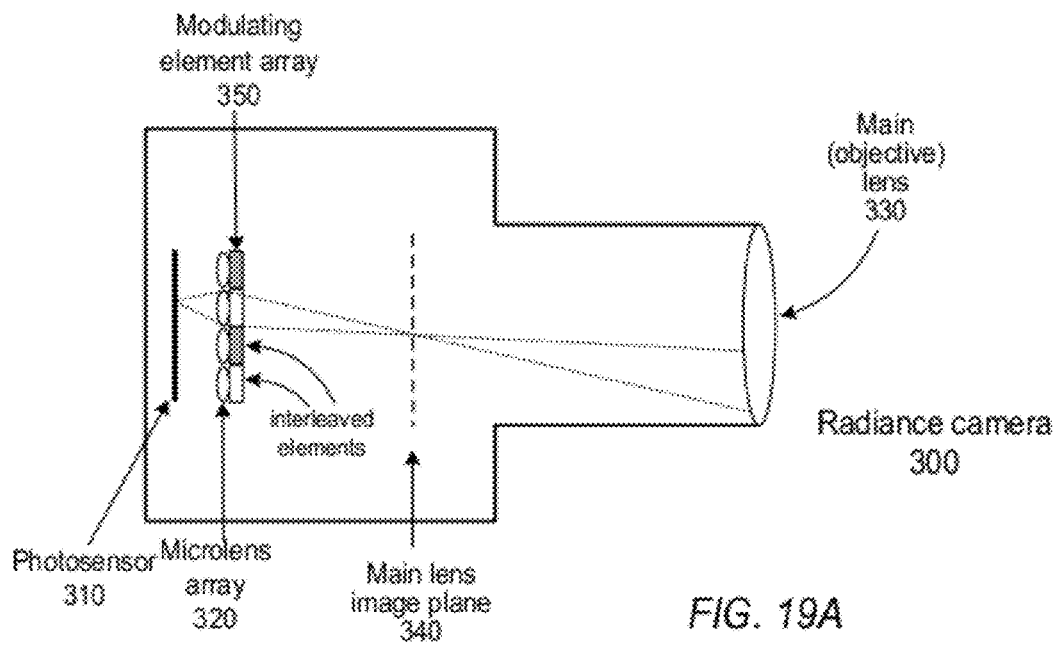
FIG. 19A is a block diagram generally illustrating radiance camera embodiments implementing focused plenoptic camera technology and including an array of interleaved optical elements such as filters located proximate to the microlens array.
Figure 19B:
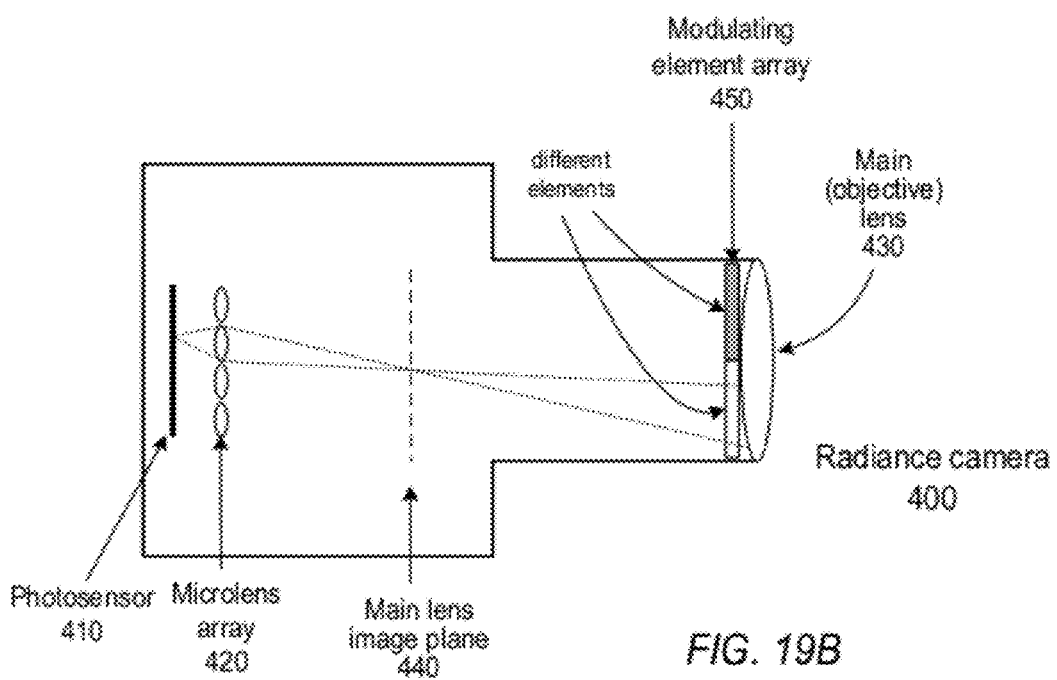
FIG. 19B is a block diagram generally illustrating radiance camera embodiments implementing focused plenoptic camera technology and including an array of heterogeneous optical elements such as filters located proximate to the main camera lens.

FIGS. 19A and 19B are block diagrams illustrating radiance camera embodiments implementing focused plenoptic camera technology and including arrays of optical elements such as various filters, glasses, or apertures.

FIG. 19A is a block diagram generally illustrating radiance camera embodiments implementing focused plenoptic camera technology and including an array of interleaved optical elements such as filters located proximate to the microlens array. Radiance camera 300 may include a main (objective) lens 330, a microlens array 320, and a photosensor 310. The microlenses in array 320 are focused on the image plane 340 of the main lens 330. In some implementations, photosensor 310 may be conventional film; in other embodiments, photosensor 310 may be a device for digitally capturing light, for example a charge-coupled device (CCD).

Radiance camera 300 includes a modulating element array 350 proximate to the microlens array 320. Modulating element array 350 may include a plurality of optical elements such as the various filters as described herein. In FIG. 19A, modulating element array 350 is shown as positioned in front of microlens array 320, between microlens array 320 and main lens image plane 340. However, in some embodiments, modulating element array 350 may be positioned behind microlens array 320, between microlens array 300 and photosensor 310. Furthermore, some embodiments may include more than one modulating element array 350, and some embodiments may include at least one modulating element array 350 positioned behind microlens array 320 and at least one modulating element array 350 positioned in front of microlens array 320. While FIG. 19A shows modulating element array 350 as separate from microlens array 320, for example as implemented on a separate wafer or other component than the microlens array 320, in some embodiments the optical elements and microlenses may be integrated into one component, such as a silica, fused silica, or glass wafer.

In some embodiments in which the modulating element array 350 is a separate component from the microlens array 320, the camera 300 may be configured so that an modulating element array 350 may be inserted or removed from the camera 300, replaced with a different modulating element array 350, and/or augmented by adding additional modulating element array(s) 350. For example, in some embodiments, a modulating element array 350 comprising different neutral density filters may be swapped for a modulating element array 350 comprising color filters or polarizing filters. Similarly, in some embodiments in which the modulating element array 350 is integrated with the microlens array 320, the integrated array of microlenses and modulating optical elements such as filters may be swapped for a different array, for example an array with different microlenses and/or filters, or for an array including only microlenses.

The elements in modulating element array 350 may, for example, be apertures or neutral density filters that affect the exposure at photosensor 310, color filters that affect the wavelength of light that is received at photosensor 310, polarizing filters that affect the polarization of light that is received at photosensor 310, or some other type of element that affects some property of light received at photosensor 310. In at least some embodiments, each element in modulating element array 350 corresponds to a particular one of the microlenses in microlens array 320. However, note that configurations in which a single element in modulating element array 350 corresponds to two or more microlenses in microlens array 320, or in which two or more elements in modulating element array 350 correspond to a single microlens in microlens array 320, are possible and contemplated.

At least two of the elements in modulating element array 350 provide different levels or types of effect on the light received at photosensor 310 via the respective microlenses corresponding to the elements to thus modulate a property of light that is captured at photosensor 310. For example, in a modulating element array 350 that includes neutral density filters, at least two of the filters provide different levels of filtering to thus produce different levels of exposure at photosensor 310 for the respective microlenses. As another example, in a modulating element array 350 that includes color filters, at least two of the filters allow different wavelengths of the color spectrum of light to pass through the filters to thus capture different colors at photosensor 310 for the respective microlenses. As yet another example, in a modulating element array 350 that includes polarizing filters, at least two of the filters polarize at different angles to thus produce differently polarized light at photosensor 310 for the respective microlenses.

Various embodiments of a radiance camera implementing focused plenoptic camera technology and including an array of interleaved optical elements such as filters located proximate to the microlens array as illustrated in FIG. 19A are illustrated in FIGS. 28 through 46 and described later in this document in the section titled Focused plenoptic cameras employing different filtering at different microlenses.

FIG. 19B is a block diagram generally illustrating radiance camera embodiments implementing focused plenoptic camera technology and including an array of heterogeneous optical elements such as filters located proximate to the main camera lens. Radiance camera 400 may include a main (objective) lens 430, a microlens array 420, and a photosensor 410. The microlenses in array 420 are focused on the image plane 440 of the main lens 430. In some implementations, photosensor 410 may be conventional film; in other embodiments, photosensor 410 may be a device for digitally capturing light, for example a charge-coupled device (CCD).

Radiance camera 400 includes a modulating element array 450 proximate to the main camera lens 430. Modulating element array 450 may include a plurality of optical elements such as the various filters as described herein. In FIG. 19B, modulating element array 450 is shown as positioned between main lens 430 and main lens image plane 440. However, in some embodiments, modulating element array 450 may be positioned in front of main lens 430, between main lens 430 and the object field to be captured. For example, modulating element array 450 may be configured as a detachable filter that can be attached to and removed from a camera lens, such as a camera lens for an SLR (single lens reflex) camera. Furthermore, some embodiments may include more than one modulating element array 450, and some embodiments may include at least one modulating element array 450 positioned behind main lens 430 and at least one modulating element array 450 positioned in front of main lens 430. While FIG. 19B shows modulating element array 450 as separate from main lens 430, in some embodiments the modulating element array 450 and main lens 430 may be integrated into one component.

In some embodiments in which the modulating element array 450 is a separate component from the main lens 430, the camera 400 may be configured so that an modulating element array 450 may be added to or removed from the camera 400, replaced with a different modulating element array 450, and/or augmented by adding additional modulating element array(s) 450. For example, in some embodiments, a modulating element array 450 comprising different neutral density filters may be swapped for a modulating element array 450 comprising color filters or polarizing filters. Similarly, in some embodiments in which the modulating element array 450 is integrated with the main lens 430 as one component, the integrated main lens 430 and modulating element array 450 may be swapped for a different component, for example a component with a different main lens and/or modulating element array, or for a component including only a main lens.

The elements in modulating element array 450 may, for example, be neutral density filters that affect the exposure at photosensor 410, color filters that affect the wavelength of light that is received at photosensor 410, polarizing filters that affect the polarization of light that is received at photosensor 410, or some other type of element that affects some property of light received at photosensor 410. At least two of the elements in modulating element array 450 provide different levels or types of effect on the light received at photosensor 410 via the respective microlenses to thus modulate a property of light that is captured at photosensor 410. For example, in a modulating element array 450 that includes neutral density filters, at least two of the filters provide different levels of filtering to thus produce different levels of exposure at photosensor 410. As another example, in a modulating element array 450 that includes color filters, at least two of the filters allow different wavelengths of the color spectrum of light to pass through the filters to thus capture different colors at photosensor 410. As yet another example, in a modulating element array 450 that includes polarizing filters, at least two of the filters polarize at different angles to thus produce differently polarized light at photosensor 410.

Figure 20A:
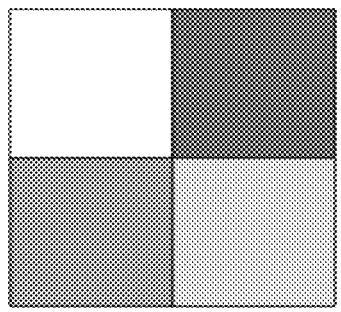
FIGS. 20A through 20D are examples of modulating element arrays comprising different filter-type modulating elements that may be used in radiance camera embodiments implementing focused plenoptic camera technology to modulate a property of light.
Figure 20B:
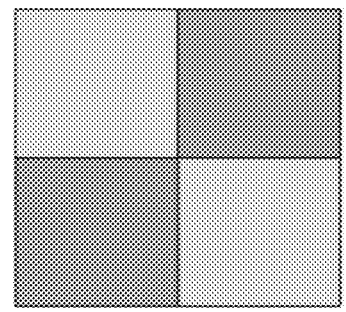
Figure 20C:
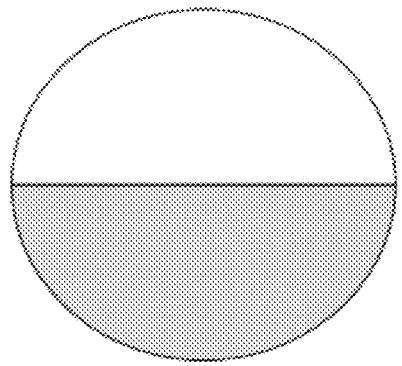
Figure 20D:
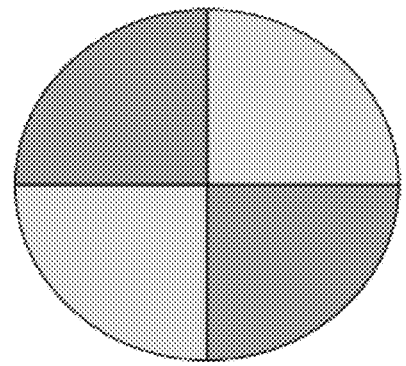

FIGS. 20A through 20D are examples of modulating element arrays comprising different filter-type modulating elements that may be used in radiance camera embodiments implementing focused plenoptic camera technology to modulate a property of light. FIGS. 20A and 20B show substantially square examples; FIGS. 20C and 20D show substantially circular examples. Note, however, that modulating element arrays may be of other geometric shapes, such as rectangular or hexagonal. FIG. 20A shows a square modulating element array that includes four filters at four different levels of filtering. FIG. 20B shows a square modulating element array with four filters at two different levels of filtering. FIG. 20C shows a circular modulating element array with two filters at different levels of filtering. FIG. 20D shows a circular modulating element array with four filters at two different levels of filtering. These configurations are given as examples; other configurations are possible, for example other numbers of filters and/or other shapes of the array or elements. The interleaved filters may, for example, be neutral density filters, color filters, or polarization filters. Other types of filters may be used to modulate other properties of light, however.

Figure 21:
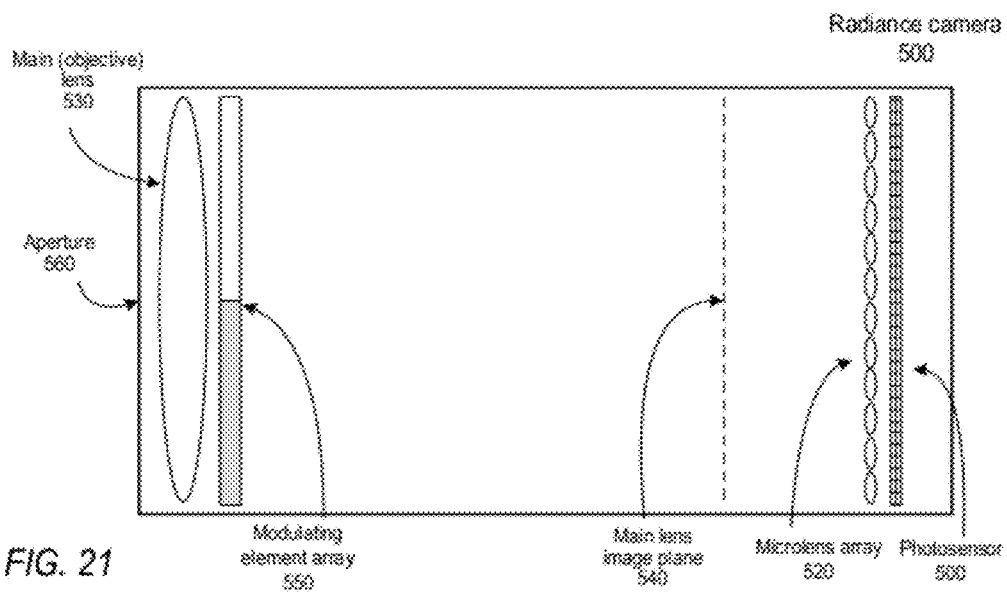
FIG. 21 shows an example radiance camera embodiment implementing focused plenoptic camera technology and including a modulating filter element array located proximate to the main camera lens.

FIG. 21 shows an example radiance camera embodiment implementing focused plenoptic camera technology and including a modulating filter element array located proximate to the main camera lens. The distances, dimensions, numbers, and arrangements of elements in FIG. 21 are given for illustrative purposes, and are not intended to be limiting. Radiance camera 500 may include a main lens 530, a microlens array 520, and a photosensor 510. The microlenses in array 520 are focused on the image plane 540 of the main lens 530. Radiance camera 500 includes a modulating element array 550, for example a modulating filter element array as illustrated in FIGS. 20A through 20D, proximate to the main camera lens 530. Different elements in the array 250 filter a property of light differently than other elements. In some embodiments, radiance camera 500 may include a square or rectangular aperture 560, which may provide better utilization of space on the photosensor 510 than a circular aperture.

FIGS. 22A through 22C are examples of modulating element arrays comprising different glass modulating elements that may be used in radiance camera embodiments implementing focused plenoptic camera technology to modulate a property of light. FIG. 22A shows a substantially square example; FIG. 22B shows a substantially circular example. Note, however, that modulating element arrays may be of other geometric shapes, such as rectangular or hexagonal. FIG. 22C shows a side view of a glass element. Both FIGS. 22A and 22B show two different glass elements in the array; in some embodiments, more than two glass elements may be included in an array, for example four.

The glass elements in a glass element array differ from filter elements in that the glass elements do not filter the light; instead, the glass elements have different optical properties, such as refractive index, that provide different optical paths for the light passing through different elements. For example, a given glass element may refract light in such a way that the image plane is farther from the main lens by a factor of up to half of the thickness of the glass. For example, for a 2 mm thick glass, the image plane may be moved up to 1 mm farther from the main lens. With two different glass elements in the array, one element may create an image closer to main lens, while the other creates an image farther away, so that different objects in the real world are in focus in different portions of the image.

FIG. 23 shows an example radiance camera embodiment implementing focused plenoptic camera technology and including a modulating glass element array located proximate to the main camera lens. The distances, dimensions, numbers, and arrangements of elements in FIG. 23 are given for illustrative purposes, and are not intended to be limiting. Radiance camera 600 may include a main lens 630, a microlens array 620, and a photosensor 610. Radiance camera 600 includes a modulating element array 650, for example a modulating glass element array as illustrated in FIGS. 22A through 22C, proximate to the main camera lens 630. The microlenses in array 620 are focused on the image plane(s) 640 of the main lens 630; note that the image at the image plane has been affected by the glass elements in glass element array 650, for example as described above in relation to FIGS. 22A through 22C. In some embodiments, radiance camera 600 may include a square or rectangular aperture 660, which may provide better utilization of space on the photosensor 610 than a circular aperture.

Figure 24A:
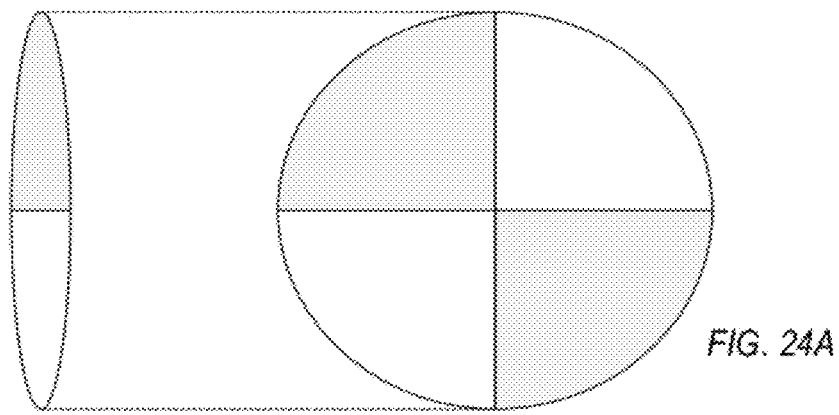
FIGS. 24A and 24B are examples of modified main lenses that may be used in radiance camera embodiments implementing focused plenoptic camera technology to modulate a property of light.
Figure 24B:
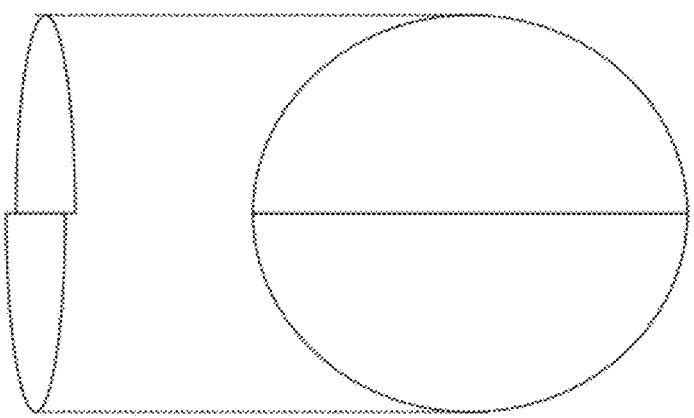

FIGS. 24A and 24B are examples of modified main lenses that may be used in radiance camera embodiments implementing focused plenoptic camera technology to modulate a property of light. Instead of or in addition to including a modulating element array, a radiance camera may modulate a property of light via a modulating main camera lens. FIG. 24A shows a modulating main lens that has been subdivided into portions that have different optical properties, such as focal length, or different filtering (e.g., neutral density, color, polarization, etc.) applied to the surface of or integrated with the lens. FIG. 24A shows a modulating main lens divided into four portions; other numbers of portions may be used. FIG. 24B shows a modulating main lens that has been subdivided into two halves, with the halves shifted relative to each other along the optical path of the lens. Other modifications of the main lens than those shown are possible.

As an example, with a lens subdivided into two halves, one half of the lens may create an image closer to main lens (via either shifting, as shown in FIG. 24B, or by different focal lengths), while the other half creates an image farther away, so that different objects in the real world are in focus in different portions of the image.

Figure 25:
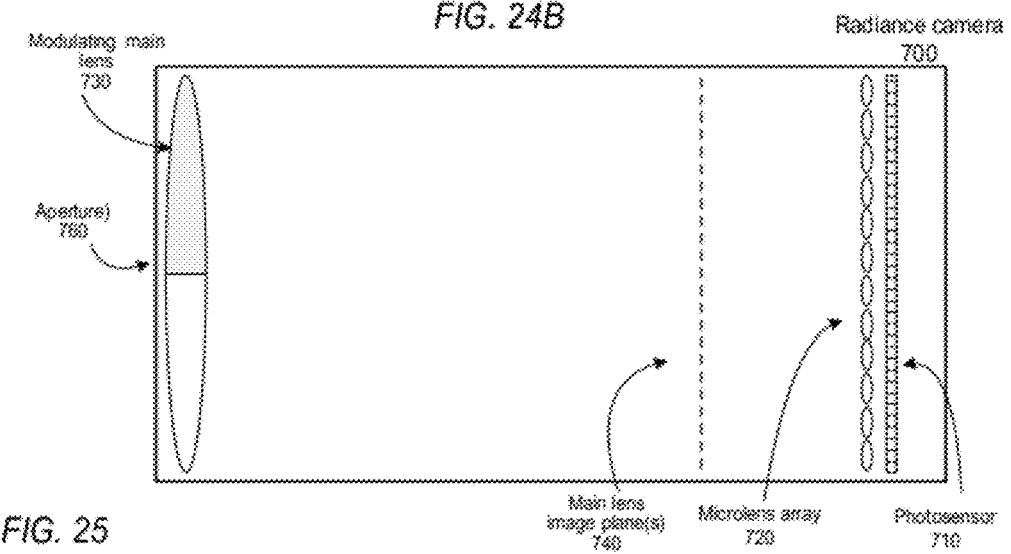
FIG. 25 shows an example radiance camera embodiment implementing focused plenoptic camera technology and including a modified main camera lens that modulates a property of light.

FIG. 25 shows an example radiance camera embodiment implementing focused plenoptic camera technology and including a modified main camera lens that modulates a property of light. The distances, dimensions, numbers, and arrangements of elements in FIG. 25 are given for illustrative purposes, and are not intended to be limiting. Radiance camera 700 may include a modulating main lens 730, a microlens array 720, and a photosensor 710. The microlenses in array 720 are focused on the image plane 740 of the main lens 730; note that the image at the image plane may be modulated by the modulating main lens, for example as described above in relation to FIGS. 24A and 24B. In some embodiments, radiance camera 700 may include a square or rectangular aperture 760, which may provide better utilization of space on the photosensor 710 than a circular aperture.

Modulating a Property of Light Via the Microlens Array

Figure 26A:
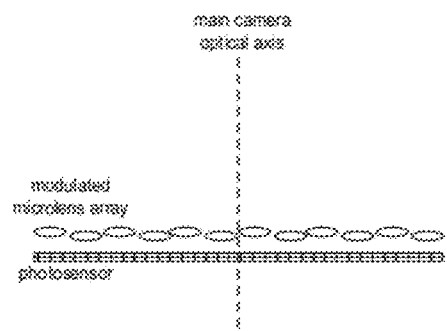
FIG. 26A shows a modulated microlens array in which similar microlenses are shifted relative to each other along the main camera optical axis in an alternating pattern.
Figure 26B:
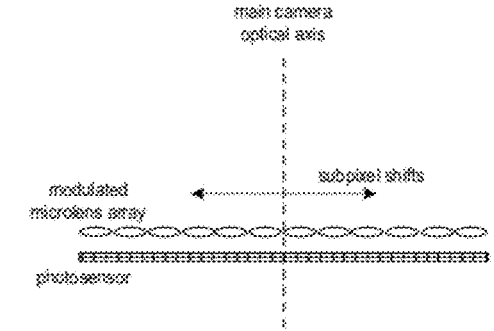
FIG. 26B shows a modulated microlens array in which similar microlenses are shifted relative to each other perpendicular to the main camera optical axis.
Figure 26C:
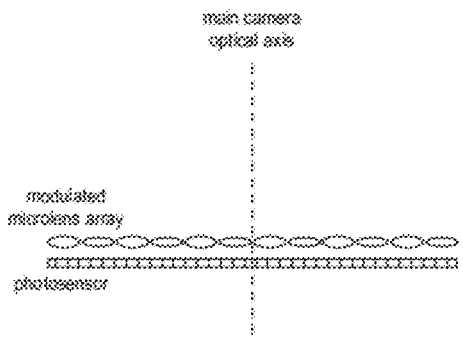
FIG. 26C shows a modulated microlens array in which microlenses with different optical properties are interleaved in the microlens array in an alternating pattern.

Instead of or in addition to including a modulating element array or modulating main lens, a radiance camera may modulate a property of light via modifications to the microlens array. For example, the microlens array may be modified by shifting the microlenses relative to each other either parallel to the main camera optical axis or perpendicular to the main camera optical axis. As another example, microlenses with different optical properties, such as focal length, may be interleaved in the microlens array. FIGS. 26A through 26C show some examples of modulating microlens arrays, according to various embodiments.

FIG. 26A shows a modulated microlens array in which similar microlenses are shifted relative to each other along the main camera optical axis in an alternating pattern. Thus, different microlenses focus at different locations (different image planes) in the image created by the main lens in the camera, which results in an image in which different objects are in focus in different portions of the image.

FIG. 26B shows a modulated microlens array in which similar microlenses are shifted relative to each other perpendicular to the main camera optical axis. This shifting may be random or may be done according to some pattern. The shift may be a subpixel shift. This subpixel shift may be used in super-resolution applications. Since the relation between the microlenses and the pixels of the photosensor is different for each microlens, the microimages formed by different microlenses are not exactly identical; the microimages may be shifted by a subpixel amount. Two microimages of essentially the same object will be approximately the same except that the positioning of the pixels is slightly different because of the positioning of the microlenses. This property of microimages captured using the radiance camera implementing focused plenoptic camera provides the potential to apply super-resolution algorithms. Generally described, an example super-resolution algorithm implements a rendering technique that combines microimages, using the subpixel shift and interpolation techniques, to generate output images at higher resolution than can be achieved by conventional rendering algorithms.

FIG. 26C shows a modulated microlens array in which microlenses with different optical properties are interleaved in the microlens array in an alternating pattern. For example, microlenses with different focal length may be interleaved, so that different microlenses focus at different locations (different image planes) in the image created by the main lens in the camera, which results in an image in which different objects are in focus in different portions of the image. Microlenses with other, differing optical properties may be similarly interleaved.

Small Camera Implementations

Focused plenoptic camera technology and modulating elements as described herein may be implemented in any type of camera to provide radiance camera functionality as described herein. For example, the radiance camera technology as described herein may be implemented in single-lens reflex (SLR) cameras, digital SLR (DSLR) cameras, large format cameras, medium format cameras, digital cameras, conventional film cameras, video cameras, and small or compact cameras such as point and shoot cameras, phone cameras, smartphone cameras, and so on. The radiance camera technology works with cameras with small apertures, large apertures, small sensors, large sensors, small main lenses, and large main lenses.

Larger cameras, such as DSLR cameras and medium and large format cameras, typically utilize larger apertures and larger objective lenses. For example, a typical aperture of a larger camera may be about 1 inch, or 3 cm. With larger apertures, when capturing for HDR imaging applications using a radiance camera with modulating elements (e.g., neutral density filters) as described herein, images that are constructed are from slightly different viewpoints, one from the light from one part of the aperture, and the from another part of the aperture. For nearby scenes, parallax may be present. In HDR imaging, parallax is a problem. To reduce the problem with parallax in nearby scenes, smaller apertures are preferable so that closer objects can be accurately represented in HDR images. Small or compact cameras, such as point and shoot cameras, phone cameras, smartphone cameras, and so on, generally have much smaller apertures (e.g., approximately 1 cm or less) than larger cameras such as DSLR cameras. Thus, compact cameras are a good match for HDR image capture, especially for imaging close objects, as compact camera have smaller apertures than larger cameras and thus less parallax. In addition, compact cameras typically have smaller sensors, which also helps to reduce parallax.

Thus, embodiments of the radiance camera implementing focused plenoptic camera technology and modulating elements (e.g., an array of neutral density filters at or near the main camera lens) may be implemented in small or compact cameras to provide compact cameras that are well-suited to HDR imaging.

Figure 27:
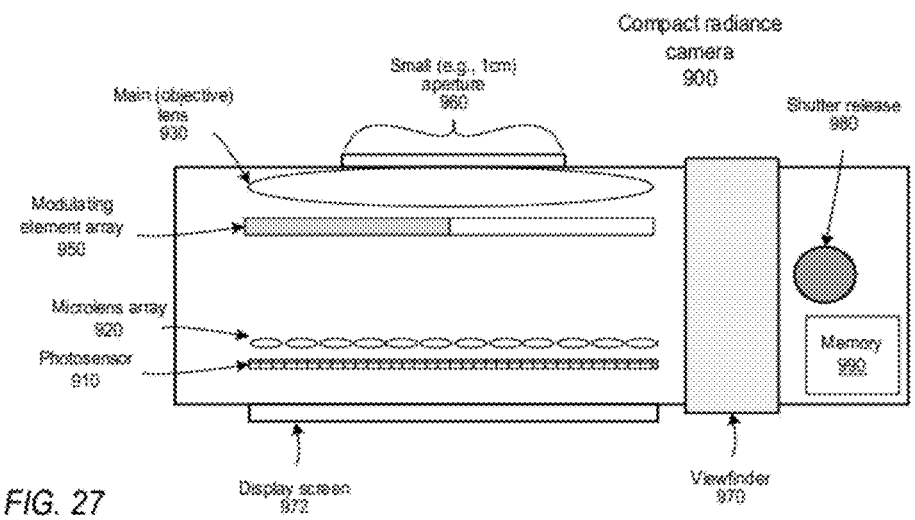
FIG. 27 shows an example small camera implemented as a radiance camera, for example for HDR imaging applications, according to some embodiments.

FIG. 27 shows an example small camera implemented as a radiance camera, for example for HDR imaging applications, according to some embodiments. Compact radiance camera 900 may include a main lens 930, a microlens array 920, and a photosensor 910. The microlenses in array 920 are focused on the image plane of the main lens 930. Compact radiance camera 900 includes a relatively small aperture, e.g. 1 cm, when compared to larger cameras such as DSLR cameras. In some embodiments, radiance camera 900 may include a square or rectangular aperture 960, which may provide better utilization of space on the photosensor 910 than a circular aperture. Radiance camera 900 includes a modulating element array 950, for example a modulating filter element array as illustrated in FIGS. 20A through 20D, proximate to the main camera lens 930. Different elements in the array 950 filter a property of light differently than other elements. For example, for HDR applications, array 950 may include different neutral density filters.

Compact camera 900 may include one or more other elements that may be found in small, compact cameras such as point-and-shoot cameras and phone cameras. For example, compact camera 900 may include a shutter release 980, a viewfinder 970, memory 990 for storing captured images and other data, and a display screen 972, such as an LCD screen. Memory 990 may be removable, such as a flash memory card or memory stick.

Note that a compact camera 900 may be similarly implemented using any of the other modulating techniques described herein to capture other modalities of light, such as extended color capture and extended polarization capture.

Focused Plenoptic Cameras Employing Different Filtering at Different Microlenses This section further describes various embodiments of a radiance camera implementing focused plenoptic camera technology and including an array of interleaved optical elements such as filters located proximate to the microlens array as illustrated in FIG. 19A.

In a focused plenoptic camera, if the scene is sufficiently far from the camera, the scene may be considered to be at infinity. Depending on the camera, the distance from the camera at which a scene or object is at infinity typically lies within a range of about one meter to about five meters, although this range may include shorter or longer distances for some camera configurations. The main camera lens of the focused plenoptic camera creates an image of the scene at the focal plane of the main lens. Different ones of the microlenses may project identical or nearly identical microimages of the image at the focal plane onto the sensor. Thus, each point of the image at the focal plane is re-imaged onto the sensor multiple times by multiple microlenses in the microlens array of a focused plenoptic camera. Embodiments may leverage these characteristics of the focused plenoptic camera by applying different optical elements, such as different filters or different apertures, at different ones of the microlenses to capture various characteristics of light, such as luminance, color, polarization, and so on, differently (e.g., at different levels of exposure for luminance, at different wavelengths of color, at different angles of polarization, etc.) in different microimages. All of the microimages are captured at the same time in a single image (referred to as a flat) at the sensor. Thus, multiple microimages of the same image of a scene may be captured at different colors, different exposures, different polarities, etc., in a single image at the same time with a focused plenoptic camera according to embodiments. Images captured using embodiments of a focused plenoptic camera with different lenses and/or filters (which may also be referred to as a radiance camera) may be used in High Dynamic Range (HDR) imaging, spectral imaging, and other imaging applications. When the main image created by the main lens of the focused plenoptic camera represents objects that are at optical infinity, those objects are exactly at the focal plane of the camera, one focal length from the main lens. The different views of the main image captured by the different microlenses are identical or nearly identical 3D views of the objects, that is identical or nearly identical images, but modified in brightness, color, polarization, or other characteristics. Thus, imaging functions, such as HDR imaging and spectral imaging, performed according to embodiments may produce precise and high quality output images, such as HDR images, color images, and so on.

In embodiments, different filters or other optical elements such as apertures that provide two or more different levels or types of light filtering may be combined with different ones of the microlenses in a microlens array of a focused plenoptic camera. For example, an alternating pattern (or some other pattern) of two or more different filters may be applied to the microlenses of a microlens array, with one filter applied to each microlens. A raw image or "flat" captured using a focused plenoptic camera that incorporates two or more different filters includes multiple microimages captured according to the two or more different filters. One or more different images may then be assembled from the microimages, with each image assembled from the microimages captured using one of the different filters. A final image may then be generated by appropriately combining the images assembled from the microimages. Alternatively, a final image, or multiple images, may be assembled from the microimages that incorporates characteristics captured according to the two or more different filters by first combining the microimages and then assembling the combined microimages to produce one or more output images. Example methods for assembling microimages from a flat captured by a focused plenoptic camera to generate an image or images are shown in FIGS. 51 and 52.

In embodiments of a focused plenoptic camera with two or more different filters applied to different microlenses in the microlens array, a single image or "flat" may be captured using the camera. The flat consists of multiple microimages, each corresponding to a microlens in the microlens array. From this single flat, two or more different images may be generated by appropriately assembling the microimages. The two or more images exhibit different characteristics according to the respective filters used on the microlenses that captured the microimages from which the images are assembled. This allows, for example, a single image or flat to be captured of an action scene, such as a sporting event or wildlife; from that flat, multiple images, for example at different levels of exposure or at different polarization angles, may be generated. Two or more of the multiple images, or portions thereof, may then be combined to generate an output image.

In some embodiments, the microimages from a raw flat captured with a focused plenoptic camera employing two or more different filters may be combined to generate a combined flat (a flat including the combined microimages). The microimages from the combined flat may then be appropriately assembled to produce one or more output images. Combining the microimages to generate a combined flat allows the combined flat to be used in generating 3D views, performing refocusing, parallax generation, and in general in any of various light-field operations that may be performed on a flat captured with a focused plenoptic camera.

Different types of filters may be used in embodiments. Filters that may be used include, but are not limited to, light-limiting filters, color filters, and polarizing filters. Light-limiting filters may be implemented, for example, as neutral-density filters or as apertures. In embodiments employing light-limiting filters, different levels of light filtering may be employed at different microlenses (using either different neutral density filters or different apertures) to thus capture microimages at different levels of exposure in a raw flat. The microimages from the raw flat may then be appropriately assembled to generate High Dynamic Range (HDR) images. As noted above, the microimages may be combined to generate an HDR flat; the HDR flat may then be used generate 3D views, perform refocusing, and in general in any of various light-field operations in the HDR domain. Alternatively, the microimages from the raw flat may be appropriately assembled to generate two or more different intermediate images of the captured scene, each at a respective level of exposure, and the two or more intermediate images may then be combined to generate an HDR output image.

In embodiments employing color filters, different color filters may be employed at different microlenses to thus capture microimages specific to different wavelengths of light corresponding to the respective color filters. The microimages from the raw flat may be appropriately assembled to generate two or more images of the captured scene each corresponding to one of the color filters. Two or more of the images thus generated may be combined to generate color output images of the scene. Alternatively, the microimages from the raw flat may first be combined to generate a combined flat, and color output images may be appropriately assembled from the combined flat.

In embodiments employing polarizing filters, different polarizing filters may be employed at different microlenses to thus capture microimages specific to different polarizations of light corresponding to the respective polarizing filters. The microimages from the raw flat may be appropriately assembled to generate two or more images of the captured scene each corresponding to one of the polarizing filters. Two or more of the images thus generated may be combined to generate output images of the scene. Alternatively, the microimages from the raw flat may first be combined to generate a combined flat, and output images may be appropriately assembled from the combined flat.

Capturing High Dynamic Range (HDR) Images with a Focused Plenoptic Camera

In embodiments employing light-limiting filters, different levels of light filtering may be employed at different microlenses to capture microimages at different levels of exposure. In a focused plenoptic camera, the main camera lens creates an image at the focal plane. That image is re-imaged on the sensor multiple times by the array of microlenses. Different microlenses are provided with different neutral density filters or, alternatively, different apertures, that differently limit the amount of light through the microlenses. Thus, the microimages captured at the sensor via the individual microlenses are effectively at different effective exposures (or F-numbers). The microimages may be appropriately combined to generate an HDR image, or alternatively an HDR flat, of the scene.

Focused Plenoptic Camera with Apertures

Since the microlenses in a focused plenoptic camera effectively form microcameras, each microlens may be provided with an aperture. Different aperture sizes for the microlenses provide different F-numbers and exposures. Thus, two adjacent microlenses (each a "microcamera") with different sizes of apertures may be used to simultaneously capture microimages of the main image at different F-numbers and exposures. Since all of the microcameras in a focused plenoptic camera work simultaneously to capture microimages of the main image, a focused plenoptic camera with different apertures at the microlenses may capture a single flat including multiple microimages of the main image at different F-numbers and exposures, and an HDR image may be generated from the captured flat. Thus, embodiments do not have to capture two or more consecutive images at different times to generate an HDR image, as would be necessary with conventional cameras.

Figure 28:
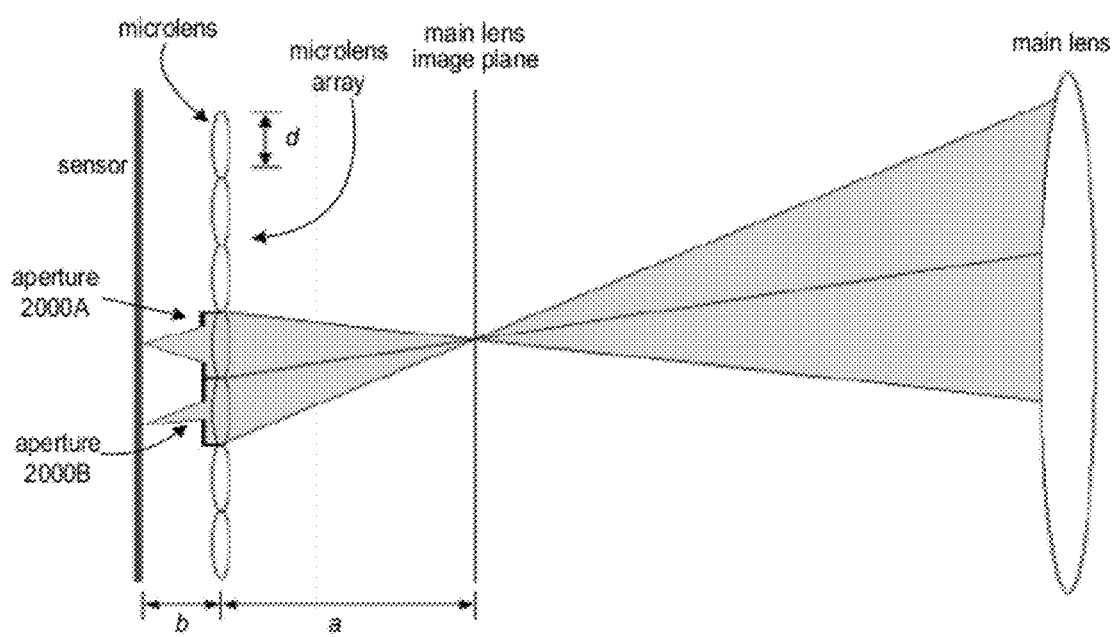
FIG. 28 illustrates a focused plenoptic camera including apertures at the microlenses according to some embodiments.

FIG. 28 illustrates a focused plenoptic camera including apertures at the microlenses according to some embodiments. The Keplerian telescopic mode is shown by way of example; however, apertures as illustrated in the Figure may be used in the Galilean telescopic, or binocular, mode as well. Two different apertures, aperture 2000A and aperture 2000B, are shown in the Figure. Note that the two apertures have different diameters, and that the diameters of the apertures are smaller than the microlens diameter d. More than two different apertures may be used, for example three, four, or more different diameters may be used. In some embodiments, some of the microlenses may not have apertures (effectively being "wide open" or at 100%) while others of the microlenses may have apertures. While FIG. 28 shows the apertures as located behind the microlenses, between the microlenses and the sensor, in some embodiments the apertures may be located in front of the microlenses, between the microlenses and the main lens.

Figure 29:
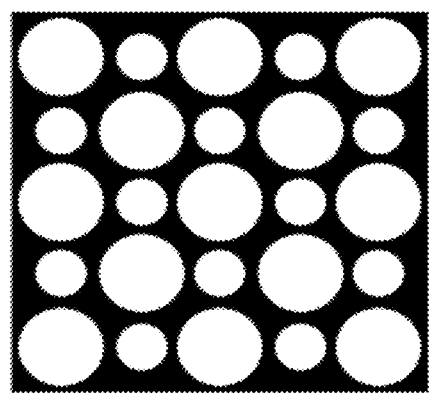
FIG. 29 illustrates an example pattern of different apertures that may be used in embodiments.

FIG. 29 illustrates an example pattern of different apertures that may be used in embodiments. The Figure shows an alternating pattern including circular apertures of two different diameters. It is to be noted that apertures of more than two different diameters may be used, different geometric shapes of apertures may be used for the apertures, and that other patterns may be used.

Circular apertures produce good quality images even when not perfectly in focus. The apertures define their F-numbers. In embodiments of the focused plenoptic camera, the full aperture F-number of the main lens may be matched with the F-number of the microlenses to maximize usage of the sensor space while not overlapping the microimages. Therefore, the apertures at the microlenses effectively limit the F-number of the main lens. This has two effects. First, microimages can be captured at the same maximal and reduced exposure as the main lens. Second, the diffraction is the same or worse than that of the main lens. The diffraction is defined by the F-number, and the final effect is a blur that for a circular apertures is $1.22\lambda F$, where $\lambda$ is the wavelength of light.

Figure 30A:
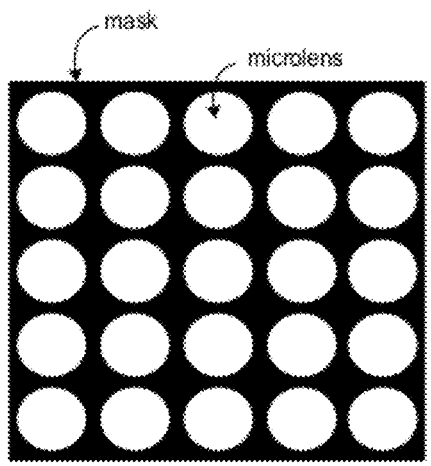
FIG. 30A illustrates a simple microlens array with wide-open apertures.
Figure 32:
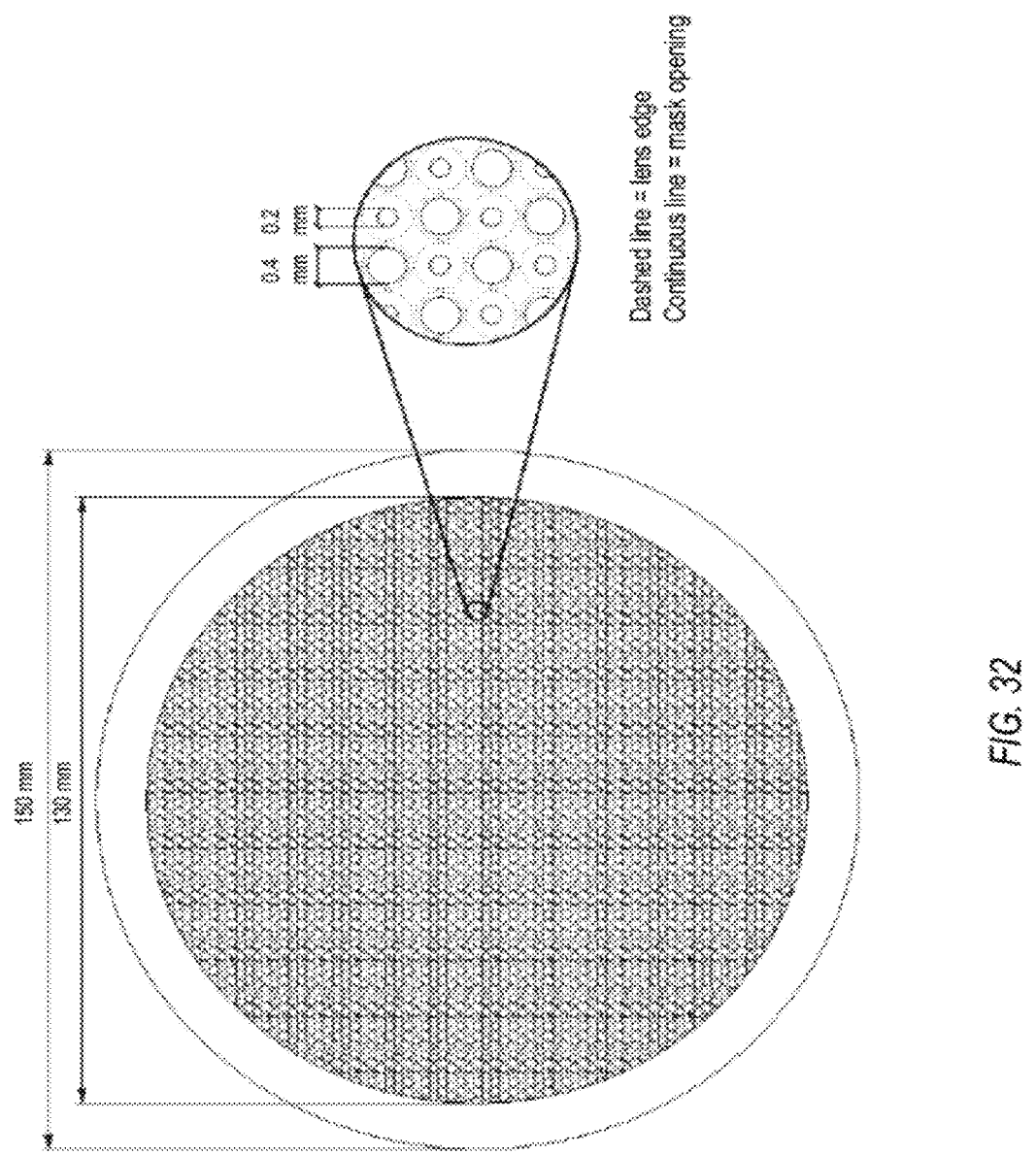
FIG. 32 illustrates an example circular microlens wafer including apertures at the microlenses, according to some embodiments.

FIGS. 30A through 30D illustrate different example patterns of apertures on a microlens array. FIG. 30A illustrates a simple microlens array with wide-open apertures. The microlens array may be manufactured as a wafer, for example a glass or fused silica wafer, with the microlenses integrated into the wafer. FIG. 32 illustrates an example circular microlens wafer. Referring to FIG. 30A, the white circles represent microlenses in the array. Each microlens may have a diameter of, for example, 240 microns. The distance between the centers of the microlenses (referred to as the pitch) may be, for example, 250 microns. Other diameters and/or pitches may be used. The black region represents a mask or masking on the microlens array to prevent light passing through the microlens array except through the microlenses. To create the mask, for example, on one side of the wafer (e.g., the back side of the wafer, with the microlens curvature on the front side), the appropriate masked region may be coated with an opaque material or substance, such as black chromium. Alternatively, the mask may be deposited on one wafer, while the microlenses are manufactured on another wafer; the two wafers may then be combined to create the microlens array. Other methods of manufacturing a microlens array and/or of applying a mask to a microlens array may be used. In addition, other methods of adding apertures to microlenses in a microlenses array than by masking the microlenses may be used.

Figure 30B:
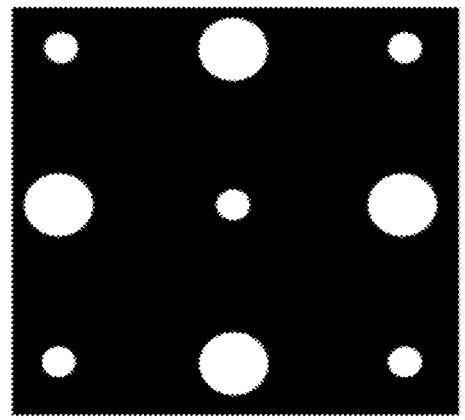
FIGS. 30B through 30D illustrate different masking patterns that may be applied to a microlens array such as the array illustrated in FIG. 30A to provide varying apertures for the microlenses, according to some embodiments.
Figure 30C:
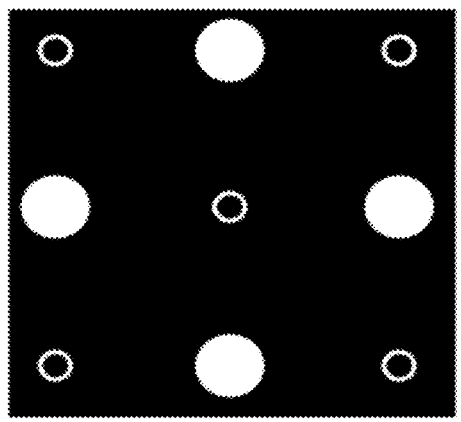
Figure 30D:
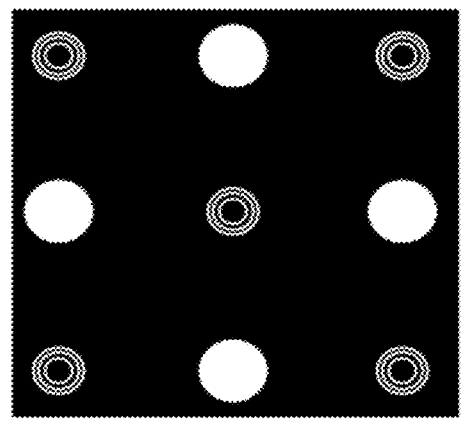

FIGS. 30B through 30D illustrate different masking patterns that may be applied to a microlens array such as the array illustrated in FIG. 30A to provide varying apertures for the microlenses, according to some embodiments. In the patterns illustrated in FIGS. 30B through 30D, every other microlens in the array is completely covered with the mask, e.g. by applying a black chromium coating to the wafer, and thus is unused. This increases spacing between microlenses, making it possible to capture larger microimages on the sensor. FIG. 30B illustrates a pattern of alternating circular apertures that differ in size by a factor of 4 by extending the opaque coating to partially cover some of the microlenses. Thus, the microlenses with the smaller aperture capture microimages that are ¼ as bright as the microimages captured by the microlenses with the larger aperture.

FIGS. 30C and 30D illustrate patterns of alternating apertures that differ in size in which different shapes than a pure open circle is used for the smaller aperture. At the scale of the microlenses used in the microlens array, small circular apertures may result in diffraction becoming a significant problem, which may result in blurring in the captured microimages. For example, smaller apertures than the apertures shown in FIG. 30B may produce blur bigger than the pixel size. As a solution to the problem of blurring that may be introduced by the use of smaller circular apertures, some embodiments may use other shapes for the apertures. For example, a ring shape, as shown for the smaller apertures in FIG. 30C, may be produced, for example by appropriately applying the opaque coating at the center and outside edges of the microlenses, to reduce the exposure for microimages captured via the microlenses while producing sharper images than could be captured using a pure open circle as shown in FIG. 30B. The diffraction blur produced by the ring apertures of FIG. 30C, and thus the sharpness of the microimages, may be comparable to that of the smaller apertures shown in FIG. 30B; however, the total amount of light is reduced 8 times by the ring apertures of FIG. 30C instead of the 4 times reduction of the smaller apertures of FIG. 30B. As another example, two or more concentric rings, for example rings appropriately representing Fresnel zones as in a zone plate, as shown for the smaller apertures in FIG. 30D, may be used to reduce the exposure for microimages captured via the microlenses while producing sharper images than could be captured using a pure open circle as shown in FIG. 30B.

Figure 31A:
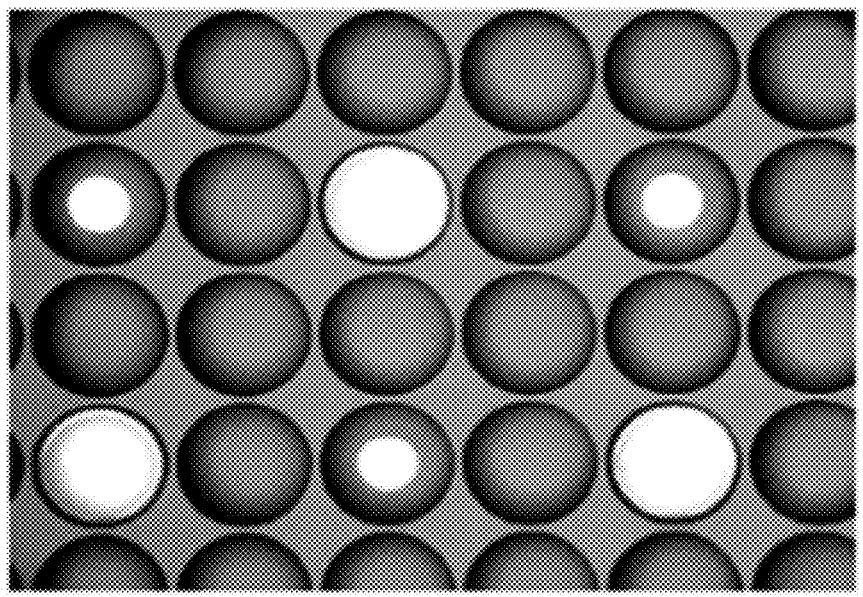
FIGS. 31A and 31B show magnified portions of images of example actual microlens arrays that include different apertures.
Figure 31B:
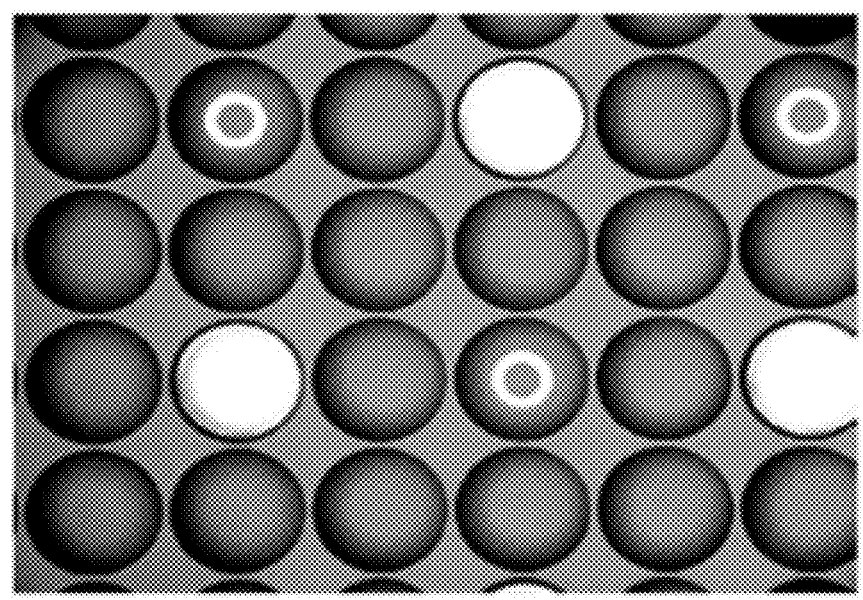

FIGS. 31A and 31B show magnified portions of images of example actual microlens arrays that include different apertures. FIG. 32A corresponds to the aperture pattern shown in FIG. 30B, and FIG. 32B corresponds to the aperture pattern shown in FIG. 30C that uses ring apertures for the smaller apertures.

FIG. 32 illustrates an example circular microlens wafer including apertures at the microlenses, according to some embodiments, and is not intended to be limiting. The wafer may have an outside diameter of 150 mm, with a diameter of the optically usable microlenses array at 130 mm. The microlenses may be 0.49 mm in diameter, with a pitch of 0.5 mm. The microlenses may be arranged in a square grid. The wafer may be coated, for example using black chromium, while leaving a checkerboard pattern of two different apertures on the microlenses. The larger aperture may be 0.4 mm in diameter, while the smaller aperture may be 0.2 mm in diameter. The callout shows a zoom in to a portion of the microlens array, and shows the edges of the microlenses as dotted lines and the edges of the apertures as solid lines. Note that the pattern shown on this example wafer is similar to the pattern shown in FIG. 29.

FIG. 33 shows a magnified portion of an example flat captured with a focused plenoptic camera using an alternating pattern of different apertures at the microlenses, according to some embodiments. The image has been converted to grayscale from a color image, and the brightness and contrast have been adjusted to more clearly show the effects of the different apertures. This example flat was captured with a pattern of alternating circular apertures that differ in size by a factor of 4, similar to that shown in FIGS. 30B and 31A. Thus, the microlenses with the smaller aperture capture microimages that are ¼ as bright as the microimages captured by the microlenses with the larger aperture. The resultant alternating pattern of brighter and darker microimages is clearly visible in the image. The area in the white square has been further expanded to more clearly illustrate the alternating bright and dark microimages captured at the sensor.

FIGS. 34A and 34B show two example images generated from the flat of which a portion is shown in FIG. 33. Example methods for assembling the microimages from the flat to generate the images are shown in FIGS. 51 and 52. FIG. 34A was generated from the microimages captured by the microlenses with the smaller aperture (the darker microimages). FIG. 34B was generated from the microimages captured by the microlenses with the larger aperture (the brighter microimages). Thus, the two images shown in FIGS. 34A and 34B differ in brightness by a factor of 4. Note the overexposed areas of FIG. 34B and the underexposed areas of FIG. 34A that compensate each other.

The two images shown in FIGS. 34A and 34B illustrate digital images that may be displayed or printed, and are not HDR images. However, the two images may be combined to form a High Dynamic Range (HDR) image according to any of a variety of High Dynamic Range Imaging (HDRI) techniques for generating HDR images from input images. HDR images are not directly printable, so an example HDR image resulting from a combination of the two images shown in FIGS. 34A and 34B is not presented.

Figure 35:
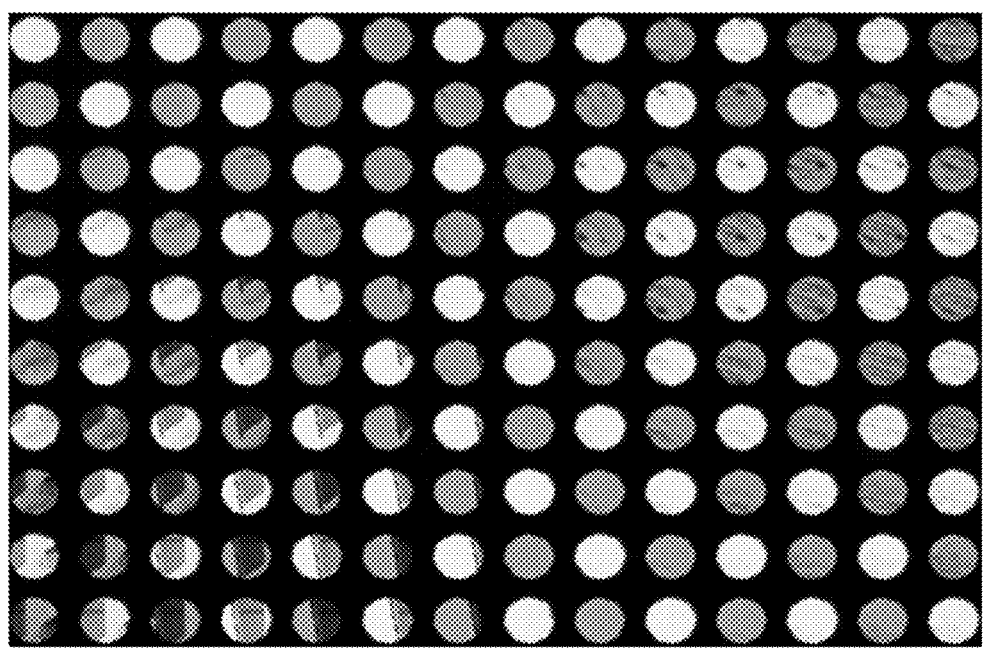
FIG. 35 shows a magnified portion of another example flat captured with a focused plenoptic camera using an alternating pattern of different apertures at the microlenses, according to some embodiments.

FIG. 35 shows a magnified portion of another example flat captured with a focused plenoptic camera using an alternating pattern of different apertures at the microlenses, according to some embodiments. The image has been converted to grayscale from a color image. This example flat was captured with a pattern of alternating circular apertures that differ in size by a factor of 4, similar to that shown in FIGS. 30B and 31A. Thus, the microlenses with the smaller aperture capture microimages that are ¼ as bright as the microimages captured by the microlenses with the larger aperture. The resultant alternating pattern of brighter and darker microimages is clearly visible in the image.

Figure 36A:
FIGS. 36A and 36B show two example images generated from the flat of which a portion is shown in FIG. 35.
Figure 36B:

FIGS. 36A and 36B show two example images generated from the flat of which a portion is shown in FIG. 35. Example methods for assembling the microimages from the flat to generate the images are shown in FIGS. 51 and 52. FIG. 36A was generated from the microimages captured by the microlenses with the smaller aperture (the darker microimages). FIG. 36B was generated from the microimages captured by the microlenses with the larger aperture (the brighter microimages). Thus, the two images shown in FIGS. 36A and 36B differ in brightness by a factor of 4. Note that the overexposed areas of FIG. 36B and the underexposed areas of FIG. 36A compensate each other.

The two images shown in FIGS. 36A and 36B illustrate digital images that may be displayed or printed, and are not HDR images. However, the two images may be combined to form a High Dynamic Range (HDR) image according to any of a variety of High Dynamic Range Imaging (HDRI) techniques for generating HDR images from input images. HDR images are not directly printable, so an example HDR image resulting from a combination of the two images shown in FIGS. 36A and 36B is not presented.

Focused Plenoptic Camera with Neutral Density Filters

At the scale of the microlenses used in the microlens array, small apertures may result in diffraction becoming a significant problem, which may result in blurring in the captured microimages. For example, smaller apertures than the apertures shown in FIGS. 30B and 30C may produce unacceptable blurring in the microimages due to diffraction. Thus, apertures may not be able to provide a wide enough range of exposures for at least some uses.

To provide a wider range of exposures than can be provided using apertures, some embodiments of a focused plenoptic camera may include a neutral density filter, or mask, for at least some of the microlenses of the microlens array. The apertures of the microlenses thus remain wide, while the mask controls the light transmission.

Figure 37A:
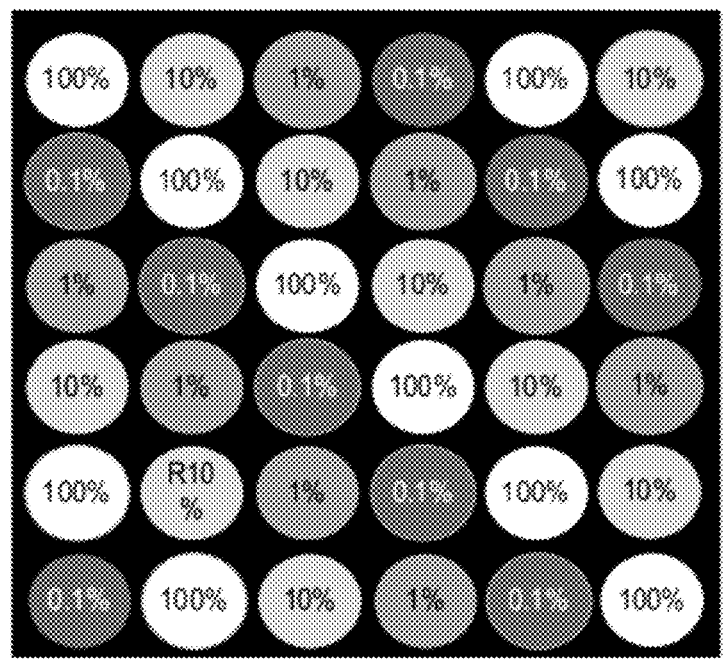
FIGS. 37A and 37B illustrate different example patterns of neutral density filters on a microlens array according to some embodiments.
Figure 37B:
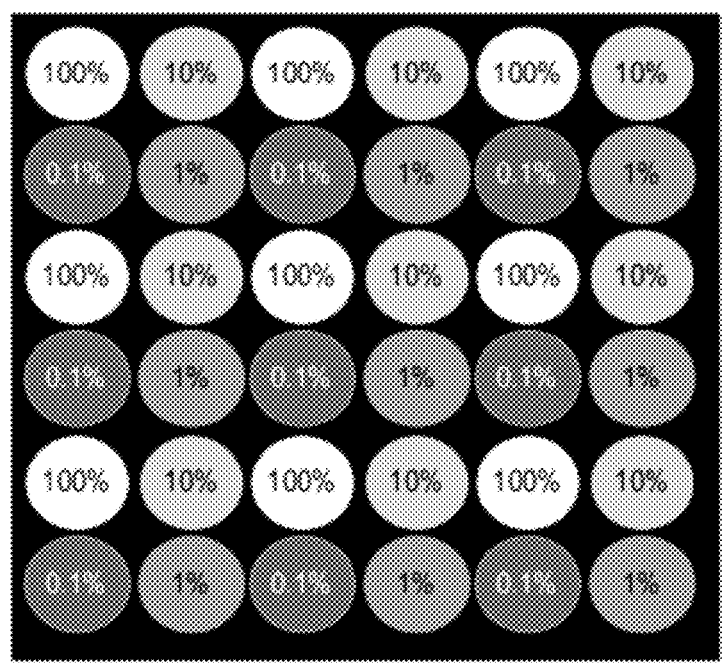

FIGS. 37A and 37B illustrate different example patterns of neutral density filters on a microlens array according to some embodiments. In some embodiments, the neutral density filters may be applied to the microlenses, for example via applying varying amounts of a coating of material on one side of the microlens array. The microlens array may be manufactured as a wafer, for example a glass or fused silica wafer, with the microlenses integrated into the wafer. FIG. 32 illustrates an example circular microlens wafer. Referring to FIGS. 37A and 37B, the circles represent microlenses in the array. Each microlens may have a diameter of, for example, 240 microns. The distance between the centers of the microlenses (referred to as the pitch) may be, for example, 250 microns. Other diameters and/or pitches may be used. The black region represents a mask or masking on the wafer to prevent light passing through the wafer except through the microlenses. To create the mask, for example, on one side of the wafer (e.g., the back side of the wafer, with the microlens curvature on the front side), the appropriate completely masked region may be coated with an opaque material or substance, such as black chromium. Alternatively, the mask may be deposited on one wafer, while the microlenses are manufactured on another wafer; the two wafers may then be combined to create the microlens array.

As shown in FIGS. 37A and 37B, some of the microlenses may be left with no coating, while varying levels of the coating may be applied to others of the microlenses to thus provide varying levels of masking that act as neutral density filters for the microlenses. In FIGS. 37A and 37B, four levels of light filtering have been applied: 100%, 10%, 1%, and 0.1%. The lenses indicated at 100% have no coating applied, and thus allow the transmission of 100% of the light to the sensor; the lenses indicated at 10% have enough coating applied to reduce the light transmission through the lenses to the sensor to 10% of the light allowed through the uncoated lenses; the lenses indicated at 1% have enough coating applied to reduce the light transmission through the lenses to the sensor to 1% of the light allowed through the uncoated lenses; and the lenses indicated at 0.1% have enough coating applied to reduce the light transmission through the lenses to the sensor to 0.1% of the light allowed through the uncoated lenses.

FIGS. 37A and 37B show two different example patterns of four levels of neutral density filtering on the microlens array that allow microimages at four levels of exposure to be captured simultaneously at the sensor. Other patterns may be used. For example, in some embodiments, every other microlens in the array may be completely covered with the mask, e.g. by applying a black chromium coating to the wafer, to thus increase spacing between microlenses so that larger microimages may be captured on the sensor. In addition, more or fewer levels of neutral density filters may be used to provide more or fewer levels of exposure to be captured. In addition, while FIGS. 37A and 37B show four levels of neutral density filtering that allow light transmission at 100% (1.0), 10% (0.1 or $\frac{1}{10}$), 1% (0.01 or $\frac{1}{100}$), and 0.1% (0.001 or $\frac{1}{1000}$), other levels of neutral density filtering may be used; for example, four levels of neutral density filtering that allow light transmission at 1.0, $\frac{1}{4}$, $\frac{1}{16}$, and $\frac{1}{64}$ may be used.

Figure 38:
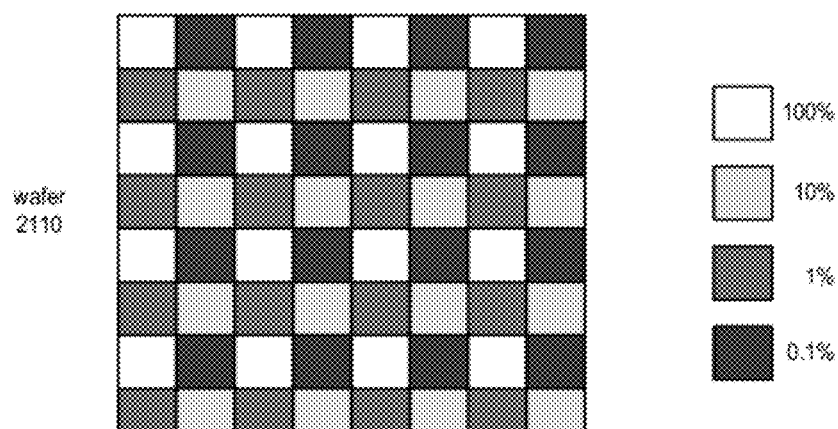
FIG. 38 shows an example of a checkerboard pattern of four different levels of filtering according to some embodiments.

FIG. 38 shows an example of a checkerboard pattern of four different levels of filtering according to some embodiments. As an alternative to the circular masks as illustrated in FIGS. 37A and 37B, in some embodiments, a grid of square masks may be used, as shown in FIG. 38. For example, a checkerboard mask consisting of four squares that allow different levels of light transmission, for example 100%, 10%, 1%, and 0.1% as shown in FIG. 38, may be used. Other levels of light transmission may be used. For example, four levels of neutral density filtering that allow light transmission at 1.0, $\frac{1}{4}$, $\frac{1}{16}$, and $\frac{1}{64}$ may be used. In addition, more or fewer levels of light transmission may be used.

Figures 39A, 39B, 39C:
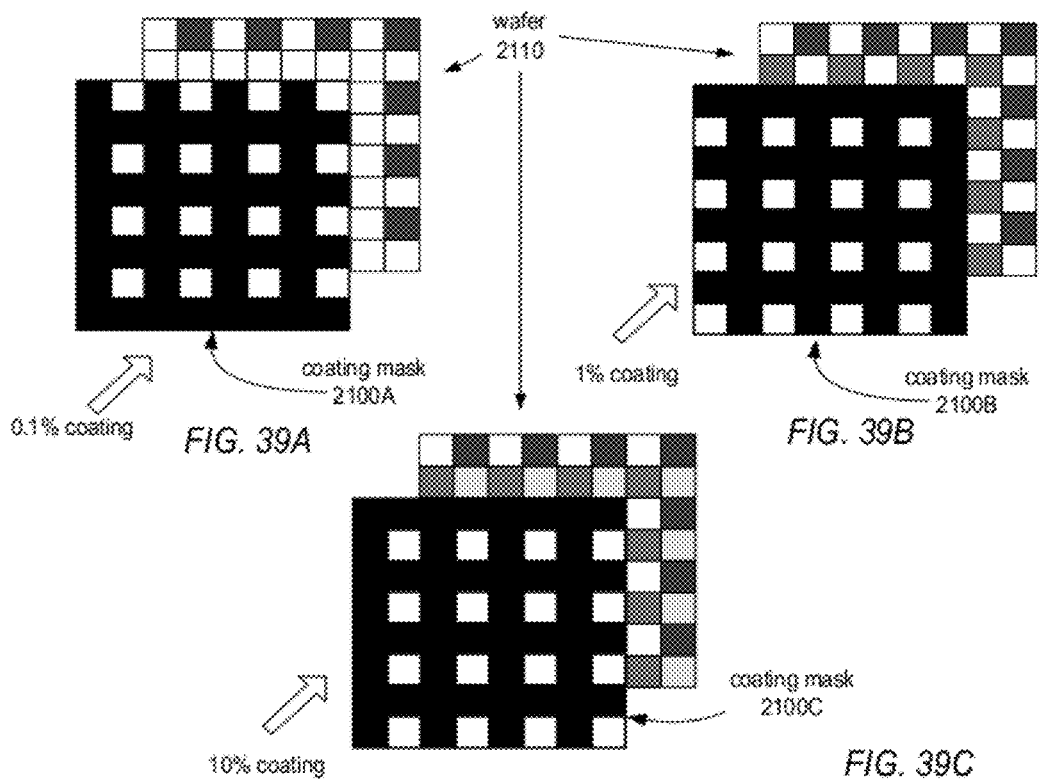
FIGS. 39A through 39C illustrate an example process for applying different levels of coating to a wafer using coating masks, according to some embodiments.

In some embodiments, the checkerboard pattern may be deposited on a wafer 2110, which may then be combined with the microlens wafer. Alternatively, the checkerboard pattern may be directly deposited on the microlens wafer. In some embodiments, different amounts of coating (e.g., black chromium) that allow different level of light transmission may be deposited independently on the wafer 2110 through a separate coating mask 2100, as illustrated in FIGS. 39A through 39C. In FIG. 39A, coating mask 2100A is used to apply the 0.1% coating to appropriate squares on wafer 2110. In FIG. 39B, coating mask 2100B is used to apply the 1% coating to appropriate squares on wafer 2110. In FIG. 39C, coating mask 2100C is used to apply the 10% coating to appropriate squares on wafer 2110. Note that no coating is required for the 100% squares on wafer 2110.

Figure 40A:
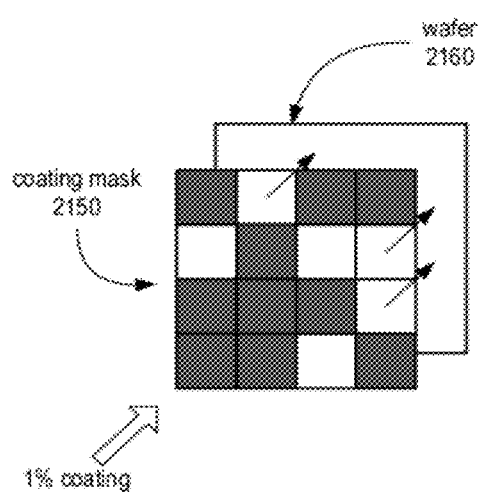
FIGS. 40A and 40B illustrate an example process for applying different levels of coating to a wafer using a single coating mask, according to some embodiments.
Figure 40B:
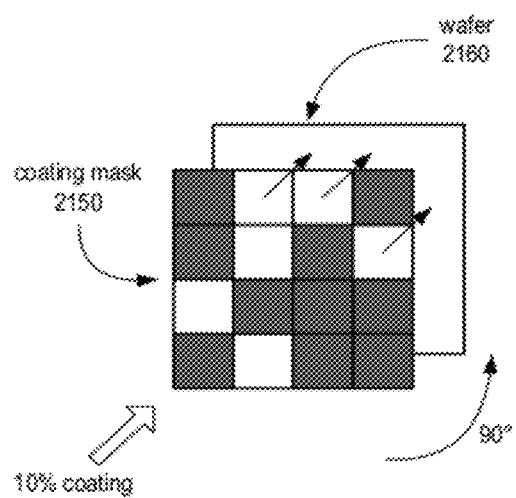
Figure 41A:
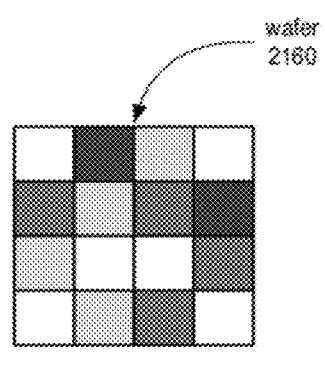
FIGS. 41A and 41B illustrate an example wafer with different filters applied by the process of FIGS. 40A and 40B.

Other methods of manufacturing a microlens array, manufacturing a coated wafer, and/or of applying varying levels of light transmission masking to at least some of the microlenses in a microlens array may be used than those described above. For example, a wafer may be coated to allow four different levels of light transmission, for example 100%, 10%, 1%, and 0.1%, using a single coating mask, such as coating mask 2150 shown in FIGS. 40A and 40B, and depositing the coating (e.g., black chromium) in two steps, as illustrated in FIGS. 40A and 40B. In FIG. 40A, coating mask 2150 is used to deposit the 1% coating onto particular squares of wafer 2160. In FIG. 40B, coating mask 2150 is rotated counterclockwise 90%, and used to deposit 10% coating onto particular squares of wafer 2160. The coated wafer 2160 that results from this process is shown in FIG. 41A. As shown in FIG. 41A, using the pattern of coating mask 2150 first to coat some squares of wafer 2160 at 1%, and then coating some squares of wafer 2160 at 10% after rotating the mask 2150 by 90 degrees, results in some squares remaining uncoated (100%), some squares coated at 10%, some squares coated at 1%, and the remaining squares (those that were coated at both orientations of mask 2150) coated at 0.1%.

Figure 41B:
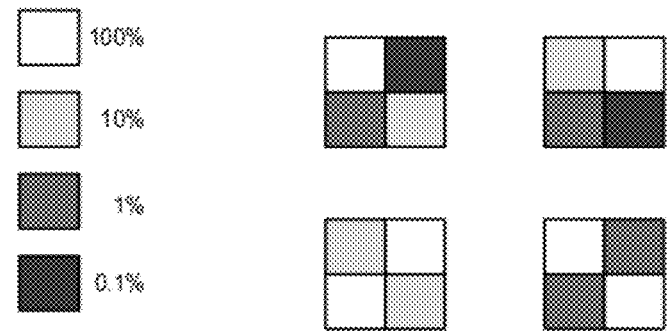

Wafer 2160 may then be cut or otherwise separated into four different wafers, as shown in FIG. 41B. Two of the wafers have four different levels of light transmission (100%, 10%, 1%, and 0.1%) and two of the wafers have two different levels of light transmission (one with 100% and 10%, and the other with 100% and 1%).

Combining Neutral Density Filters with Apertures

Figure 42:
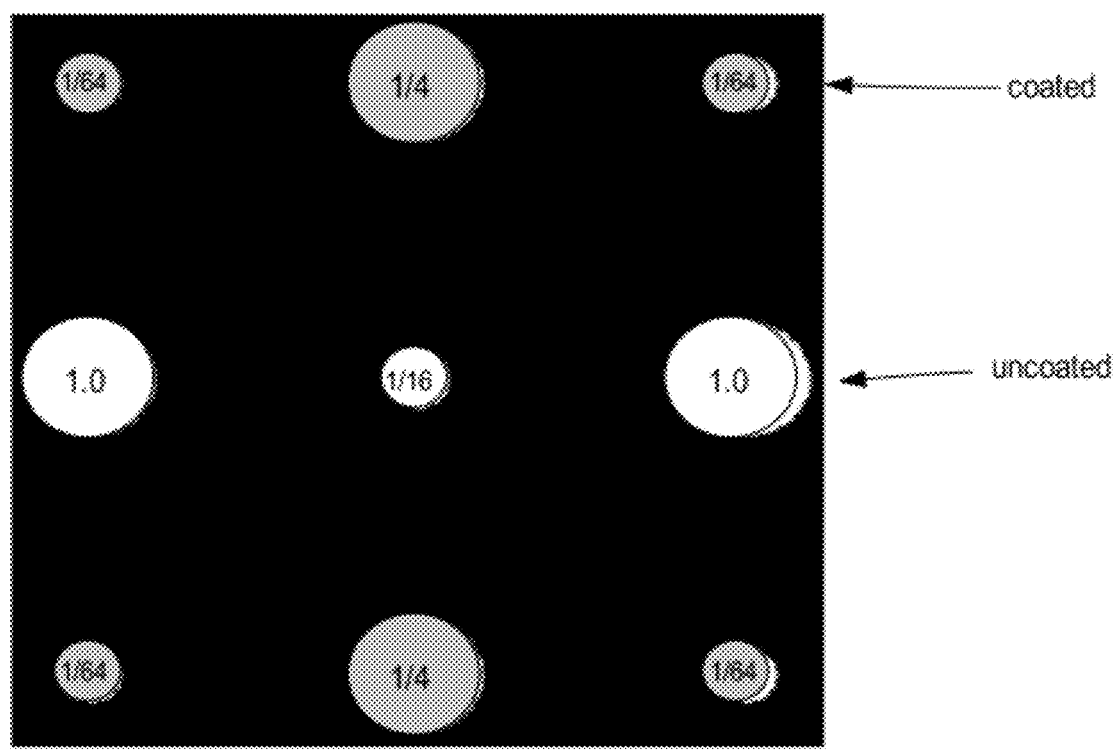
FIG. 42 shows an example microlens array that includes both apertures and neutral density filters at some of the microlenses, according to some embodiments.

In some embodiments, neutral density filters may be combined with a microlens array having apertures as previously described so that the final exposure is the result of the combination of the neutral density filters and the apertures. FIG. 42 shows an example microlens array that includes both apertures and neutral density filters at some of the microlenses, according to some embodiments. In this example, a mask of horizontal stripes of transmission levels 1.0 and $\frac{1}{16}$ is deposited on top of microlenses with apertures at 1.0 and $\frac{1}{4}$ as shown in FIG. 30B to produce four levels of exposure: 1.0, $\frac{1}{4}$, $\frac{1}{16}$, and $\frac{1}{64}$.

Figure 43:
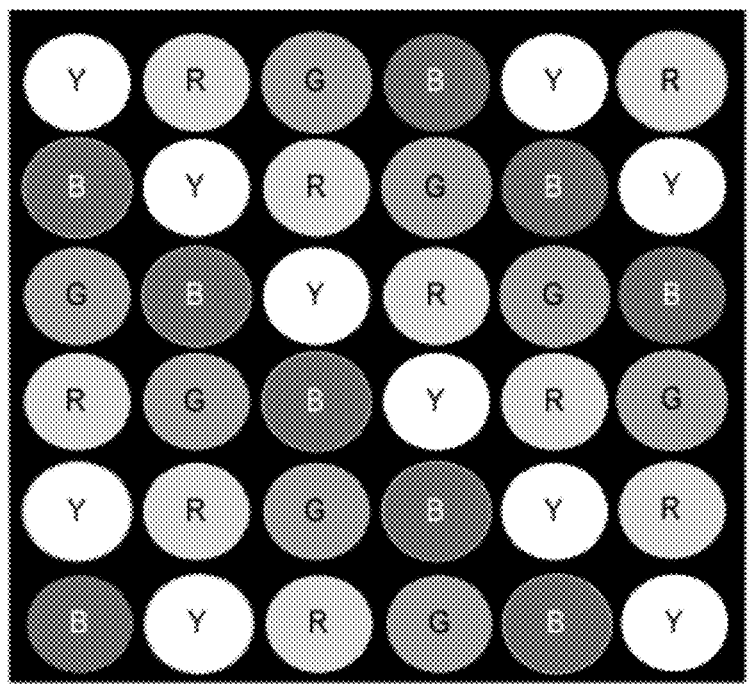
FIG. 43 illustrates an example pattern of different color filters on a microlens array, according to some embodiments.

Applying Color and/or Polarizing Filters to Microlenses in a Focused Plenoptic Camera Similar methods as those described above for neutral density filters may be used to deposit various color filters and/or polarizing filters as coating on separate wafers or directly on the microlens array. With an appropriate pattern of color filters applied to the microlenses in the array, true color imaging may be achieved in a focused plenoptic camera using a grayscale sensor. FIG. 43 illustrates an example pattern of four different color filters (R (red), G (green), B (blue), and Y (yellow)) on a microlens array, according to some embodiments. Different patterns may be used, ewer or more color filters may be used, and different color filters may be used, in various embodiments. Since nearby microlenses in a focused plenoptic camera capture microimages that include the same points from the main image, different color channels may be captured separately at the sensor for each point in the main image. In contrast, conventional Bayer-type filter sensors capture only one color channel (typically R, G, or B) at each pixel of the sensor, and thus only one color is captured for a particular point in the image. Foveon® sensors provide three stacked layers of pixels that allow three color channels (typically R, G, and B) to be captured at each point in the image. However, the Foveon® sensor arrangement that stacks pixels limits the number of color channels that may be captured for a point. With a focused plenoptic camera, from four to 100, or even more, copies of the same image, and thus of the same point in the image, may be captured by different microlenses. In contrast to Foveon® sensors, a focused plenoptic camera using an appropriate pattern of different color filters applied to the microlenses in the array may thus capture more than three, up to 100 or even more, microimages that include the same point in the image in different color channels. With, for example, a pattern of 100 different color filters each transmitting only a narrow range of the color spectrum, an embodiment of a focused plenoptic camera may sample all 100 wavelengths at a point in the image. Thus, embodiments of a focused plenoptic camera using color filters may provide true spectral imaging.

Figure 44:
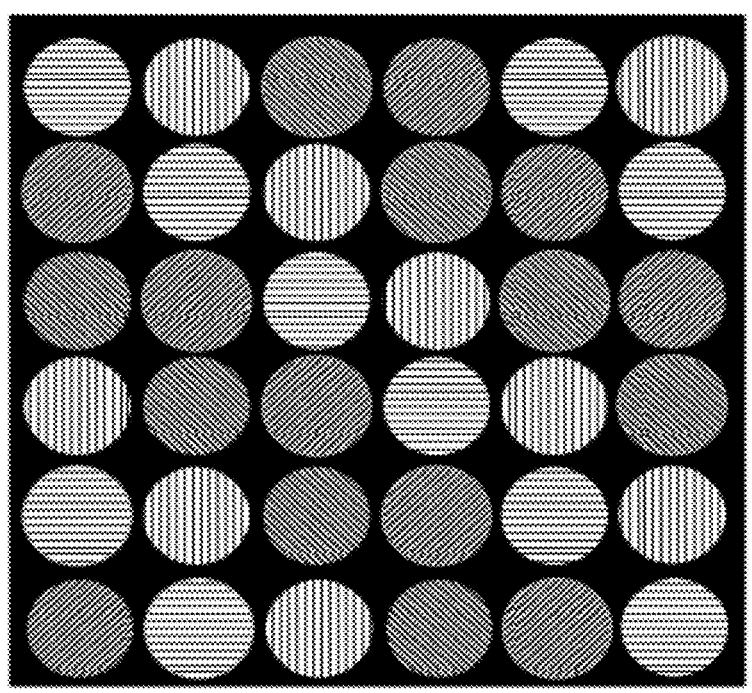
FIG. 44 illustrates an example pattern of different polarizing filters on a microlens array, according to some embodiments.

FIG. 44 illustrates an example pattern of four different polarizing filters (horizontal, vertical left rotational and right rotational) on a microlens array, according to some embodiments. With polarized filters, different modes of polarization may be captured in different microimages at the same time.

A raw image or "flat" captured using a focused plenoptic camera that incorporates two or more different color or polarizing filters includes multiple microimages captured according to the two or more different filters. One or more different images may then be assembled from the microimages, with each image assembled from the microimages captured using one of the different filters. A final image may then be generated by appropriately combining the images assembled from the microimages. Alternatively, a final image, or multiple images, may be assembled from the microimages by first combining the microimages and then assembling the combined microimages to produce one or more output images.

Combining Different Types of Filters in a Focused Plenoptic Camera

The different types of modulating elements (e.g., filters) described above may be used or combined in a focused plenoptic camera in many different ways. For example, appropriate filters and/or apertures may be used in combination to perform true color imaging and HDR imaging at the same time, or polarizing filtering and color filtering at the same time, or even polarizing filtering, color filtering and HDR imaging at the same time. As another example, 3D imaging may be combined with HDR imaging. In this case, it may be appropriate to first combine neighboring microimages captured using different neutral density filters and/or apertures into a true HDR flat, and then apply appropriate light-field techniques to the HDR flat to, for example, produce 3D views or refocused views from the HDR flat.

Using appropriate combinations of filters, apertures, and techniques, embodiments of the focused plenoptic camera may be used to capture the full plenoptic function, which depends not only on position and angle, but also on wavelength, polarization and potentially other parameters. Thus, embodiments of the focused plenoptic camera may provide higher order multiplexing of a highly dimensional function onto the 2D sensor.

Figure 45:
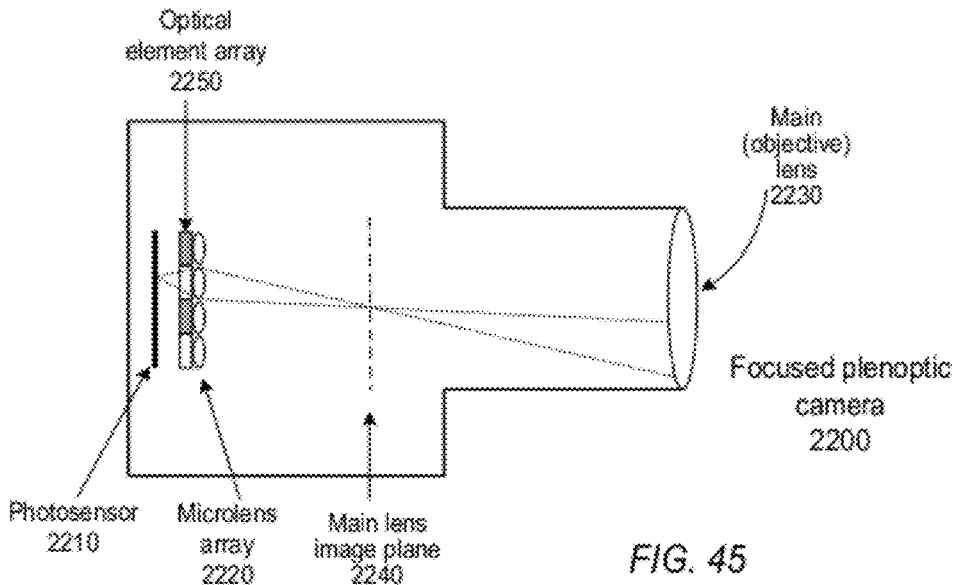
FIG. 45 is a block diagram illustrating a focused plenoptic camera including an array of optical elements such as filters or apertures according to some embodiments.

FIG. 45 is a block diagram illustrating a focused plenoptic camera including an array of optical elements such as filters or apertures according to one embodiment. Focused plenoptic camera 2200 may include a main (objective) lens 2230, a microlens array 2220, and a photosensor 2210. Microlens array 2220 may be located at a distance greater than f from photosensor 2210, where f is the focal length of the microlenses in array 2220. In addition, the microlenses in array 2220 are focused on the image plane 2240 of the main lens 2230. In some embodiments, photosensor 2210 may be conventional film; in other embodiments, photosensor 2210 may be a device for digitally capturing light, for example a CCD.

Focused plenoptic camera 2200 includes an optical element array 2250 proximate to the microlens array 2220. Optical element array 2250 includes a plurality of optical elements such as the filters or apertures as described herein. In FIG. 45, optical element array 2250 is shown as positioned behind microlens array 2220, between microlens array 2220 and photosensor 2210. However, in some embodiments, optical element array 2250 may be positioned in front of microlens array 2220, between microlens array 2200 and main lens 2230. Furthermore, some embodiments may include more than one optical element array 2250, and some embodiments may include at least one optical element array 2250 positioned behind microlens array 2220 and at least one optical element array positioned in front of microlens array 2220. While FIG. 45 shows optical element array 2250 as separate from microlens array 2220, for example as implemented on a separate wafer or other component than the microlens array 2220, in some embodiments the optical elements and microlenses may be integrated into one component, such as a silica, fused silica, or glass wafer as shown in FIG. 32.

In some embodiments in which the optical element array 2250 is a separate component from the microlens array 2220, the camera 2200 may be configured so that an optical element array 2250 may be inserted or removed from the camera 2200, replaced with a different optical element array 2250, and/or augmented by adding additional optical element array(s) 2250. For example, in some embodiments, an optical element array 2250 comprising different neutral density filters may be swapped for an optical element array 2250 comprising color filters or polarizing filters. Similarly, in some embodiments in which the optical element array 2250 is integrated with the microlens array 2220, the integrated array of microlenses and optical elements such as filters may be swapped for a different array, for example an array with different microlenses and/or filters, or for an array including only microlenses.

The optical elements in optical element array 2250 may be apertures or neutral density filters that affect the exposure at photosensor 2210, color filters that affect the wavelength of light that is received at photosensor 2210, polarizing filters that affect the polarization of light that is received at photosensor 2210, or some other type of optical element that affects light received at photosensor 2210. In some embodiments, optical element array 2250 may include two or more different types of optical elements, for example neutral density filters and color filters, or apertures and neutral density filters. Each optical element in optical element array 2250 corresponds to a particular one of the microlenses in microlens array 2220. However, note that configurations in which a single optical element corresponds to two or more microlenses in microlens array 2220, and/or in which two or more optical elements correspond to a single microlens in microlens array 2220, are possible and contemplated.

At least two of the optical elements provide different levels or types of effect on the light received at photosensor 2210 via the respective microlenses corresponding to the optical elements. For example, in an optical element array 2250 that includes apertures, at least two of the apertures may be of different diameters to thus produce different levels of exposure at photosensor 2210 for the respective microlenses. As another example, in an optical element array 2250 that includes neutral density filters, at least two of the filters provide different levels of filtering to thus produce different levels of exposure at photosensor 2210 for the respective microlenses. As yet another example, in an optical element array 2250 that includes color filters, at least two of the filters allow different wavelengths of the color spectrum of light to pass through the filters to thus capture different colors at photosensor 2210 for the respective microlenses. As still yet another example, in an optical element array 2250 that includes polarizing filters, at least two of the filters polarize at different angles to thus produce differently polarized light at photosensor 2210 for the respective microlenses.

Figure 46:
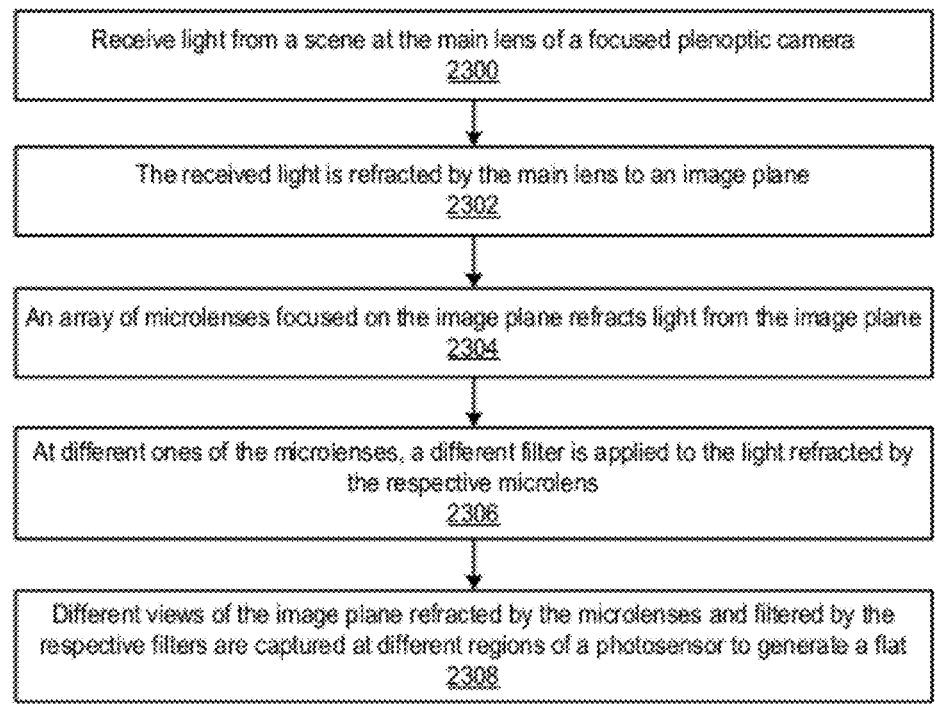
FIG. 46 is a flow chart illustrating how light is directed within a focused plenoptic camera including different filters according to some embodiments.

FIG. 46 is a flow chart illustrating how light is directed within a focused plenoptic camera including different filters at the microlens array, such as camera 2200 illustrated in FIG. 45, according to some embodiments. As indicated at 2300, light from a scene is received at the main lens of a focused plenoptic camera. FIG. 28 illustrates an example focused plenoptic camera that includes different apertures at different microlenses; note that various filters, as described above, may be used instead of or in addition to apertures. As indicated at 2302, the received light is refracted by the main lens to an image plane. As indicated at 2304, an array of microlenses, the microlenses of which are focused on the image plane, refracts light from the image plane. As indicated at 2306, at different ones of the microlenses, a different filter or aperture is applied to the light refracted by the respective microlens. As indicated at 2308, different views of the image plane, refracted by the microlenses and filtered by the respective filters, are captured at different regions of the photosensor to generate a flat; the flat includes one microimage for each microlens in the microlens array.

Depending on the focal length of the main lens of the focused plenoptic camera, any object beyond some distance from the main lens, typically one to five meters, is at optical infinity, with subpixel precision. When the main image created by the main lens of the focused plenoptic camera represents objects from a scene that are at optical infinity, those objects are exactly at the focal plane of the camera, one focal length from the main lens. The different views of the main image captured by the different microlenses are identical or nearly identical 3D views of the objects, that is identical or nearly identical images, but modified in brightness, color, polarization, or other characteristics. Thus, imaging functions, such as HDR imaging and spectral imaging, performed according to embodiments may produce precise and high quality output images, such as HDR images, color images, and so on.

Figure 47:
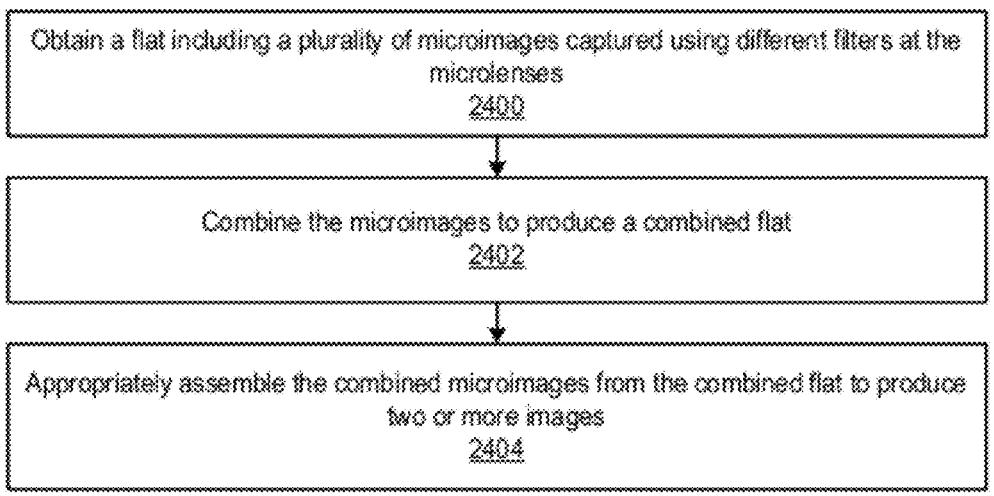
FIG. 47 is a flowchart illustrating a method in which the microimages captured using different filters are first combined to produce a combined flat and then assembled to produce one or more output images, according to some embodiments.

Rendering Methods for Flats Captured by a Focused Plenoptic Camera Using Modulating Elements FIGS. 47, 48, 49A-49B, and 50 illustrate general methods for rendering flats captured with a focused plenoptic camera (or radiance camera) including modulating elements such as filters and/or apertures that modulate a property of light as described herein. FIG. 47 is a flowchart illustrating a method in which the microimages captured using different filters are first combined to produce a combined flat and then assembled to produce one or more output images, according to some embodiments. As indicated at 2400, a flat captured by a focused plenoptic camera including different filters or apertures at the microlenses may be obtained (see, e.g., FIGS. 33 and 35 for examples of what such a flat may look like to a human observer). As indicated at 2402, the captured microimages may be combined to create a combined flat. For example, if apertures or neutral density filters are used to capture an HDR image, the microimages may be combined according to an HDRI technique to produce an HDR flat. As indicated at 2404, the combined microimages from the combined flat may be appropriately assembled to produce an output image or images. Example methods for assembling microimages from a flat to generate an image or images are shown in FIGS. 51 and 52.

Figure 49A:
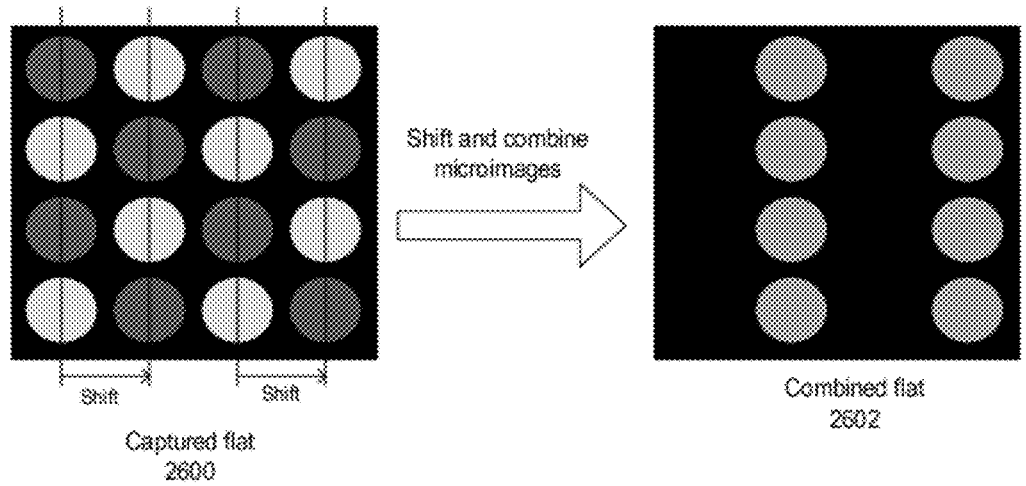
FIGS. 49A and 49B graphically illustrate a method in which the microimages captured using different filters are first combined to produce a combined flat and then assembled to produce a final image, according to some embodiments.
Figure 49B:
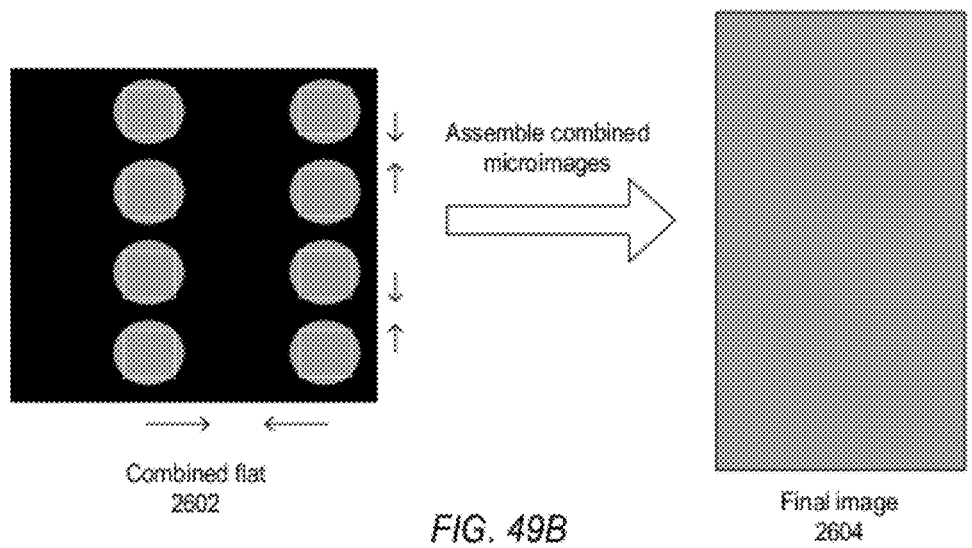

FIGS. 49A and 49B graphically illustrate a method in which the microimages captured using different filters are first combined to produce a combined flat and then assembled to produce a final image, according to some embodiments. FIG. 49A shows a flat 2600 captured by a focused plenoptic camera including different filters or apertures at the microlenses. The darker circles in captured flat 2600 represent microimages captured using one filter or aperture, and the lighter circles in flat 2600 represent microimages captured using a different filter or aperture. The captured microimages may be combined to create a combined flat 2602, as shown in FIG. 49A. In some embodiments, combining the microimages involves appropriately shifting some of the microimages and combining the microimages with others of the microimages, as shown in FIG. 49A. As shown in FIG. 49B, the combined microimages from the combined flat 2602 may be appropriately assembled to produce a final image 2604. Example methods for assembling microimages from a flat to generate an image or images are shown in FIGS. 51 and 52. In some embodiments, assembling the microimages from combined flat 2602 may include cropping the microimages, as illustrated by the dotted white squares, and moving the cropped regions together as indicated by the arrows in FIG. 49B to generate the final image 2604.

While FIGS. 49A and 49B illustrate a rendering method in which a final image 2604 is rendered from a captured flat 2600 including microimages captured using two different filters or apertures, the method may be applied, with some modifications, to render final images from captured flats including microimages captured using more than two different filters.

Figure 48:
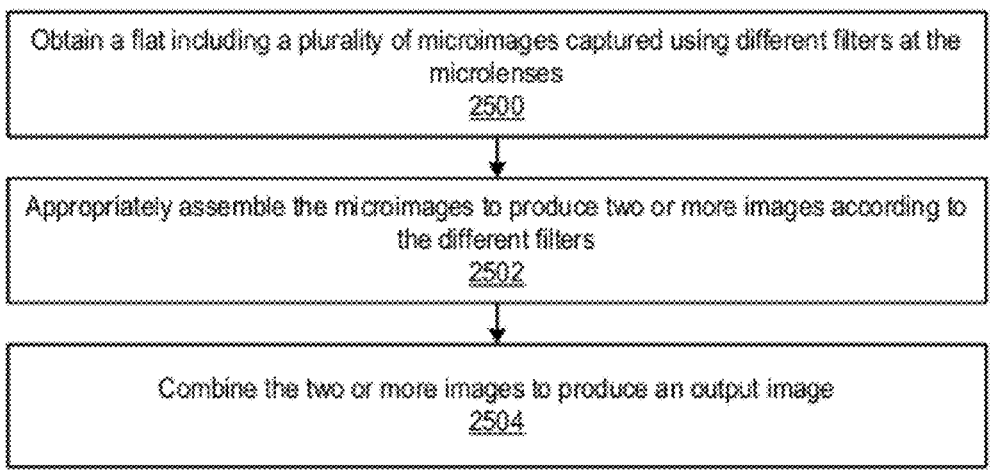
FIG. 48 is a flowchart illustrating a method in which microimages captured using different filters are first combined to produce two or more separate images, and then the separate images are combined to produce one or more output images, according to some embodiments.

FIG. 48 is a flowchart illustrating a method in which microimages captured using different filters are first combined to produce two or more separate images, and then the separate images are combined to produce one or more output images, according to some embodiments. As indicated at 2500, a flat captured by a focused plenoptic camera including different filters or apertures at the microlenses may be obtained (see, e.g., FIGS. 33 and 35 for examples of what such a flat may look like to a human observer). As indicated at 2502, the microimages from the flat may be appropriately assembled to produce two or more images according to the different filters used. Example methods for assembling microimages from a flat to generate an image or images are shown in FIGS. 51 and 52. As indicated at 2504, the two or more images may be appropriately combined to produce an output image. For example, if apertures or neutral density filters are used to capture an HDR image, the two or more images may be combined according to an HDRI technique to produce an HDR image.

Figure 50:
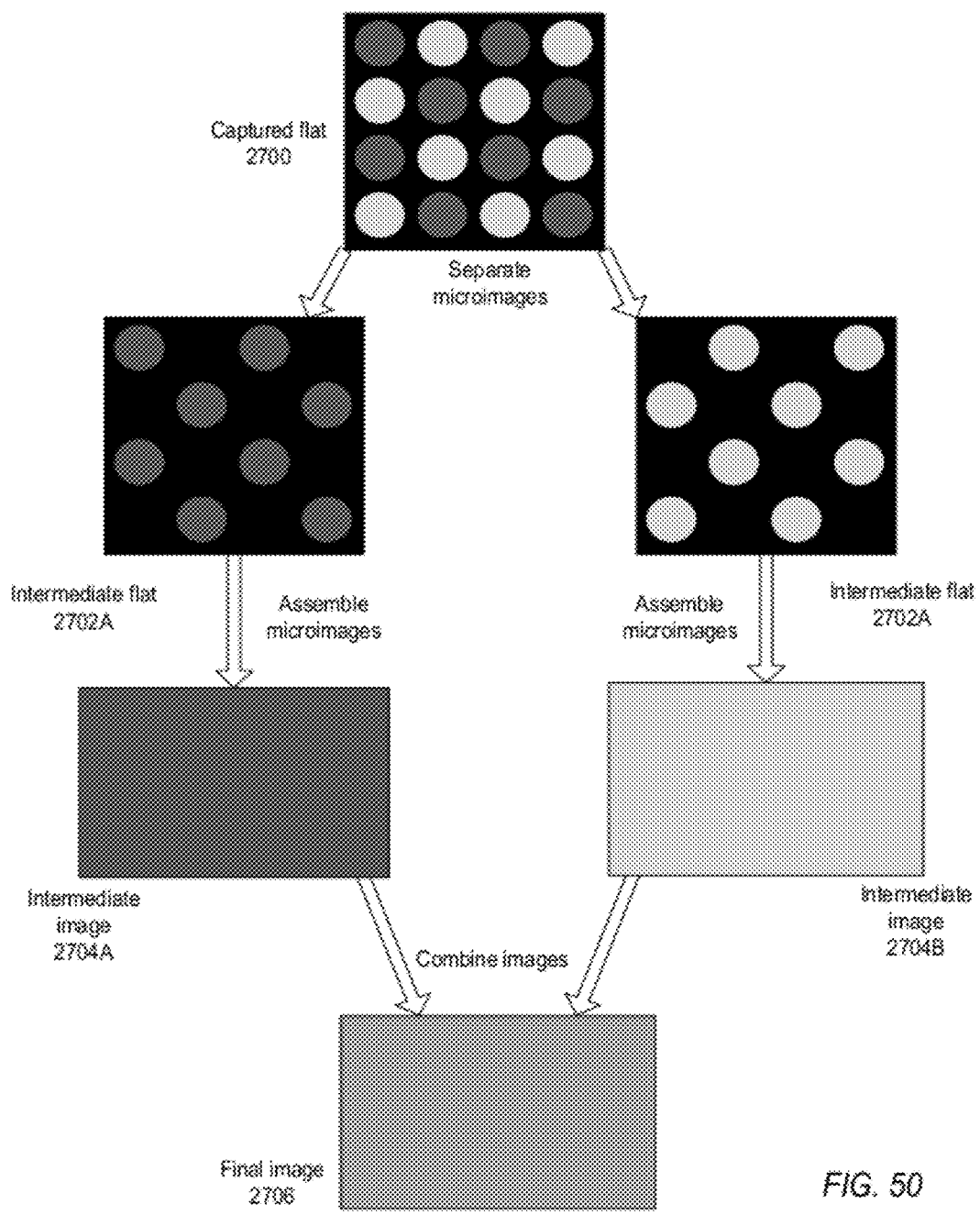
FIG. 50 graphically illustrates a method in which microimages captured using different filters are first combined to produce two or more separate images, and then the separate images are combined to produce one or more output images, according to some embodiments.

FIG. 50 graphically illustrates a method in which microimages captured using different filters are first combined to produce two or more separate images, and then the separate images are combined to produce one or more output images, according to some embodiments. FIG. 50 shows a flat 2700 captured by a focused plenoptic camera including different filters or apertures at the microlenses. The darker circles in captured flat 2700 represent microimages captured using one filter or aperture, and the lighter circles in flat 2700 represent microimages captured using a different filter or aperture. In some embodiments, the microimages from the flat 2700 may be separated to generate separate intermediate flats 2702, with each intermediate flat 2702 including microimages captured by one type of the filters or apertures. The microimages from each intermediate flat 2702 may be appropriately assembled to produce intermediate images 2704. Alternatively, the method may work directly from captured flat 2700 to assemble intermediate images 2704 without generating intermediate flats by appropriately selecting the microimages for each type of filter from the captured flat and assembling the selected microimages. Example methods for assembling microimages to generate an image or images are shown in FIGS. 51 and 52. In some embodiments, assembling the microimages from a flat 2702 may include cropping the microimages and then moving the cropped regions together. Intermediate images 2704 may be appropriately combined to produce a final image 2706. For example, if apertures or neutral density filters are used to capture an HDR image, the intermediate images 2704 may be combined according to an HDRI technique to produce an HDR image 2706.

While FIG. 50 illustrates a rendering method in which a final image 2706 is rendered from a captured flat 2600 including microimages captured using two different filters or apertures, the method may be applied, with some modifications, to render final images from captured flats including microimages captured using more than two different filters.

Techniques for Assembling Microimages from Flats Captured with Focused Plenoptic camera technology FIG. 51 is a flowchart of a full-resolution light-field rendering method for assembling microimages from flats captured by focused plenoptic camera technology according to some embodiments. As indicated at 1800, a flat captured by a focused plenoptic camera may be obtained. As indicated at 1802, microimages in areas of the flat may be examined (manually or automatically, as described below) to determine the direction of movement of edges in the microimages relative to a direction of movement of the algorithm. At 1804, if it is determined that edges in microimages of an area are moving relative to the microimage centers in the same direction as the direction of movement, the microimages in that area may be inverted relative to their individual centers. If the edges are not moving relative to the microimage centers in the same direction as the direction of movement (i.e., if the edges are moving in the opposite direction as the direction of movement), then the microimages in the area are not inverted.

In some embodiments, examination of the microimages to determine the direction of movement of edges may be performed manually by a user via a user interface. The user may mark or otherwise indicate areas that the user determines need be inverted via the user interface. In some embodiments, examination of the microimages to determine the direction of movement of edges may be performed automatically in software. In some embodiments, an automated software method may examine the microimages to determine noise in the microimages, for example using a Fourier transform to detect peaks at certain frequencies. An excessive amount of noise in an area of the final rendered image may indicate that microimages in that area are flipped, and thus need to be inverted. Microimages that include noise over a specified threshold may be marked to be inverted.

As indicated at 1806, the microimages may each be cropped to produce an $m_1 \times m_2$ subregion or crop of each microimage, where at least one of $m_1$ and $m_2$ is an integer greater than two. As indicated at 1808, the subregions or crops from the microimages may be appropriately assembled to produce a final high-resolution image of the scene.

In some embodiments, instead of cropping the microimages and assembling the subregions generated by the cropping, the microimages themselves may be appropriately assembled to produce a final high-resolution image of the scene. Thus, in these embodiments, element 1806 is not performed; at 1808, the microimages are assembled to produce an output image. In assembling the microimages, overlapping portions of adjacent microimages may be merged, blended, or otherwise handled.

In some embodiments, two or more images rendered from a flat according to rendering methods described herein may be combined to produce a higher-quality output image. For example, in some embodiments, the microimages in a flat may all be inverted, and the inverted microimages appropriately assembled to produce a first intermediate image. A second intermediate image may be generated without inverting the microimages prior to assembling. The two intermediate images may then be combined to produce a higher-quality output image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images. As an example, when combining the images, the user may manually (or software may automatically) select areas in one intermediate image that are of higher quality than the same areas in the other image, and then combine the selected areas with the other image to produce an output image that includes the highest quality portions of the two intermediate images. In some embodiments, a map (e.g., a bitmap) may be generated that indicates areas of each image that are to be included in the output image, and then the output image may be generated from the two intermediate images according to the map. In some embodiments, more than two intermediate images may be generated, and a similar method may be used to generate a higher-quality output image from the intermediate images.

FIG. 52 is a flowchart of a full-resolution light-field rendering method for assembling microimages from flats captured by focused plenoptic camera technology in which multiple images are rendered from a flat and combined to produce a final high-resolution output image, according to some embodiments. As indicated at 1850, a flat captured by a focused plenoptic camera may be obtained. As indicated at 1852, the plurality of microimages may be assembled to produce a first high-resolution image. As indicated at 1854, each of the microimages may be inverted relative to their respective centers to produce a plurality of inverted microimages. As indicated at 1856, the plurality of inverted microimages may be assembled to produce a second high-resolution image. As indicated at 1858, the first high-resolution image may be combined with the second high-resolution image to produce a final high-resolution image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images.

Implementations of Rendering Methods

Figure 53:
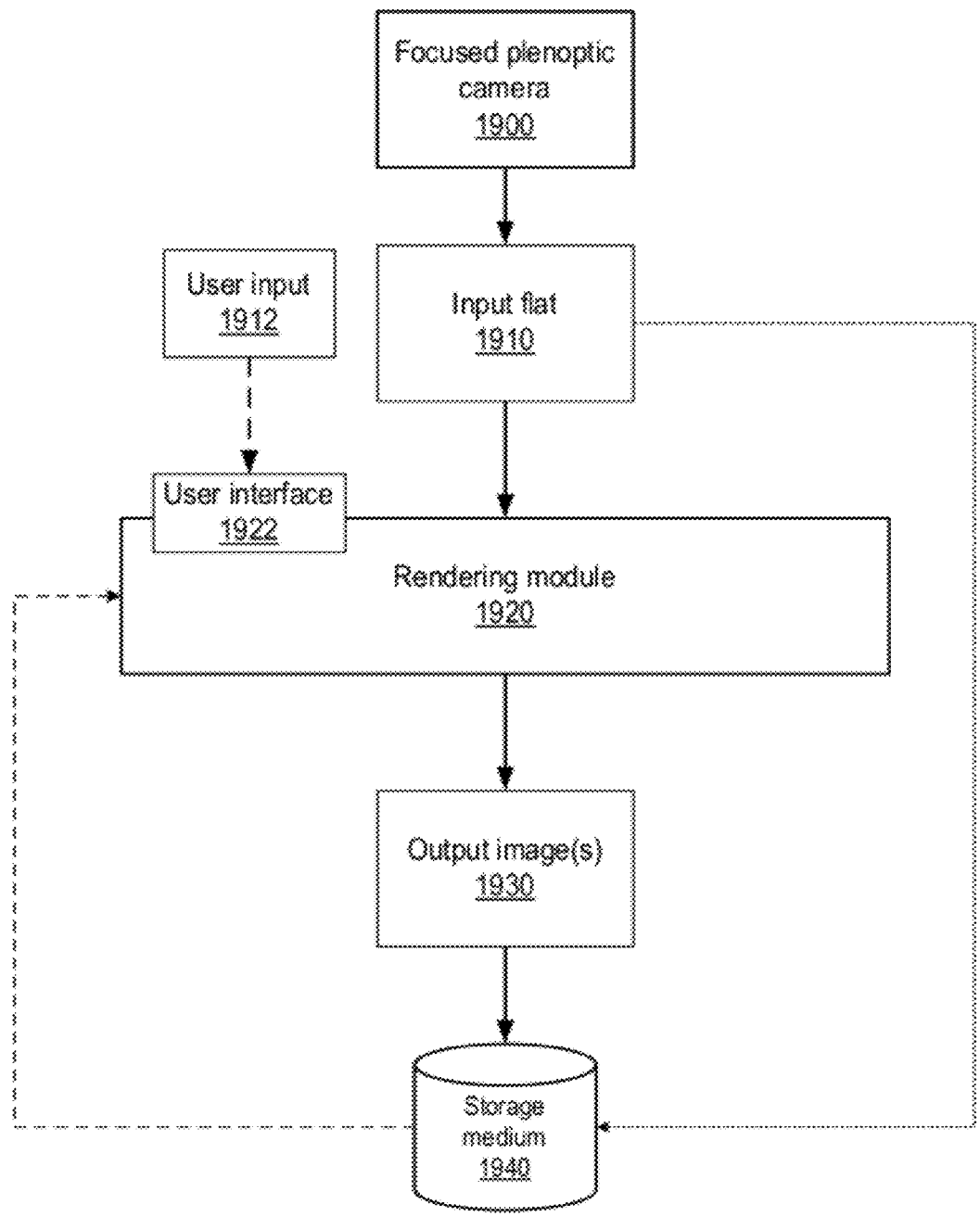
FIG. 53 illustrates a rendering module for rendering images from flats captured, for example, by embodiments of a radiance camera using focused plenoptic camera technology and modulating elements, according to some embodiments.
Figure 54:
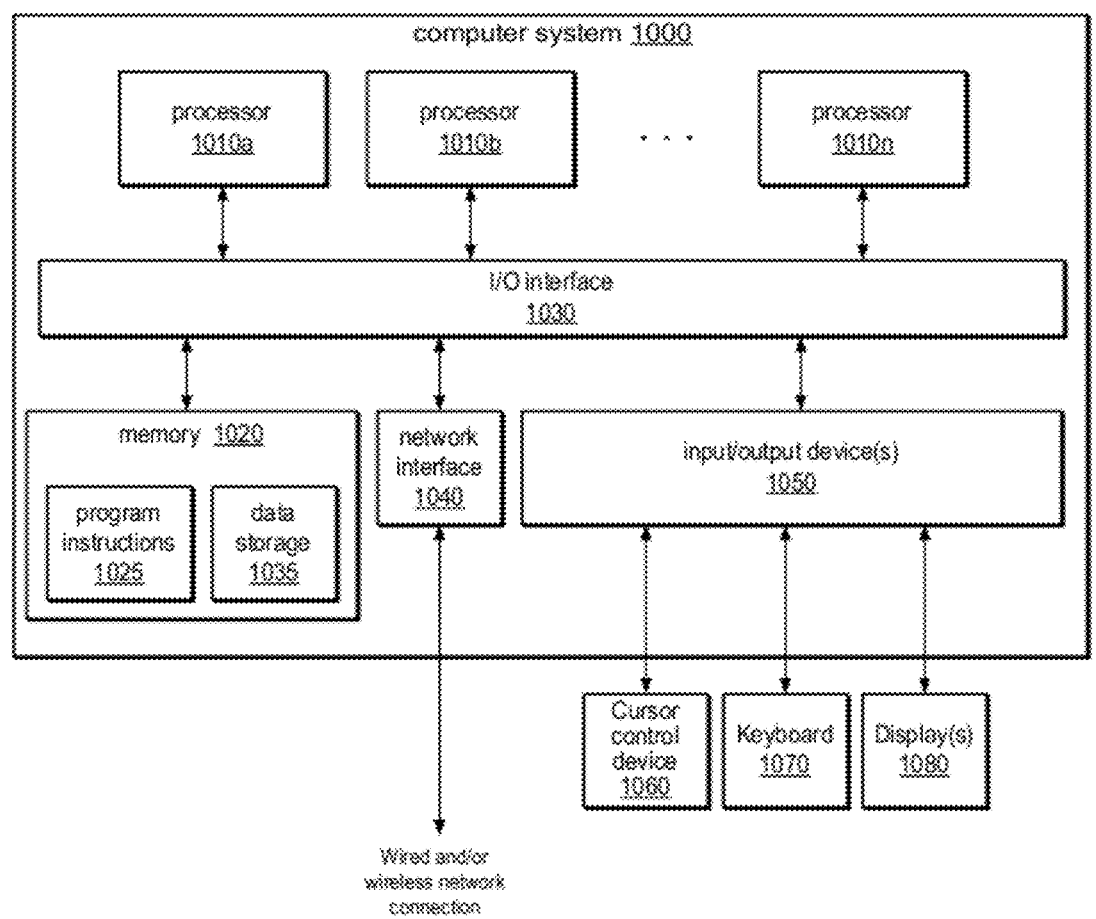
FIG. 54 illustrates an example computer system that may be used in embodiments.

FIG. 53 illustrates a rendering module for rendering images from flats captured, for example, by embodiments of a radiance camera using focused plenoptic camera technology and modulating elements, according to some embodiments. Rendering module 1920 may, for example, implement full-resolution light-field rendering methods as described in FIG. 51 and/or as described in FIG. 52. Rendering module 1920 may also implement one or more methods for rendering images from flats captured using a radiance camera with modulating elements, such as the methods described in FIGS. 47, 48, 49A-49B, and 50. Rendering module 1920 may also implement methods for rendering High Dynamic Range (HDR) images from captured flats as described herein, or method for rendering images according to other properties of light, such as extended color images, extended polarization images, and so on. FIG. 54 illustrates an example computer system on which embodiments of rendering module 1920 may be implemented. In some embodiments of a radiance camera implementing focused plenoptic camera technology, rendering module 1920 may be implemented in the camera. Referring to FIG. 53, rendering module 1920 receives an input flat 1910 captured by a radiance camera implementing focused plenoptic camera technology, such as one of the embodiments of radiance cameras described herein. Example portions of a flat as may be captured by various embodiments of a focused plenoptic camera are illustrated in FIGS. 6, 8, 33, and 35. Rendering module 1920 then processes the input image 1910 according to an appropriate rendering method or methods as described herein. Rendering module 1920 generates as output one or more images 1930. Example types of output images 1930 include, but are not limited to, high-resolution images, HDR images, and HDR flats. FIGS. 33 and 34A-34B, and FIGS. 35 and 36A-36B, illustrate, and the accompanying text describes, the generation of an HDR image (or an HDR flat) from an input flat. Similar methods may be used to generate other types of images, such as extended color images and extended polarization images. Output image 1930 may, for example, be stored to a storage medium 1940, such as system memory, a disk drive, DVD, CD, etc. The dashed line from input image 1910 to storage medium 1940 indicates that the original (input) flat 1910 may also be stored. The dashed line from storage medium 1940 to rendering module 1920 indicates that stored images may be retrieved and further processed by rendering module 1920.

In some embodiments, rendering module 1920 may provide a user interface 1922 via which a user may interact with the module 1920, for example to specify or otherwise manage input flats 1910 and output images 1930 as described herein. In some embodiments, examination of microimages to determine the direction of movement of edges may be performed by a user via the user interface 1922. The user may mark or otherwise indicate areas that the user determines need be inverted via the user interface 1922. In some embodiments, examination of the microimages to determine the direction of movement of edges may be performed automatically by rendering module 1920. Some embodiments may allow either manual or automatic examination and detection, or a combination thereof, to be used. The user interface 1922 may also provide tools whereby a user may specify areas of two or more rendered images that are to be combined to produce a higher-quality output image.

Example System

Embodiments of a rendering module and/or of the various rendering methods as described herein, or other appropriate rendering methods for rendering images captured using embodiments of a radiance camera using focused plenoptic camera technology and modulating elements, may be executed on one or more computer systems, which may interact with various other devices. One such computer system is illustrated by FIG. 54. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 54, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
    a photosensor configured to capture light projected onto the photosensor;
    an objective lens, wherein the objective lens is configured to refract light from a scene located in front of the camera to form an image of the scene at an image plane of the objective lens;
    a microlens array positioned between the objective lens and the photosensor, wherein the microlens array comprises a plurality of microlenses, wherein the plurality of microlenses are focused on the image plane and not on the objective lens, wherein each microlens of the microlens array is configured to project a separate microimage of the image of the scene formed at the image plane by the objective lens onto a separate location on the photosensor; and
    a modulating element array comprising two or more modulating elements, wherein the modulating element array affects a property of light passing through the modulating array, wherein at least one of the modulating elements in the modulating element array affects the property of light differently than at least one other modulating element in the modulating element array to thus modulate the property of light in the separate microimages projected onto the separate locations on the photosensor by the microlens array.

2. The camera as recited in claim 1, wherein the modulating element array is proximate to the objective lens of the camera so that the modulating element array affects the property of light proximate to the objective lens.

3. The camera as recited in claim 2, wherein the modulating element array is located in front of the objective lens between the objective lens and the scene.

4. The camera as recited in claim 2, wherein the modulating element array is located behind the objective lens between the objective lens and the image plane.

5. The camera as recited in claim 2, wherein each of the separate microimages of the image of the scene projected onto the separate locations on the photosensor by the microlens array includes two or more modulated portions, wherein each modulated portion corresponds to a respective one of the modulating elements in the modulating element array.

6. The camera as recited in claim 1, wherein the modulating element array is integrated in the objective lens, wherein the objective lens is divided into two or more portions, and wherein each portion of the objective lens corresponds to a respective one of the modulating elements.

7. The camera as recited in claim 1, wherein each of the plurality of microlenses includes an aperture, wherein the apertures are approximately identical, wherein the modulating element array is located proximate to the microlens array so that the modulating element array affects the property of light proximate to the microlens array, and wherein each modulating element in the modulating element array corresponds to a particular one of the plurality of microlenses.

8. The camera as recited in claim 7, wherein the modulating element array is located between the microlens array and the photosensor.

9. The camera as recited in claim 1, wherein the modulating element array is the microlens array, wherein the modulating elements are the microlenses in the array, and wherein the modulation is provided by differently positioning different ones of the microlenses relative to a main optical axis of the camera or by interleaving microlenses with differing optical characteristics in the microlens array.

10. The camera as recited in claim 1, wherein the property of light is luminance, and wherein the modulating elements are neutral density filters that filter the light at two or more different levels.

11. The camera as recited in claim 1, wherein the property of light is color, and wherein the modulating elements are color filters that filter the light according to two or more different wavelengths.

12. The camera as recited in claim 1, wherein the property of light is polarity, and wherein the modulating elements are polarizing filters that filter the light according to two or more different polarities.

13. The camera as recited in claim 1, wherein the property of light is focal length, and wherein the modulating elements provide different focal lengths so that different portions of the image of the scene are in focus at the image plane.

14. The camera as recited in claim 1, wherein the modulating elements are sheets of glass with different refractive indexes to thus provide different optical paths for the light passing through the different sheets of glass.

15. The camera as recited in claim 1, wherein the photosensor is configured to capture a flat comprising the separate microimages, wherein each of the separate microimages is in a separate region of the flat, and wherein at least two of the separate microimages or at least two portions of each microimage differ according to the different effects of the modulating elements.

16. The camera as recited in claim 1, wherein the camera is a small camera with an aperture of approximately 1 millimeter or less at the objective lens.

17. The camera as recited in claim 16, wherein the property of light is luminance, wherein the modulating elements are neutral density filters that filter the light at two or more different levels, wherein the camera is configured to capture a flat comprising the separate microimages, and wherein the captured flat is configured to be processed according to one or more rendering methods to generate a high dynamic range (HDR) image of the scene.

18. A method, comprising:
receiving light from a scene at an objective lens of a camera;
refracting light from the objective lens to form an image of the scene at an image plane of the objective lens;
receiving light from the image plane at a microlens array located between the objective lens and a photosensor of the camera and parallel to the image plane, wherein the microlens array comprises a plurality of microlenses, wherein each of the plurality of microlenses is focused on the image plane and not on the objective lens;
receiving light from the microlens array at the photosensor, wherein the photosensor receives a separate microimage of the image of the scene formed at the image plane by the objective lens from each microlens of the array at a separate location on the photosensor; and
modulating a property of the light at a modulating element array comprising two or more modulating elements, wherein at least one of the modulating elements in the modulating element array affects the property of light differently than at least one other modulating element in the modulating element array to thus modulate the property of light in the separate microimages projected onto the separate locations on the photosensor by the microlens array.

19. The method as recited in claim 18, wherein the modulating element array is proximate to the objective lens of the camera so that the modulating element array modulates the property of the light proximate to the objective lens.

20. The method as recited in claim 18, wherein each of the plurality of microlenses includes an aperture, wherein the apertures are approximately identical, wherein the modulating element array is located proximate to the microlens array so that the modulating element array modulates the property of light proximate to the microlens array, and wherein each modulating element in the modulating element array corresponds to a particular one of the plurality of microlenses.

* * * * *